(12) United States Patent
Hannuksela

(10) Patent No.: US 9,912,966 B2
(45) Date of Patent: Mar. 6, 2018

(54) PARAMETER SET CODING

(71) Applicant: Nokia Technologies Oy, Espoo (FI)

(72) Inventor: Miska Matias Hannuksela, Tampere (FI)

(73) Assignee: Nokia Technologies Oy, Espoo (FI)

(*) Notice: Subject to any disclaimer, the term of this patent is extended or adjusted under 35 U.S.C. 154(b) by 278 days.

(21) Appl. No.: 14/587,852

(22) Filed: Dec. 31, 2014

(65) Prior Publication Data

US 2015/0195577 A1    Jul. 9, 2015

Related U.S. Application Data

(60) Provisional application No. 61/923,368, filed on Jan. 3, 2014.

(51) Int. Cl.
| | |
|---|---|
| H04B 1/66 | (2006.01) |
| H04N 19/70 | (2014.01) |
| H04N 19/44 | (2014.01) |
| H04N 19/46 | (2014.01) |

(52) U.S. Cl.
CPC ............. *H04N 19/70* (2014.11); *H04N 19/44* (2014.11); *H04N 19/46* (2014.11)

(58) Field of Classification Search
CPC ............................... H04N 19/70; H04N 19/44
See application file for complete search history.

(56) References Cited

U.S. PATENT DOCUMENTS

| | | |
|---|---|---|
| 2004/0218668 A1 | 11/2004 | Hannuksela et al. |
| 2013/0114694 A1 | 5/2013 | Chen et al. |
| 2013/0194384 A1 | 8/2013 | Hannuksela |
| 2013/0272372 A1 | 10/2013 | Hannuksela et al. |
| 2013/0287115 A1 | 10/2013 | Wang |
| 2014/0003491 A1 | 1/2014 | Chen et al. |
| 2014/0192903 A1* | 7/2014 | Wang ..................... H04N 19/70 375/240.28 |

(Continued)

FOREIGN PATENT DOCUMENTS

| | | |
|---|---|---|
| WO | 2013/107939 A1 | 7/2013 |
| WO | 2013/113997 A1 | 8/2013 |

OTHER PUBLICATIONS

Tech et al., "Preliminary Version of MV-HEVC Draft Text 6", Joint Collaborative Team on 3D Video Coding Extension Development of ITU-T SG 16 WP 3 and ISO/IEC JTC 1/SC 29/WG 11, JCT3V-F1004-v4, 6th Meeting, Oct. 25-Nov. 1, 2013, 122 pages.

(Continued)

*Primary Examiner* — Sath V Perungavoor
*Assistant Examiner* — Peet Dhillon
(74) *Attorney, Agent, or Firm* — Alston & Bird LLP

(57) ABSTRACT

There is provided methods, apparatuses and computer program products for forming a plurality of syntax element assignments, each syntax element assignment relating to a subset of parameters of a set of parameters, and each syntax element assignment comprising assignments of values to said related subset of parameters, forming an index for each of said plurality of syntax element assignments, forming a plurality of combination parameter sets, each combination parameter set comprising indexes of a plurality of said syntax element assignments of said subsets of parameters, and encoding at least one said combination parameter set into a video bitstream for determining parameter values for video decoding.

20 Claims, 7 Drawing Sheets

(56) References Cited

U.S. PATENT DOCUMENTS

| | | | | |
|---|---|---|---|---|
| 2015/0249837 | A1* | 9/2015 | Li | H04N 19/70 375/240.26 |
| 2016/0105687 | A1* | 4/2016 | Deshpande | H04N 19/70 375/240.25 |

OTHER PUBLICATIONS

Chen et al., "AHG9: Header Parameter Set (HPS)", Joint Collaborative Team on Video Coding (JCT0-VC) of ITU-T SG16 WP3 and ISO/IEC JTC1/SC29/WG11, JCTVC-J0109, Qualcomm Incorporation, 10th Meeting, Jul. 11-20, 2012, pp. 1-12.

Hannuksela et al., "MV-HEVC/SHVC HLS: Header parameter set (HPS)", Joint Collaborative Team on Video Coding (JCT-VC) of ITU-T SG 16 WP 3 and ISO/IEC JTC 1/SC 29/WG 11, JCTVC-P0139-v2, Nokia, 16th Meeting, Jan. 9-17, 2014, pp. 1-5.

"Advanced Video Coding for Generic Audiovisual Services", SERIES H: Audiovisual and Multimedia Systems, Infrastructure of audiovisual services—Coding of moving video, Recommendation ITU-T H.264, Mar. 2010, 676 pages.

"High Efficiency Video Coding", SERIES H: Audiovisual and Multimedia Systems, Infrastructure of audiovisual services—Coding of moving video, Recommendation ITU-T H.265, Apr. 2013, 317 pages.

"Parameter Values for Ultra-High Definition Television Systems for Production and International Programme Exchange", Recommendation ITU-R BT.2020, Aug. 2012, 7 pages.

"Parameter Values for the HDTV Standards for Production and International Programme Exchange", Recommendation ITU-R BT.709-5, Apr. 2002, 32 pages.

International Search Report and Written Opinion received for corresponding Patent Cooperation Treaty Application No. PCT/FI2014/051067, dated Mar. 25, 2015, 11 pages.

Extended European Search Report for corresponding European Application No. 14877107.4 dated Jul. 19, 2017, 9 pages.

Li, M. et al., *Multiple Adaptation Parameter Sets Referring*, Joint Collaborative Team on Video Coding (JCT-VC) of ITU-T SG16 WP3 and ISO/IEC JC1/SC29/WG11, 7th Meeting, Nov. 21-30, 2011, Document JCTVC-G332, WG11 No. m21894, 7 pages.

Laroche, G. et al., *On memory compression for motion vector prediction*, Joint Collaborative Team on Video Coding (JCT-VC) of ITU-T SG16 WP3 and ISO/IEC JTC1/SC29/WG11, 5th Meeting; Mar. 12-23, 2011, Document JCTVC-E221, 11 pages.

Wang, Y-K. et al., *On APS partial update*, Joint Collaborative Team on Video Coding (JCT-VC) of ITU-T SG16 WP3 and ISO/IEC JTC1/SC29/WG11, 8th Meeting, Feb. 1-10, 2012, Document JCTVC-H0505, 4 pages.

Office Action from corresponding Korean Patent Application No. 2016-7021165, dated Nov. 14, 2017, 7 pages.

\* cited by examiner

PARAMETER SET CODING

TECHNICAL FIELD

The invention relates to the field of video coding, especially to video encoders, decoders, transcoders, and systems, methods and software for encoding, decoding and transcoding video.

BACKGROUND

This section is intended to provide a background or context to the invention that is recited in the detailed description. The description herein may include concepts that could be pursued, but are not necessarily ones that have been previously conceived or pursued. Therefore, unless otherwise indicated herein, what is described in this section is not prior art to this application and is not admitted to be prior art by inclusion in this section.

In a typical video coding scheme, a sequence of pictures is coded, pictures contain slices, and slices contain elementary coding units, such as macroblocks or coding tree units. The macroblocks, in turn, contain the luma and chroma samples corresponding to a small rectangular area in the picture. The pictures may be of different types: intra pictures can be coded without using other pictures for reference, and inter-predicted pictures use other pictures for coding. Different types of pictures may form a group of pictures or a sequence of pictures that has a certain prediction pattern between pictures.

Modern video codecs utilize various prediction schemes to reduce the amount of redundant information that needs to be stored or sent from the encoder to the decoder. Prediction can be done across time (temporally) such that an earlier pictures are used as reference pictures. In multi-view video coding, prediction can also take place (spatially) by using a picture of another view as a reference picture, or by using a synthesized picture formed by view synthesis as a reference picture. Prediction generally takes place so that picture information (such as pixel values) for a block in the reference picture is used for predicting picture information in the current picture, that is, forming a predicted block. So-called motion vectors may be employed in the prediction, and they indicate the source of picture information in the reference picture for the current block being predicted. The reference pictures to be used are kept in memory, and reference picture lists are used to manage the use of the reference pictures.

Some video coding standards introduce headers at slice layer and below, and a concept of a parameter set at layers above the slice layer. An instance of a parameter set may include picture, group of pictures (GOP), and sequence level data such as picture size, display window, optional coding modes employed, macroblock allocation map, and others. Each parameter set instance may include a unique identifier. Each slice header may include a reference to a parameter set identifier, and the parameter values of the referred parameter set may be used when decoding the slice. For example, a picture parameter set may be understood to be a syntax structure containing syntax elements that apply to zero or more entire coded pictures as determined by a syntax element found in the slice headers. Parameter sets decouple the transmission and decoding order of infrequently changing picture, GOP, and sequence level data from sequence, GOP, and picture boundaries.

The number of pictures of multi-view coded video bitstreams can be clearly higher than in the traditional single-view coded video bitstreams. Also, as the resolution (in terms of number of pixels) of the video increases, each picture may have a significantly higher amount of image data to code and transmit.

There is, therefore, a need for solutions that improve the coding efficiency of video.

SUMMARY

Some embodiments provide a method for encoding and decoding video information.

Various aspects of examples of the invention are provided in the detailed description. According to a first aspect, there is provided a method comprising: forming a plurality of syntax element assignments, each syntax element assignment relating to a subset of parameters of a parameter set, and each syntax element assignment comprising assignments of values to said related subset of parameters, forming an index for each of said plurality of syntax element assignment, forming a plurality of combination parameter sets, each combination parameter set comprising indexes of a plurality of said syntax element assignments of said sub-sets of parameters, and encoding at least one said combination parameter set into a video bitstream for determining parameter values for video decoding.

According to a second aspect, there is provided a method comprising: encoding a first uncompressed picture into a first coded picture comprising a first slice and encoding a second uncompressed picture into a second coded picture comprising a second slice; the first slice and the second slice comprising a first slice header and a second slice header, respectively, both conforming to a slice header syntax structure; the encoding comprising: classifying syntax elements for the slice header syntax structure into a first set and a second set; determining a first at least one set of values for the first set and a second at least one set of values for the at least one second set; encoding in a header parameter set the first at least one set of values and the second at least one set of values; determining a first combination of a first set among the first at least one set of values and a second set of the second at least second set of values; determining a second combination of a third set among the first at least one set of values and a fourth set of the second at least second set of values; encoding in a header parameter set at least one first syntax element indicative of the first combination and at least one second syntax element indicative of the second combination; encoding the first slice header with a reference to the first combination; encoding the second slice header with a reference to the second combination.

According to a third aspect, there is provided a method comprising: encoding a first uncompressed picture into a first coded picture comprising a first slice and encoding a second uncompressed picture into a second coded picture comprising a second slice; the first slice and the second slice comprising a first slice header and a second slice header, respectively, both conforming to a slice header syntax structure; the encoding comprising: classifying syntax elements for the slice header syntax structure into a first set and a second set; determining a first at least one set of values for the first set and a second at least one set of values for the at least one second set; encoding in a header parameter set the first at least one set of values and the second at least one set of values; determining a first combination of a first set among the first at least one set of values and a second set of the second at least second set of values; determining a second combination of a third set among the first at least one set of values and a fourth set of the second at least second set of values; encoding in a header parameter set at least one first syntax element indicative of the first combination and at least one second syntax element indicative of the second combination; encoding the first slice header so that the use of said first combination for decoding of the slice data can be determined from other slice header syntax elements than a reference to the first combination, and omitting a reference to the first combination from the slice header; encoding the second slice header so that the use of said second combination for decoding of the slice data can be determined from other slice header syntax elements than a reference to the second combination, and omitting a reference to the second combination from the slice header.

According to a fourth aspect, there is provided a method comprising: decoding from a video bitstream a plurality of syntax element assignments, each syntax element assignment relating to a subset of parameters of a parameter set, and each syntax element assignment comprising assignments of values to said related subset of parameters, decoding from said video bitstream an index for each of said plurality of syntax element assignments, decoding from said video bitstream a plurality of combination parameter sets, each combination parameter set comprising indexes of a plurality of said syntax element assignments of said sub-sets of parameters, decoding from said video bitstream at least one said combination parameter set for determining parameter values for video decoding.

According to a fifth aspect, there is provided a method comprising: decoding from a video bitstream a first coded picture comprising a first slice into a first uncompressed picture and decoding from said video bitstream a second coded picture comprising a second slice into a second uncompressed picture; the first slice and the second slice comprising a first slice header and a second slice header, respectively, both conforming to a slice header syntax structure; the decoding comprising: decoding from a header parameter set a first at least one set of values of a first set of syntax elements of a slice header syntax structure and a second at least one set of values of a second set of syntax elements of said slice header syntax structure; decoding a first combination of a first set among the first at least one set of values and a second set of the second at least second set of values; decoding a second combination of a third set among the first at least one set of values and a fourth set of the second at least second set of values; decoding from a header parameter set at least one first syntax element indicative of the first combination and at least one second syntax element indicative of the second combination; decoding a reference to the first combination from the first slice header; decoding a reference to the second combination from the second slice header.

According to a sixth aspect, there is provided a method comprising: decoding from a video bitstream a first coded picture comprising a first slice into a first uncompressed picture and decoding from said video bitstream a second coded picture comprising a second slice into a second uncompressed picture; the first slice and the second slice comprising a first slice header and a second slice header, respectively, both conforming to a slice header syntax structure; the decoding comprising: decoding from a header parameter set a first at least one set of values of a first set of syntax elements of a slice header syntax structure and a second at least one set of values of a second set of syntax elements of said slice header syntax structure; decoding a first combination of a first set among the first at least one set of values and a second set of the second at least second set of values; decoding a second combination of a third set among the first at least one set of values and a fourth set of the second at least second set of values; decoding from a header parameter set at least one first syntax element indicative of the first combination and at least one second syntax element indicative of the second combination; decoding from the first slice header the use of said first combination for decoding of the slice data, the decoding being done from other slice header syntax elements than a reference to the first combination; decoding from the second slice header the use of said second combination for decoding of the slice data, the decoding being done from other slice header syntax elements than a reference to the second combination.

According to a seventh aspect, there is provided an apparatus comprising at least one processor and memory, said memory containing computer program code, said computer program code being configured to, when executed on the at least one processor, cause the apparatus to: form a plurality of syntax element assignments, each syntax element assignment relating to a subset of parameters of a parameter set, and each syntax element assignment comprising assignments of values to said related subset of parameters, form an index for each of said plurality of syntax element assignments, form a plurality of combination parameter sets, each combination parameter set comprising indexes of a plurality of said syntax element assignments of said sub-sets of parameters, encode at least one said combination parameter set into a video bitstream for determining parameter values for video decoding.

According to an eighth aspect, there is provided an apparatus comprising at least one processor and memory, said memory containing computer program code, said computer program code being configured to, when executed on the at least one processor, cause the apparatus to: decode from a video bitstream a plurality of syntax element assignments, each syntax element assignment relating to a subset of parameters of a parameter set, and each syntax element assignment comprising assignments of values to said related subset of parameters, decode from said video bitstream an index for each of said plurality of syntax element assignments, decode from said video bitstream a plurality of combination parameter sets, each combination parameter set comprising indexes of a plurality of said syntax element assignments of said sub-sets of parameters, decode from said video bitstream at least one said combination parameter set for determining parameter values for video decoding.

According to a ninth aspect, there is provided an encoder comprising at least one processor and memory, said memory containing computer program code, said computer program code being configured to, when executed on the at least one processor, cause the encoder to: form a plurality of syntax element assignments, each syntax element assignment relating to a subset of parameters of a parameter set, and each syntax element assignment comprising assignments of values to said related subset of parameters, form an index for each of said plurality of syntax element assignments, form a plurality of combination parameter sets, each combination parameter set comprising indexes of a plurality of said syntax element assignments of said sub-sets of parameters, encode at least one said combination parameter set into a video bitstream for determining parameter values for video decoding.

According to an tenth aspect, there is provided a decoder comprising at least one processor and memory, said memory containing computer program code, said computer program code being configured to, when executed on the at least one processor, cause the encoder to: decode from a video bitstream a plurality of syntax element assignments, each syntax element assignment relating to a subset of parameters of a parameter set, and each syntax element assignment comprising assignments of values to said related subset of parameters, decode from said video bitstream an index for each of said plurality of syntax element assignments, decode from said video bitstream a plurality of combination parameter sets, each combination parameter set comprising indexes of a plurality of said syntax element assignments of said sub-sets of parameters, decode from said video bitstream at least one said combination parameter set for determining parameter values for video decoding.

According to an eleventh aspect, there is provided a computer program product embodied on a non-transitory computer readable media, said computer program product including one or more sequences of one or more instructions which, when executed by one or more processors, cause an apparatus or module to at least perform the following: form a plurality of syntax element assignments, each syntax element assignment relating to a subset of parameters of a parameter set, and each syntax element assignment comprising assignments of values to said related subset of parameters, form an index for each of said plurality of syntax element assignments, form a plurality of combination parameter sets, each combination parameter set comprising indexes of a plurality of said syntax element assignments of said sub-sets of parameters, encode at least one said combination parameter set into a video bitstream for determining parameter values for video decoding.

According to a twelfth aspect, there is provided a computer program product embodied on a non-transitory computer readable media, said computer program product including one or more sequences of one or more instructions which, when executed by one or more processors, cause an apparatus or module to at least perform the following: decode from a video bitstream a plurality of syntax element assignments, each syntax element assignment relating to a subset of parameters of a parameter set, and each syntax element assignment comprising assignments of values to said related subset of parameters, decode from said video bitstream an index for each of said plurality of syntax element assignments, decode from said video bitstream a plurality of combination parameter sets, each combination parameter set comprising indexes of a plurality of said syntax element assignments of said sub-sets of parameters, decode from said video bitstream at least one said combination parameter set for determining parameter values for video decoding.

According to a thirteenth aspect, there is provided an encoder comprising: means for forming a plurality of syntax element assignments, each syntax element assignment relating to a subset of parameters of a parameter set, and each syntax element assignment comprising assignments of values to said related subset of parameters, means for forming an index for each of said plurality of syntax element assignments, means for forming a plurality of combination parameter sets, each combination parameter set comprising indexes of a plurality of said syntax element assignments of said sub-sets of parameters, means for encoding at least one said combination parameter set into a video bitstream for determining parameter values for video decoding.

According to a fourteenth aspect, there is provided a decoder comprising: means for decoding from a video bitstream a plurality of syntax element assignments, each syntax element assignment relating to a subset of parameters of a parameter set, and each syntax element assignment comprising assignments of values to said related subset of parameters, means for decoding from said video bitstream an index for each of said plurality of syntax element assignments, means for decoding from said video bitstream a plurality of combination parameter sets, each combination parameter set comprising indexes of a plurality of said syntax element assignments of said sub-sets of parameters, means for decoding from said video bitstream at least one said combination parameter set for determining parameter values for video decoding.

According to an embodiment, a combination parameter set index for each of said plurality of combination parameter sets is used, and at least one said combination parameter set index is encoded into or decoded from a video bitstream for determining parameter values for video decoding. According to an embodiment, a combination parameter set to be used is determined according to picture parameters, and an indication in the video bitstream is used for indicating that a combination parameter set index is not encoded into slice headers of the video bitstream, and that the combination parameter set to be used is to be determined from picture parameters. According to an embodiment, the a combination parameter set to be used is determined from a picture order count syntax element. Different embodiments may also be used together, for example, a combination parameter set index may be present in the video bitstream, and/or the combination parameter set to be used may be determined together from an index in the bitstream and from other parameters, and/or the various ways of determining the combination parameter set to be used may be utilized for various parts of the video bitstream, e.g. so that the method to determine the combination parameter set to be used is indicated by an indicator in the bitstream.

Further examples of embodiments are provided at the end of the detailed description.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME EXAMPLE EMBODIMENTS

Figure 1:
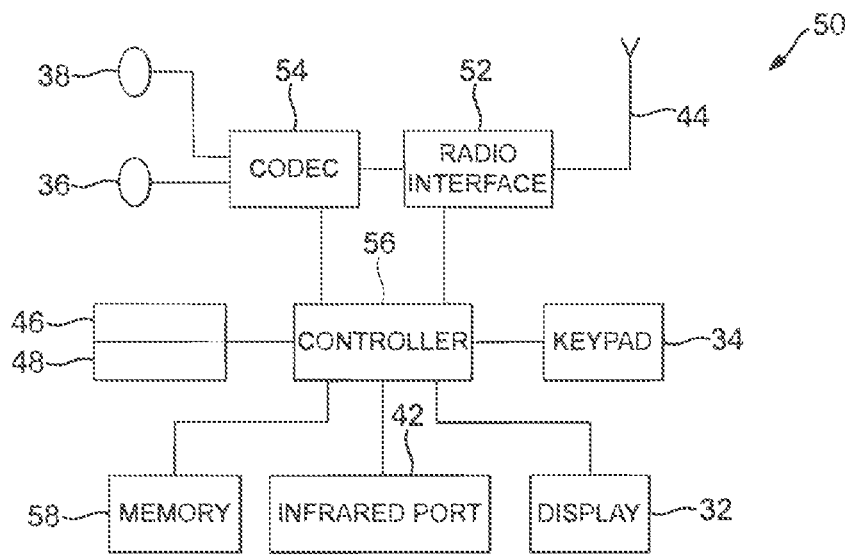
FIG. 1 shows a block diagram of a video coding system according to an example embodiment.

In the following, several embodiments of the invention will be described in the context of one video coding arrangement. It is to be noted, however, that the invention is not limited to this particular arrangement. In fact, the different embodiments have applications widely in any environment where improvement of reference picture handling is required. For example, the invention may be applicable to video coding systems like streaming systems, DVD players, digital television receivers, personal video recorders, systems and computer programs on personal computers, handheld computers and communication devices, as well as network elements such as transcoders and cloud computing arrangements where video data is handled.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, each integrating new extensions or features to the specification. These extensions include Scalable Video Coding (SVC) and Multiview Video Coding (MVC).

The High Efficiency Video Coding (which may be abbreviated HEVC or H.265/HEVC) standard was developed by the Joint Collaborative Team-Video Coding (JCT-VC) of VCEG and MPEG. Currently, the prepared version of the H.265/HEVC standard is being approved in ISO/IEC and ITU-T. The final standard will be published by both parent standardization organizations, and it is referred to as ITU-T Recommendation H.265 and ISO/IEC International Standard 23008-2, also known as MPEG-H Part 2 High Efficiency Video Coding (HEVC). There are currently ongoing standardization projects to develop extensions to H.265/HEVC, including scalable, multiview, three-dimensional, and fidelity range extensions, which may be referred to as SHVC, MV-HEVC, 3D-HEVC, and REXT, respectively. The references in this description to H.265/HEVC, SHVC, MV-HEVC, 3D-HEVC and REXT that have been made for the purpose of understanding definitions, structures or concepts of these standard specifications are to be understood to be references to the latest versions of these standards that were available before the date of this application, unless otherwise indicated.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in the current working draft of HEVC—hence, they are described below jointly. The aspects of the invention are not limited to H.264/AVC or HEVC, but rather the description is given for one possible basis on top of which the invention may be partly or fully realized.

When describing H.264/AVC and HEVC as well as in example embodiments, common notation for arithmetic operators, logical operators, relational operators, bit-wise operators, assignment operators, and range notation e.g. as specified in H.264/AVC or HEVC may be used. Furthermore, common mathematical functions e.g. as specified in H.264/AVC or HEVC may be used and a common order of precedence and execution order (from left to right or from right to left) of operators e.g. as specified in H.264/AVC or HEVC may be used.

Some definitions used in codecs according to the invention may be made as follows:

syntax element: An element of data represented in the bitstream.

syntax structure: Zero or more syntax elements present together in the bitstream in a specified order.

parameter: A syntax element of a parameter set.

parameter set: A syntax structure which contains parameters and which can be referred to from another syntax structure for example using an identifier.

picture parameter set: A syntax structure containing syntax elements that apply to zero or more entire coded pictures as determined by a syntax element found in each slice header.

sequence parameter set: A syntax structure containing syntax elements that apply to zero or more entire coded video sequences as determined by a syntax element found in the picture parameter set referred to by another syntax element found in each slice header.

slice: a coding unit containing an integer number of elementary coding units within a coded picture.

elementary coding unit: a unit according to which a picture can be partitioned in slices; for example in some schemes, macroblocks or macroblock pairs within a coded picture; for example in some schemes, coding tree units.

slice header: A part of a coded slice containing the data elements pertaining to the first or all elementary coding units represented in the slice.

coded picture: A coded representation of a picture. A coded picture may be either a coded field or a coded frame.

coded representation: A data element as represented in its coded form.

When describing H.264/AVC and HEVC as well as in example embodiments, the following descriptors may be used to specify the parsing process of each syntax element.

b(8): byte having any pattern of bit string (8 bits).

se(v): signed integer Exp-Golomb-coded syntax element with the left bit first.

u(n): unsigned integer using n bits. When n is "v" in the syntax table, the number of bits varies in a manner dependent on the value of other syntax elements. The parsing process for this descriptor is specified by n next bits from the bitstream interpreted as a binary representation of an unsigned integer with the most significant bit written first.

ue(v): unsigned integer Exp-Golomb-coded syntax element with the left bit first.

An Exp-Golomb bit string may be converted to a code number (codeNum) for example using the following table:

| Bit string | codeNum |
| --- | --- |
| 1 | 0 |
| 0 1 0 | 1 |
| 0 1 1 | 2 |
| 0 0 1 0 0 | 3 |
| 0 0 1 0 1 | 4 |
| 0 0 1 1 0 | 5 |
| 0 0 1 1 1 | 6 |
| 0 0 0 1 0 0 0 | 7 |
| 0 0 0 1 0 0 1 | 8 |
| 0 0 0 1 0 1 0 | 9 |
| . . . | . . . |

A code number corresponding to an Exp-Golomb bit string may be converted to se(v) for example using the following table:

| codeNum | syntax element value |
|---------|----------------------|
| 0       | 0                    |
| 1       | 1                    |
| 2       | −1                   |
| 3       | 2                    |
| 4       | −2                   |
| 5       | 3                    |
| 6       | −3                   |
| ...     | ...                  |

When describing H.264/AVC and HEVC as well as in example embodiments, syntax structures, semantics of syntax elements, and decoding process may be specified as follows. Syntax elements in the bitstream may be represented in bold type. Each syntax element is described by its name (all lower case letters with underscore characters), optionally its one or two syntax categories, and one or more descriptors for its method of coded representation. The decoding process behaves according to the value of the syntax element and to the values of previously decoded syntax elements. When a value of a syntax element is used in the syntax tables or the text, it may appear in regular (i.e., not bold) type. In some cases the syntax tables may use the values of other variables derived from syntax elements values. Such variables may appear in the syntax tables, or text, named by a mixture of lower case and upper case letter and without any underscore characters. Variables starting with an upper case letter may be derived for the decoding of the current syntax structure and all depending syntax structures. Variables starting with an upper case letter may be used in the decoding process for later syntax structures without mentioning the originating syntax structure of the variable. Variables starting with a lower case letter may be used within the context in which they are derived but not outside it. In some cases, "mnemonic" names for syntax element values or variable values are used interchangeably with their numerical values. Sometimes "mnemonic" names are used without any associated numerical values. The association of values and names is specified in the text. The names may be constructed from one or more groups of letters separated by an underscore character. Each group may start with an upper case letter and may contain more upper case letters.

When describing H.264/AVC and HEVC as well as in example embodiments, a syntax structure may be specified using the following. A group of statements enclosed in curly brackets is a compound statement and may be treated functionally as a single statement. A "while" structure specifies a test of whether a condition is true, and if true, specifies evaluation of a statement (or compound statement) repeatedly until the condition is no longer true. A "do . . . while" structure specifies evaluation of a statement once, followed by a test of whether a condition is true, and if true, specifies repeated evaluation of the statement until the condition is no longer true. An "if . . . else" structure specifies a test of whether a condition is true, and if the condition is true, specifies evaluation of a primary statement, otherwise, specifies evaluation of an alternative statement. The "else" part of the structure and the associated alternative statement is omitted if no alternative statement evaluation is needed. A "for" structure specifies evaluation of an initial statement, followed by a test of a condition, and if the condition is true, specifies repeated evaluation of a primary statement followed by a subsequent statement until the condition is no longer true.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

The elementary unit for the input to an H.264/AVC or HEVC encoder and the output of an H.264/AVC or HEVC decoder, respectively, is a picture. A picture given as an input to an encoder may also be referred to as a source picture, and a picture decoded by a decoder may be referred to as a decoded picture. Encoding a picture is a process that results in a coded picture, that is, a sequence of bits or a coded representation of a picture. A coded picture may be regarded as a bitstream or a part of a bitstream, the bitstream containing encoded information that is used for decoding the picture at the decoder. Encoding information in a bitstream is a process that results in a coded representation of said information in the bitstream, e.g. a syntax element represented by b(8), se(v), ue(v), or u(n), described above. For example, referring back to examples provided earlier, a syntax element having a value of 3, and coded by Exp-Golomb coding, would be represented by bits "00111" in the bitstream. When encoding a picture, the picture being encoded may be fully or partly held e.g. in working memory of the encoder, and the resulting coded picture may be fully or partly held in the working memory, as well. The bitstream resulting from encoding syntax elements may be achieved so that the syntax elements are first formed into the memory of the encoder, and then encoded to pieces of bitstream that are also held in the encoder memory. The resulting bitstream may be checked for correctness, e.g. by ensuring that bit patterns that match start codes (e.g. NAL unit start codes) have not been formed (e.g. within NAL units) in the bitstream. At the decoder, the bitstream may be fully or partly held in the memory for decoding, and by decoding the bitstream, syntax elements are formed in the decoder memory, which syntax elements are in turn used to obtain the decoded picture.

The source and decoded pictures may each be comprised of one or more sample arrays, such as one of the following sets of sample arrays:

Luma (Y) only (monochrome).
Luma and two chroma (YCbCr or YCgCo).
Green, Blue and Red (GBR, also known as RGB).
Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use may be indicated e.g. in a coded bitstream e.g. using the Video Usability Information (VUI) syntax of H.264/AVC and/or HEVC. A component may be defined as an array or a single sample from one of the three sample arrays (luma and two chroma) or the array or a single sample of the array that compose a picture in monochrome format.

In H.264/AVC and HEVC, a picture may either be a frame or a field. A frame comprises a matrix of luma samples and possibly the corresponding chroma samples. A field is a set of alternate sample rows of a frame and may be used as encoder input, when the source signal is interlaced. Chroma pictures may be subsampled when compared to luma pictures. For example, in the 4:2:0 sampling pattern the spatial resolution of chroma pictures is half of that of the luma picture along both coordinate axes.

A partitioning may be defined as a division of a set into subsets such that each element of the set is in exactly one of the subsets. A picture partitioning may be defined as a division of a picture into smaller non-overlapping units. A block partitioning may be defined as a division of a block into smaller non-overlapping units, such as sub-blocks. In some cases term block partitioning may be considered to cover multiple levels of partitioning, for example partitioning of a picture into slices, and partitioning of each slice into smaller units, such as macroblocks of H.264/AVC. It is noted that the same unit, such as a picture, may have more than one partitioning. For example, a coding unit of a draft HEVC standard may be partitioned into prediction units and separately by another quadtree into transform units.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

During the course of HEVC standardization the terminology for example on picture partitioning units has evolved. In the next paragraphs, some non-limiting examples of HEVC terminology are provided.

In one draft version of the HEVC standard, pictures are divided into coding units (CU) covering the area of the picture. A CU consists of one or more prediction units (PU) defining the prediction process for the samples within the CU and one or more transform units (TU) defining the prediction error coding process for the samples in the CU. Typically, a CU consists of a square block of samples with a size selectable from a predefined set of possible CU sizes. A CU with the maximum allowed size is typically named as LCU (largest coding unit) and the video picture is divided into non-overlapping LCUs. An LCU can be further split into a combination of smaller CUs, e.g. by recursively splitting the LCU and resultant CUs. Each resulting CU typically has at least one PU and at least one TU associated with it. Each PU and TU can further be split into smaller PUs and TUs in order to increase granularity of the prediction and prediction error coding processes, respectively. The PU splitting can be realized by splitting the CU into four equal size square PUs or splitting the CU into two rectangle PUs vertically or horizontally in a symmetric or asymmetric way. The division of the image into CUs, and division of CUs into PUs and TUs is typically signalled in the bitstream allowing the decoder to reproduce the intended structure of these units.

In a draft HEVC standard, a picture can be partitioned in tiles, which are rectangular and contain an integer number of LCUs. In a draft of HEVC, the partitioning to tiles forms a regular grid, where heights and widths of tiles differ from each other by one LCU at the maximum. In a draft HEVC, a slice consists of an integer number of CUs. The CUs are scanned in the raster scan order of LCUs within tiles or within a picture, if tiles are not in use. Within an LCU, the CUs have a specific scan order.

In a Working Draft (WD) 5 of HEVC, some key definitions and concepts for picture partitioning are defined as follows. A partitioning is defined as the division of a set into subsets such that each element of the set is in exactly one of the subsets.

A basic coding unit in a draft HEVC is a treeblock. A treeblock is an N×N block of luma samples and two corresponding blocks of chroma samples of a picture that has three sample arrays, or an N×N block of samples of a monochrome picture or a picture that is coded using three separate colour planes. A treeblock may be partitioned for different coding and decoding processes. A treeblock partition is a block of luma samples and two corresponding blocks of chroma samples resulting from a partitioning of a treeblock for a picture that has three sample arrays or a block of luma samples resulting from a partitioning of a treeblock for a monochrome picture or a picture that is coded using three separate colour planes. Each treeblock is assigned a partition signalling to identify the block sizes for intra or inter prediction and for transform coding. The partitioning is a recursive quadtree partitioning. The root of the quadtree is associated with the treeblock. The quadtree is split until a leaf is reached, which is referred to as the coding node. The coding node is the root node of two trees, the prediction tree and the transform tree. The prediction tree specifies the position and size of prediction blocks. The prediction tree and associated prediction data are referred to as a prediction unit. The transform tree specifies the position and size of transform blocks. The transform tree and associated transform data are referred to as a transform unit. The splitting information for luma and chroma is identical for the prediction tree and may or may not be identical for the transform tree. The coding node and the associated prediction and transform units form together a coding unit.

In a draft HEVC, pictures are divided into slices and tiles. A slice may be a sequence of treeblocks but (when referring to a so-called fine granular slice) may also have its boundary within a treeblock at a location where a transform unit and prediction unit coincide. The fine granular slice feature was included in some drafts of HEVC but is not included in the finalized HEVC standard. Treeblocks within a slice are coded and decoded in a raster scan order. The division of a picture into slices is a partitioning.

In a draft HEVC, a tile is defined as an integer number of treeblocks co-occurring in one column and one row, ordered consecutively in the raster scan within the tile. The division of a picture into tiles is a partitioning. Tiles are ordered consecutively in the raster scan within the picture. Although a slice contains treeblocks that are consecutive in the raster scan within a tile, these treeblocks are not necessarily consecutive in the raster scan within the picture. Slices and tiles need not contain the same sequence of treeblocks. A tile may comprise treeblocks contained in more than one slice. Similarly, a slice may comprise treeblocks contained in several tiles.

A distinction between coding units and coding treeblocks may be defined for example as follows. A slice may be defined as a sequence of one or more coding tree units (CTU) in raster-scan order within a tile or within a picture if tiles are not in use. Each CTU may comprise one luma coding treeblock (CTB) and possibly (depending on the chroma format being used) two chroma CTBs. A CTU may be defined as a coding tree block of luma samples, two corresponding coding tree blocks of chroma samples of a picture that has three sample arrays, or a coding tree block of samples of a monochrome picture or a picture that is coded using three separate colour planes and syntax structures used to code the samples. The division of a slice into coding tree units may be regarded as a partitioning. A CTB may be defined as an N×N block of samples for some value of N. The division of one of the arrays that compose a picture that has three sample arrays or of the array that compose a picture in monochrome format or a picture that is coded using three separate colour planes into coding tree blocks may be regarded as a partitioning. A coding block may be defined as an N×N block of samples for some value of N. The division of a coding tree block into coding blocks may be regarded as a partitioning.

In HEVC, a slice may be defined as an integer number of coding tree units contained in one independent slice segment and all subsequent dependent slice segments (if any) that precede the next independent slice segment (if any) within the same access unit. An independent slice segment may be defined as a slice segment for which the values of the syntax elements of the slice segment header are not inferred from the values for a preceding slice segment. A dependent slice segment may be defined as a slice segment for which the values of some syntax elements of the slice segment header are inferred from the values for the preceding independent slice segment in decoding order. In other words, only the independent slice segment may have a "full" slice header. An independent slice segment may be conveyed in one NAL unit (without other slice segments in the same NAL unit) and likewise a dependent slice segment may be conveyed in one NAL unit (without other slice segments in the same NAL unit).

In HEVC, a coded slice segment may be considered to comprise a slice segment header and slice segment data. A slice segment header may be defined as part of a coded slice segment containing the data elements pertaining to the first or all coding tree units represented in the slice segment. A slice header may be defined as the slice segment header of the independent slice segment that is a current slice segment or the most recent independent slice segment that precedes a current dependent slice segment in decoding order. Slice segment data may comprise an integer number of coding tree unit syntax structures.

In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring macroblock or CU may be regarded as unavailable for intra prediction, if the neighboring macroblock or CU resides in a different slice.

A syntax element may be defined as an element of data represented in the bitstream. A syntax structure may be defined as zero or more syntax elements present together in the bitstream in a specified order.

The elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not.

A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC and HEVC, the NAL unit header indicates the type of the NAL unit and whether a coded slice contained in the NAL unit is a part of a reference picture or a non-reference picture. H.264/AVC includes a 2-bit nal_ref_idc syntax element, which when equal to 0 indicates that a coded slice contained in the NAL unit is a part of a non-reference picture and when greater than 0 indicates that a coded slice contained in the NAL unit is a part of a reference picture. The NAL unit header for SVC and MVC NAL units may additionally contain various indications related to the scalability and multiview hierarchy.

In HEVC, a two-byte NAL unit header is used for all specified NAL unit types. The NAL unit header contains one reserved bit, a six-bit NAL unit type indication (called nal_unit_type), a six-bit reserved field (called nuh_layer_id) and a three-bit temporal_id_plus1 indication for temporal level. The temporal_id_plus1 syntax element may be regarded as a temporal identifier for the NAL unit, and a zero-based TemporalId variable may be derived as follows: TemporalId=temporal_id_plus1−1. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to TID does not use any picture having a TemporalId greater than TID as inter prediction reference. A sub-layer or a temporal sub-layer may be defined to be a temporal scalable layer of a temporal scalable bitstream, consisting of VCL NAL units with a particular value of the TemporalId variable and the associated non-VCL NAL units. Without loss of generality, in some example embodiments a variable LayerId is derived from the value of nuh_layer_id for example as follows: LayerId=nuh_layer_id. In the following, layer identifier, LayerId, nuh_layer_id and layer_id are used interchangeably unless otherwise indicated.

It is expected that in HEVC extensions nuh_layer_id and/or similar syntax elements in NAL unit header would carry information on the scalability hierarchy. For example, the LayerId value nuh_layer_id and/or similar syntax elements may be mapped to values of variables or syntax elements describing different scalability dimensions, such as quality_id or similar, dependency_id or similar, any other type of layer identifier, view order index or similar, view identifier, an indication whether the NAL unit concerns depth or texture i.e. depth_flag or similar, or an identifier similar to priority_id of SVC indicating a valid sub-bitstream extraction if all NAL units greater than a specific identifier value are removed from the bitstream. nuh_layer_id and/or similar syntax elements may be partitioned into one or more syntax elements indicating scalability properties. For example, a certain number of bits among nuh_layer_id and/or similar syntax elements may be used for dependency_id or similar, while another certain number of bits among nuh_layer_id and/or similar syntax elements may be used for quality_id or similar. Alternatively, a mapping of LayerId values or similar to values of variables or syntax elements describing different scalability dimensions may be provided for example in a Video Parameter Set, a Sequence Parameter Set or another syntax structure.

NAL units can be categorized into Video Coding Layer (VCL) NAL units and non-VCL NAL units. VCL NAL units are typically coded slice NAL units. In H.264/AVC, coded slice NAL units contain syntax elements representing one or more coded macroblocks, each of which corresponds to a block of samples in the uncompressed picture. In HEVC, coded slice NAL units contain syntax elements representing one or more CU.

In H.264/AVC a coded slice NAL unit can be indicated to be a coded slice in an Instantaneous Decoding Refresh (IDR) picture or coded slice in a non-IDR picture.

In HEVC, a VCL NAL unit can be indicated to be one of the following types.

Abbreviations for picture types may be defined as follows: trailing (TRAIL) picture, Temporal Sub-layer Access (TSA), Step-wise Temporal Sub-layer Access (STSA), Random Access Decodable Leading (RADL) picture, Random Access Skipped Leading (RASL) picture, Broken Link Access (BLA) picture, Instantaneous Decoding Refresh (IDR) picture, Clean Random Access (CRA) picture.

A Random Access Point (RAP) picture, which may also or alternatively be referred to as intra random access point (IRAP) picture, is a picture where each slice or slice segment has nal_unit_type in the range of 16 to 23, inclusive. A RAP picture contains only intra-coded slices (in an independently coded layer), and may be a BLA picture, a CRA picture or an IDR picture. The first picture in the bitstream is a RAP picture. Provided the necessary parameter sets are available when they need to be activated, the RAP picture and all subsequent non-RASL pictures in decoding order can be correctly decoded without performing the decoding process of any pictures that precede the RAP picture in decoding order. There may be pictures in a bitstream that contain only intra-coded slices that are not RAP pictures.

In HEVC, a CRA picture may be the first picture in the bitstream in decoding order, or may appear later in the bitstream. CRA pictures in HEVC allow so-called leading pictures that follow the CRA picture in decoding order but precede it in output order. Some of the leading pictures, so-called RASL pictures, may use pictures decoded before the CRA picture as a reference. Pictures that follow a CRA picture in both decoding and output order are decodable if random access is performed at the CRA picture, and hence

| nal_unit_type | Name of nal_unit_type | Content of NAL unit and RBSP syntax structure |
| --- | --- | --- |
| 0, 1 | TRAIL_N, TRAIL_R | Coded slice segment of a non-TSA, non-STSA trailing picture slice_segment_layer_rbsp( ) |
| 2, 3 | TSA_N, TSA_R | Coded slice segment of a TSA picture slice_segment_layer_rbsp( ) |
| 4, 5 | STSA_N, STSA_R | Coded slice segment of an STSA picture slice_layer_rbsp( ) |
| 6, 7 | RADL_N, RADL_R | Coded slice segment of a RADL picture slice_layer_rbsp( ) |
| 8, 9 | RASL_N, RASL_R, | Coded slice segment of a RASL picture slice_layer_rbsp( ) |
| 10, 12, 14 | RSV_VCL_N10 RSV_VCL_N12 RSV_VCL_N14 | Reserved // reserved non-IRAP non-reference VCL NAL unit types |
| 11, 13, 15 | RSV_VCL_R11 RSV_VCL_R13 RSV_VCL_R15 | Reserved // reserved non-IRAP reference VCL NAL unit types |
| 16, 17, 18 | BLA_W_LP BLA_W_DLP BLA_N_LP | Coded slice segment of a BLA picture slice_segment_layer_rbsp( ) |
| 19, 20 | IDR_W_DLP IDR_N_LP | Coded slice segment of an IDR picture slice_segment_layer_rbsp( ) |
| 21 | CRA_NUT | Coded slice segment of a CRA picture slice_segment_layer_rbsp( ) |
| 22, 23 | RSV_IRAP_VCL22 . . . RSV_IRAP_VCL23 | Reserved // reserved IRAP VCL NAL unit types |
| 24 . . . 31 | RSV_VCL24 . . . RSV_VCL31 | Reserved // reserved non-IRAP VCL NAL unit types | clean random access is achieved similarly to the clean random access functionality of an IDR picture.

A CRA picture may have associated RADL or RASL pictures. When a CRA picture is the first picture in the bitstream in decoding order, the CRA picture is the first picture of a coded video sequence in decoding order, and any associated RASL pictures are not output by the decoder and may not be decodable, as they may contain references to pictures that are not present in the bitstream.

A leading picture is a picture that precedes the associated RAP picture in output order. The associated RAP picture is the previous RAP picture in decoding order (if present). A leading picture may either be a RADL picture or a RASL picture.

All RASL pictures are leading pictures of an associated BLA or CRA picture. When the associated RAP picture is a BLA picture or is the first coded picture in the bitstream, the RASL picture is not output and may not be correctly decodable, as the RASL picture may contain references to pictures that are not present in the bitstream. However, a RASL picture can be correctly decoded if the decoding had started from a RAP picture before the associated RAP picture of the RASL picture. RASL pictures are not used as reference pictures for the decoding process of non-RASL pictures. When present, all RASL pictures precede, in decoding order, all trailing pictures of the same associated RAP picture. In some drafts of the HEVC standard, a RASL picture was referred to a Tagged for Discard (TFD) picture.

All RADL pictures are leading pictures. RADL pictures are not used as reference pictures for the decoding process of trailing pictures of the same associated RAP picture. When present, all RADL pictures precede, in decoding order, all trailing pictures of the same associated RAP picture. RADL pictures do not refer to any picture preceding the associated RAP picture in decoding order and can therefore be correctly decoded when the decoding starts from the associated RAP picture. In some earlier drafts of the HEVC standard, a RADL picture was referred to a Decodable Leading Picture (DLP).

Decodable leading pictures may be such that can be correctly decoded when the decoding is started from the CRA picture. In other words, decodable leading pictures use only the initial CRA picture or subsequent pictures in decoding order as reference in inter prediction. Non-decodable leading pictures are such that cannot be correctly decoded when the decoding is started from the initial CRA picture. In other words, non-decodable leading pictures use pictures prior, in decoding order, to the initial CRA picture as references in inter prediction.

When a part of a bitstream starting from a CRA picture is included in another bitstream, the RASL pictures associated with the CRA picture might not be correctly decodable, because some of their reference pictures might not be present in the combined bitstream. To make such a splicing operation straightforward, the NAL unit type of the CRA picture can be changed to indicate that it is a BLA picture. The RASL pictures associated with a BLA picture may not be correctly decodable hence are not be output/displayed. Furthermore, the RASL pictures associated with a BLA picture may be omitted from decoding.

A BLA picture may be the first picture in the bitstream in decoding order, or may appear later in the bitstream. Each BLA picture begins a new coded video sequence, and has similar effect on the decoding process as an IDR picture. However, a BLA picture contains syntax elements that specify a non-empty reference picture set. When a BLA picture has nal_unit_type equal to BLA_W_LP, it may have associated RASL pictures, which are not output by the decoder and may not be decodable, as they may contain references to pictures that are not present in the bitstream. When a BLA picture has nal_unit_type equal to BLA_W_LP, it may also have associated RADL pictures, which are specified to be decoded. When a BLA picture has nal_unit_type equal to BLA_W_DLP, it does not have associated RASL pictures but may have associated RADL pictures, which are specified to be decoded. BLA_W_DLP may also be referred to as BLA_W_RADL. When a BLA picture has nal_unit_type equal to BLA_N_LP, it does not have any associated leading pictures.

An IDR picture having nal_unit_type equal to IDR_N_LP does not have associated leading pictures present in the bitstream. An IDR picture having nal_unit_type equal to IDR_W_DLP does not have associated RASL pictures present in the bitstream, but may have associated RADL pictures in the bitstream. IDR_W_DLP may also be referred to as IDR_W_RADL.

In HEVC, there are two NAL unit types for many picture types (e.g. TRAIL_R, TRAIL_N), differentiated whether the picture may be used as reference for inter prediction in subsequent pictures in decoding order in the same sub-layer. Sub-layer non-reference picture (often denoted by _N in the picture type acronyms) may be defined as picture that contains samples that cannot be used for inter prediction in the decoding process of subsequent pictures of the same sub-layer in decoding order. Sub-layer non-reference pictures may be used as reference for pictures with a greater TemporalId value. Sub-layer reference picture (often denoted by _R in the picture type acronyms) may be defined as picture that may be used as reference for inter prediction in the decoding process of subsequent pictures of the same sub-layer in decoding order.

When the value of nal_unit_type is equal to TRAIL_N, TSA_N, STSA_N, RADL_N, RASL_N, RSV_VCL_N10, RSV_VCL_N12, or RSV_VCL_N14, the decoded picture is not used as a reference for any other picture of the same nuh_layer_id and temporal sub-layer. That is, in the HEVC standard, when the value of nal_unit_type is equal to TRAIL_N, TSA_N, STSA_N, RADL_N, RASL_N, RSV_VCL_N10, RSV_VCL_N12, or RSV_VCL_N14, the decoded picture is not included in any of RefPicSetStCurrBefore, RefPicSetStCurrAfter and RefPicSetLtCurr of any picture with the same value of TemporalId. A coded picture with nal_unit_type equal to TRAIL_N, TSA_N, STSA_N, RADL_N, RASL_N, RSV_VCL_N10, RSV_VCL_N12, or RSV_VCL_N14 may be discarded without affecting the decodability of other pictures with the same value of nuh_layer_id and TemporalId.

Pictures of any coding type (I, P, B) can be reference pictures or non-reference pictures in H.264/AVC and HEVC. Slices within a picture may have different coding types.

A trailing picture may be defined as a picture that follows the associated RAP picture in output order. Any picture that is a trailing picture does not have nal_unit_type equal to RADL_N, RADL_R, RASL_N or RASL_R. Any picture that is a leading picture may be constrained to precede, in decoding order, all trailing pictures that are associated with the same RAP picture. No RASL pictures are present in the bitstream that are associated with a BLA picture having nal_unit_type equal to BLA_W_DLP or BLA_N_LP. No RADL pictures are present in the bitstream that are associated with a BLA picture having nal_unit_type equal to BLA_N_LP or that are associated with an IDR picture having nal_unit_type equal to IDR_N_LP. Any RASL picture associated with a CRA or BLA picture may be constrained to precede any RADL picture associated with the CRA or BLA picture in output order. Any RASL picture associated with a CRA picture may be constrained to follow, in output order, any other RAP picture that precedes the CRA picture in decoding order.

In HEVC there are two picture types, the TSA and STSA picture types, that can be used to indicate temporal sub-layer switching points. If temporal sub-layers with TemporalId up to N had been decoded until the TSA or STSA picture (exclusive) and the TSA or STSA picture has TemporalId equal to N+1, the TSA or STSA picture enables decoding of all subsequent pictures (in decoding order) having TemporalId equal to N+1. The TSA picture type may impose restrictions on the TSA picture itself and all pictures in the same sub-layer that follow the TSA picture in decoding order. None of these pictures is allowed to use inter prediction from any picture in the same sub-layer that precedes the TSA picture in decoding order. The TSA definition may further impose restrictions on the pictures in higher sub-layers that follow the TSA picture in decoding order. None of these pictures is allowed to refer a picture that precedes the TSA picture in decoding order if that picture belongs to the same or higher sub-layer as the TSA picture. TSA pictures have TemporalId greater than 0. The STSA is similar to the TSA picture but does not impose restrictions on the pictures in higher sub-layers that follow the STSA picture in decoding order and hence enable up-switching only onto the sub-layer where the STSA picture resides.

In scalable and/or multiview video coding, at least the following principles for encoding pictures and/or access units with random access property may be supported.

- A RAP picture within a layer may be an intra-coded picture without inter-layer/inter-view prediction. Such a picture enables random access capability to the layer/view it resides.
- A RAP picture within an enhancement layer may be a picture without inter prediction (i.e. temporal prediction) but with inter-layer/inter-view prediction allowed. Such a picture enables starting the decoding of the layer/view the picture resides provided that all the reference layers/views are available. In single-loop decoding, it may be sufficient if the coded reference layers/views are available (which can be the case e.g. for IDR pictures having dependency_id greater than 0 in SVC). In multi-loop decoding, it may be needed that the reference layers/views are decoded. Such a picture may, for example, be referred to as a stepwise layer access (STLA) picture or an enhancement layer RAP picture.
- An anchor access unit or a complete RAP access unit may be defined to include only intra-coded picture(s) and STLA pictures in all layers. In multi-loop decoding, such an access unit enables random access to all layers/views. An example of such an access unit is the MVC anchor access unit (among which type the IDR access unit is a special case).
- A stepwise RAP access unit may be defined to include a RAP picture in the base layer but need not contain a RAP picture in all enhancement layers. A stepwise RAP access unit enables starting of base-layer decoding, while enhancement layer decoding may be started when the enhancement layer contains a RAP picture, and (in the case of multi-loop decoding) all its reference layers/views are decoded at that point.

In a scalable extension of HEVC or any scalable extension for a single-layer coding scheme similar to HEVC, RAP pictures may be specified to have one or more of the following properties.

- NAL unit type values of the RAP pictures with nuh_layer_id greater than 0 may be used to indicate enhancement layer random access points.
- An enhancement layer RAP picture may be defined as a picture that enables starting the decoding of that enhancement layer when all its reference layers have been decoded prior to the EL RAP picture.
- Inter-layer prediction may be allowed for CRA NAL units with nuh_layer_id greater than 0, while inter prediction is disallowed.
- CRA NAL units need not be aligned across layers. In other words, a CRA NAL unit type can be used for all VCL NAL units with a particular value of nuh_layer_id while another NAL unit type can be used for all VCL NAL units with another particular value of nuh_layer_id in the same access unit.
- BLA pictures have nuh_layer_id equal to 0.
- IDR pictures may have nuh_layer_id greater than 0 and they may be inter-layer predicted while inter prediction is disallowed.
- IDR pictures are present in an access unit either in no layers or in all layers, i.e. an IDR nal_unit_type indicates a complete IDR access unit where decoding of all layers can be started.
- An STLA picture (STLA_W_DLP and STLA_N_LP) may be indicated with NAL unit types BLA_W_DLP and BLA_N_LP, respectively, with nuh_layer_id greater than 0. An STLA picture may be otherwise identical to an IDR picture with nuh_layer_id greater than 0 but needs not be aligned across layers.
- After a BLA picture at the base layer, the decoding of an enhancement layer is started when the enhancement layer contains a RAP picture and the decoding of all of its reference layers has been started.
- When the decoding of an enhancement layer starts from a CRA picture, its RASL pictures are handled similarly to RASL pictures of a BLA picture.
- Layer down-switching or unintentional loss of reference pictures is identified from missing reference pictures, in which case the decoding of the related enhancement layer continues only from the next RAP picture on that enhancement layer.

A non-VCL NAL unit may be for example one of the following types: a sequence parameter set, a picture parameter set, a supplemental enhancement information (SEI) NAL unit, an access unit delimiter, an end of sequence NAL unit, an end of stream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be essential to the decoding process, the sequence parameter set may optionally contain video usability information (VUI), which includes parameters that may be important for buffering, picture output timing, rendering, and resource reservation. There are three NAL units specified in H.264/AVC to carry sequence parameter sets: the sequence parameter set NAL unit containing all the data for H.264/AVC VCL NAL units in the sequence, the sequence parameter set extension NAL unit containing the data for auxiliary coded pictures, and the subset sequence parameter set for MVC and SVC VCL NAL units. A picture parameter set contains such parameters that are likely to be unchanged in several coded pictures.

In a draft HEVC, there was also another type of parameter sets, here referred to as Adaptation Parameter Set (APS), which includes parameters that are likely to be unchanged in several coded slices. In a draft HEVC, the APS syntax structure includes parameters or syntax elements related to context-based adaptive binary arithmetic coding (CABAC), adaptive sample offset, adaptive loop filtering, and deblocking filtering. In a draft HEVC, an APS is a NAL unit and coded without reference or prediction from any other NAL unit. An identifier, referred to as aps_id syntax element, is included in APS NAL unit, and included and used in the slice header to refer to a particular APS. However, APS was not included in the final H.265/HEVC standard.

H.265/HEVC also includes another type of a parameter set, called a video parameter set (VPS). A video parameter set RBSP may include parameters that can be referred to by one or more sequence parameter set RBSPs.

The relationship and hierarchy between video parameter set (VPS), sequence parameter set (SPS), and picture parameter set (PPS) may be described as follows. VPS resides one level above SPS in the parameter set hierarchy and in the context of scalability and/or 3DV. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. In a scalable extension of HEVC, VPS may for example include a mapping of the LayerId value derived from the NAL unit header to one or more scalability dimension values, for example correspond to dependency_id, quality_id, view_id, and depth_flag for the layer defined similarly to SVC and MVC. VPS may include profile and level information for one or more layers as well as the profile and/or level for one or more temporal sub-layers (consisting of VCL NAL units at and below certain TemporalId values) of a layer representation.

A header parameter set (HPS) may contain slice header syntax elements so that if the same slice header syntax elements are used in multiple slices they need not be repeated in each slice header but rather they can be included in the slice header by a reference to the header parameter set. The values of slice header syntax elements can be selectively taken from one or more HPSs. If a picture consists of only one slice, the use of HPS is optional and a slice header can be included in the coded slice NAL unit instead. Two alternative approaches of the HPS design may be as follows: a single-AU HPS, where an HPS is applicable only to the slices within the same access unit, and a multi-AU HPS, where an HPS may be applicable to slices in multiple access units. The two approaches are similar in their syntax. The main differences between the two approaches arise from the fact that the single-AU HPS design requires transmission of an HPS for each access unit, while the multi-AU HPS design allows re-use of the same HPS across multiple AUs.

H.264/AVC and HEVC syntax allows many instances of parameter sets, and each instance is identified with a unique identifier. In order to limit the memory usage needed for parameter sets, the value range for parameter set identifiers has been limited. In H.264/AVC and HEVC, each slice header includes the identifier of the picture parameter set that is active for the decoding of the picture that contains the slice, and each picture parameter set contains the identifier of the active sequence parameter set. Consequently, the transmission of picture and sequence parameter sets does not have to be accurately synchronized with the transmission of slices. Instead, it is sufficient that the active sequence and picture parameter sets are received at any moment before they are referenced, which allows transmission of parameter sets "out-of-band" using a more reliable transmission mechanism compared to the protocols used for the slice data. For example, parameter sets can be included as a parameter in the session description for Real-time Transport Protocol (RTP) sessions. If parameter sets are transmitted in-band, they can be repeated to improve error robustness. A parameter set may be activated by a reference from a slice or from another active parameter set or in some cases from another syntax structure such as a buffering period SEI message.

A SEI NAL unit may contain one or more SEI messages, which are not required for the decoding of output pictures but assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

A coded picture is a coded representation of a picture. A coded picture in H.264/AVC comprises the VCL NAL units that are required for the decoding of the picture. In H.264/AVC, a coded picture can be a primary coded picture or a redundant coded picture. A primary coded picture is used in the decoding process of valid bitstreams, whereas a redundant coded picture is a redundant representation that should only be decoded when the primary coded picture cannot be successfully decoded. In a draft HEVC, no redundant coded picture has been specified.

In H.264/AVC, an access unit comprises a primary coded picture and those NAL units that are associated with it. In H.264/AVC, the appearance order of NAL units within an access unit is constrained as follows. An optional access unit delimiter NAL unit may indicate the start of an access unit. It is followed by zero or more SEI NAL units. The coded slices of the primary coded picture appear next. In H.264/AVC, the coded slice of the primary coded picture may be followed by coded slices for zero or more redundant coded pictures. A redundant coded picture is a coded representation of a picture or a part of a picture. A redundant coded picture may be decoded if the primary coded picture is not received by the decoder for example due to a loss in transmission or a corruption in physical storage medium.

In H.264/AVC, an access unit may also include an auxiliary coded picture, which is a picture that supplements the primary coded picture and may be used for example in the display process. An auxiliary coded picture may for example be used as an alpha channel or alpha plane specifying the transparency level of the samples in the decoded pictures. An alpha channel or plane may be used in a layered composition or rendering system, where the output picture is formed by overlaying pictures being at least partly transparent on top of each other. An auxiliary coded picture has the same syntactic and semantic restrictions as a monochrome redundant coded picture. In H.264/AVC, an auxiliary coded picture contains the same number of macroblocks as the primary coded picture.

In HEVC, a coded picture may be defined as a coded representation of a picture containing all coding tree units of the picture. In HEVC, an access unit may be defined as a set of NAL units that are associated with each other according to a specified classification rule, are consecutive in decoding order, and contain one or more coded pictures with different values of nuh_layer_id. In addition to containing the VCL NAL units of the coded picture, an access unit may also contain non-VCL NAL units.

In H.264/AVC, a coded video sequence is defined to be a sequence of consecutive access units in decoding order from an IDR access unit, inclusive, to the next IDR access unit, exclusive, or to the end of the bitstream, whichever appears earlier.

In HEVC, a coded video sequence (CVS) may be defined, for example, as a sequence of access units that consists, in decoding order, of an IRAP access unit with NoRaslOutputFlag equal to 1, followed by zero or more access units that are not IRAP access units with NoRaslOutputFlag equal to 1, including all subsequent access units up to but not including any subsequent access unit that is an IRAP access unit with NoRaslOutputFlag equal to 1. An IRAP access unit may be an IDR access unit, a BLA access unit, or a CRA access unit. The value of NoRaslOutputFlag is equal to 1 for each IDR access unit, each BLA access unit, and each CRA access unit that is the first access unit in the bitstream in decoding order, is the first access unit that follows an end of sequence NAL unit in decoding order, or has HandleCraAsBlaFlag equal to 1. NoRaslOutputFlag equal to 1 has an impact that the RASL pictures associated with the IRAP picture for which the NoRaslOutputFlag is set are not output by the decoder. HandleCraAsBlaFlag may be set to 1 for example by a player that seeks to a new position in a bitstream or tunes into a broadcast and starts decoding and then starts decoding from a CRA picture.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An H.264/AVC decoder can recognize an intra picture starting an open GOP from the recovery point SEI message in an H.264/AVC bitstream. An HEVC decoder can recognize an intra picture starting an open GOP, because a specific NAL unit type, CDR NAL unit type, is used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP starts from an IDR access unit. As a result, closed GOP structure has more error resilience potential in comparison to the open GOP structure, however at the cost of possible reduction in the compression efficiency. Open GOP coding structure is potentially more efficient in the compression, due to a larger flexibility in selection of reference pictures.

Many hybrid video codecs, including H.264/AVC and HEVC, encode video information in two phases. In the first phase, pixel or sample values in a certain picture area or "block" are predicted. These pixel or sample values can be predicted, for example, by motion compensation mechanisms, which involve finding and indicating an area in one of the previously encoded video frames that corresponds closely to the block being coded. Additionally, pixel or sample values can be predicted by spatial mechanisms which involve finding and indicating a spatial region relationship.

Prediction approaches using image information from a previously coded image can also be called as inter prediction methods which may also be referred to as temporal prediction and motion compensation. Prediction approaches using image information within the same image can also be called as intra prediction methods.

The second phase is one of coding the error between the predicted block of pixels or samples and the original block of pixels or samples. This may be accomplished by transforming the difference in pixel or sample values using a specified transform. This transform may be a Discrete Cosine Transform (DCT) or a variant thereof. After transforming the difference, the transformed difference is quantized and entropy encoded.

By varying the fidelity of the quantization process, the encoder can control the balance between the accuracy of the pixel or sample representation (i.e. the visual quality of the picture) and the size of the resulting encoded video representation (i.e. the file size or transmission bit rate).

The decoder reconstructs the output video by applying a prediction mechanism similar to that used by the encoder in order to form a predicted representation of the pixel or sample blocks (using the motion or spatial information created by the encoder and stored in the compressed representation of the image) and prediction error decoding (the inverse operation of the prediction error coding to recover the quantized prediction error signal in the spatial domain).

After applying pixel or sample prediction and error decoding processes the decoder combines the prediction and the prediction error signals (the pixel or sample values) to form the output video frame.

The decoder (and encoder) may also apply additional filtering processes in order to improve the quality of the output video before passing it for display and/or storing as a prediction reference for the forthcoming pictures in the video sequence.

In many video codecs, including H.264/AVC and HEVC, motion information is indicated by motion vectors associated with each motion compensated image block. Each of these motion vectors represents the displacement of the image block in the picture to be coded (in the encoder) or decoded (at the decoder) and the prediction source block in one of the previously coded or decoded images (or pictures). H.264/AVC and HEVC, as many other video compression standards, divide a picture into a mesh of rectangles, for each of which a similar block in one of the reference pictures is indicated for inter prediction. The location of the prediction block is coded as a motion vector that indicates the position of the prediction block relative to the block being coded.

Inter prediction process may be characterized using one or more of the following factors.

The Accuracy of Motion Vector Representation.

For example, motion vectors may be of quarter-pixel accuracy, and sample values in fractional-pixel positions may be obtained using a finite impulse response (FIR) filter.

Block Partitioning for Inter Prediction.

Many coding standards, including H.264/AVC and HEVC, allow selection of the size and shape of the block for which a motion vector is applied for motion-compensated prediction in the encoder, and indicating the selected size and shape in the bitstream so that decoders can reproduce the motion-compensated prediction done in the encoder.

Number of Reference Pictures for Inter Prediction.

The sources of inter prediction are previously decoded pictures. Many coding standards, including H.264/AVC and HEVC, enable storage of multiple reference pictures for inter prediction and selection of the used reference picture on a block basis. For example, reference pictures may be selected on macroblock or macroblock partition basis in H.264/AVC and on PU or CU basis in HEVC. Many coding standards, such as H.264/AVC and HEVC, include syntax structures in the bitstream that enable decoders to create one or more reference picture lists. A reference picture index to a reference picture list may be used to indicate which one of the multiple reference pictures is used for inter prediction for a particular block. A reference picture index may be coded by an encoder into the bitstream is some inter coding modes or it may be derived (by an encoder and a decoder) for example using neighboring blocks in some other inter coding modes.

Motion Vector Prediction.

In order to represent motion vectors efficiently in bit-streams, motion vectors may be coded differentially with respect to a block-specific predicted motion vector. In many video codecs, the predicted motion vectors are created in a predefined way, for example by calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, the reference index of previously coded/decoded picture can be predicted. The reference index is typically predicted from adjacent blocks and/or co-located blocks in temporal reference picture. Differential coding of motion vectors is typically disabled across slice boundaries.

Multi-Hypothesis Motion-Compensated Prediction.

H.264/AVC and HEVC enable the use of a single prediction block in P slices (herein referred to as uni-predictive slices) or a linear combination of two motion-compensated prediction blocks for bi-predictive slices, which are also referred to as B slices. Individual blocks in B slices may be bi-predicted, uni-predicted, or intra-predicted, and individual blocks in P slices may be uni-predicted or intra-predicted. The reference pictures for a bi-predictive picture may not be limited to be the subsequent picture and the previous picture in output order, but rather any reference pictures may be used. In many coding standards, such as H.264/AVC and HEVC, one reference picture list, referred to as reference picture list 0, is constructed for P slices, and two reference picture lists, list 0 and list 1, are constructed for B slices. For B slices, when prediction in forward direction may refer to prediction from a reference picture in reference picture list 0, and prediction in backward direction may refer to prediction from a reference picture in reference picture list 1, even though the reference pictures for prediction may have any decoding or output order relation to each other or to the current picture.

Weighted Prediction.

Many coding standards use a prediction weight of 1 for prediction blocks of inter (P) pictures and 0.5 for each prediction block of a B picture (resulting into averaging). H.264/AVC allows weighted prediction for both P and B slices. In implicit weighted prediction, the weights are proportional to picture order counts, while in explicit weighted prediction, prediction weights are explicitly indicated.

In many video codecs, the prediction residual after motion compensation is first transformed with a transform kernel (like DCT) and then coded. The reason for this is that often there still exists some correlation among the residual and transform can in many cases help reduce this correlation and provide more efficient coding.

In a draft HEVC, each PU has prediction information associated with it defining what kind of a prediction is to be applied for the pixels within that PU (e.g. motion vector information for inter predicted PUs and intra prediction directionality information for intra predicted PUs). Similarly each TU is associated with information describing the prediction error decoding process for the samples within the TU (including e.g. DCT coefficient information). It may be signalled at CU level whether prediction error coding is applied or not for each CU. In the case there is no prediction error residual associated with the CU, it can be considered there are no TUs for the CU.

In some coding formats and codecs, a distinction is made between so-called short-term and long-term reference pictures. This distinction may affect some decoding processes such as motion vector scaling in the temporal direct mode or implicit weighted prediction. If both of the reference pictures used for the temporal direct mode are short-term reference pictures, the motion vector used in the prediction may be scaled according to the picture order count (POC) difference between the current picture and each of the reference pictures. However, if at least one reference picture for the temporal direct mode is a long-term reference picture, default scaling of the motion vector may be used, for example scaling the motion to half may be used. Similarly, if a short-term reference picture is used for implicit weighted prediction, the prediction weight may be scaled according to the POC difference between the POC of the current picture and the POC of the reference picture. However, if a long-term reference picture is used for implicit weighted prediction, a default prediction weight may be used, such as 0.5 in implicit weighted prediction for bi-predicted blocks.

Some video coding formats, such as H.264/AVC, include the frame_num syntax element, which is used for various decoding processes related to multiple reference pictures. In H.264/AVC, the value of frame_num for IDR pictures is 0. The value of frame_num for non-IDR pictures is equal to the frame_num of the previous reference picture in decoding order incremented by 1 (in modulo arithmetic, i.e., the value of frame_num wrap over to 0 after a maximum value of frame_num).

H.264/AVC and HEVC include a concept of picture order count (POC). A value of POC is derived for each picture and is non-decreasing with increasing picture position in output order. POC therefore indicates the output order of pictures.

POC may be used in the decoding process for example for implicit scaling of motion vectors in the temporal direct mode of bi-predictive slices, for implicitly derived weights in weighted prediction, and for reference picture list initialization. Furthermore, POC may be used in the verification of output order conformance. In H.264/AVC, POC is specified relative to the previous IDR picture or a picture containing a memory management control operation marking all pictures as "unused for reference".

In H.265/HEVC version 1, picture order count (de)coding and derivation, when no enhancement layers are considered, is carried out as follows:

In H.265/HEVC version 1, POC is specified relative to the previous IRAP picture with NoRaslOutputFlag equal to 1. The value of NoRaslOutputFlag is equal to 1 for each IDR picture, each BLA picture, and each CRA picture that is the first picture in the bitstream in decoding order, is the first picture that follows an end of sequence NAL unit in decoding order, or has HandleCraAsBlaFlag equal to 1. The picture order count numbering may thus be started from the first picture of a sequence of pictures so that the decoding of the sequence can be carried out without referring to pictures earlier in decoding order than the first picture.

When a bitstream, such as an HEVC bitstream, starts at a CRA or BLA picture, it is not possible to decode the RASL pictures associated with the CRA or BLA picture correctly, because some reference pictures of these RASL pictures might not have been decoded. These RASL pictures are therefore not output by the decoding process and/or HRD. It may also be possible to provide external means to impact the decoding process, such as an interface or an Application Programming Interface (API) to the decoder, through which the decoder can be controlled to treat a CRA picture similarly to a BLA picture or a CRA picture initiating a bitstream and hence omit the output of the associated RASL pictures. The decoding process may for example associate a variable NoRaslOutputFlag with each IRAP picture and derive a value for the variable for example as follows:

If the current picture is an IDR picture, a BLA picture, the first picture in the bitstream in decoding order, or the first picture that follows an end of sequence NAL unit in decoding order, the variable NoRaslOutputFlag is set equal to 1.

Otherwise, if some external means are available to set the variable HandleCraAsBlaFlag to a value for the current picture, the variable HandleCraAsBlaFlag is set equal to the value provided by the external means and the variable NoRaslOutputFlag is set equal to HandleCraAsBlaFlag.

Otherwise, the variable HandleCraAsBlaFlag is set equal to 0 and the variable NoRaslOutputFlag is set equal to 0.

4 to 16 bits of the least significant bits (LSBs) of the POC values may be encoded into a bitstream and/or decoded from a bitstream for each picture (other than IDR pictures for which the LSB). To be more specific the LSBs are represented by u(v)-coded slice_pic_order_cnt_lsb syntax element, which is present in the slice segment headers (for other picture types than IDR pictures).

The number of bits of the slice_pic_order_cnt_lsb syntax element may be specified by the ue(v)-coded log 2_max_pic_order_cnt_lsb_minus4 syntax element in the sequence parameter set syntax structure. In log 2_max_pic_order_cnt_lsb_minus4 also specifies the value of the variable MaxPicOrderCntLsb that is used in the decoding process for picture order count as follows: MaxPicOrderCntLsb=pow(2, log 2_max_pic_order_cnt_lsb_minus4+4), where pow(base, exponent) is a function giving a result of the number "base" raised to the power "exponent".

The value of log 2_max_pic_order_cnt_lsb_minus4 is in the range of 0 to 12, inclusive.

The signaled POC LSB is used to determine whether the POC value of the current picture is smaller or larger than the POC value of the previous picture in decoding order that has TemporalId equal to 0 and that is not a RASL picture, a RADL picture, or a sub-layer non-reference picture. This previous picture is referred to as prevTid0Pic in the H.265/HEVC decoding process.

Term POC MSB and related variables in different examples presented below, such as prevPicOrderCntMsb, may refer to the respective POC value subtracted by the respective POC LSB value. For example, if a POC LSB value is represented by four bits, the POC MSB value would be an integer where the unsigned integer representation of the lowest 4 bits is equal to 0.

The decoding process of deriving PicOrderCntVal, the picture order count of the current picture, may be carried out as follows e.g. in H.265/HEVC version 1:

When the current picture is not an IRAP picture with NoRaslOutputFlag equal to 1, the variables prevPicOrderCntLsb and prevPicOrderCntMsb may be derived as follows:

Let prevTid0Pic be the previous picture in decoding order that has TemporalId equal to 0 and that is not a RASL picture, a RADL picture, or a sub-layer non-reference picture.

The variable prevPicOrderCntLsb is set equal to slice_pic_order_cnt_lsb of prevTid0Pic.

The variable prevPicOrderCntMsb is set equal to PicOrderCntMsb of prevTid0Pic.

The variable PicOrderCntMsb of the current picture may be derived as follows:

If the current picture is an IRAP picture with NoRaslOutputFlag equal to 1, PicOrderCntMsb is set equal to 0.

Otherwise, PicOrderCntMsb is derived as follows:
if((slice_pic_order_cnt_lsb<prevPicOrderCntLsb) && ((prevPicOrderCntLsb−slice_pic_order_cnt_lsb)>= (MaxPicOrderCntLsb/2)))
PicOrderCntMsb=prevPicOrderCntMsb+MaxPicOrderCntLsb
else if((slice_pic_order_cnt_lsb>prevPicOrderCntLsb) && ((slice_pic_order_cnt_lsb−prevPicOrderCntLsb)>(MaxPicOrderCntLsb/2)))
PicOrderCntMsb=prevPicOrderCntMsb−MaxPicOrderCntLsb
else
PicOrderCntMsb=prevPicOrderCntMsb PicOrderCntVal may be derived as follows:

PicOrderCntVal=PicOrderCntMsb+slice_pic_order_cnt_lsb

The process above may have an impact that all IDR pictures will have PicOrderCntVal equal to 0 since slice_pic_order_cnt_lsb is inferred to be 0 for IDR pictures and prevPicOrderCntLsb and prevPicOrderCntMsb are both set equal to 0.

H.264/AVC specifies the process for decoded reference picture marking in order to control the memory consumption in the decoder. The maximum number of reference pictures used for inter prediction, referred to as M, is determined in the sequence parameter set. When a reference picture is decoded, it is marked as "used for reference". If the decoding of the reference picture caused more than M pictures marked as "used for reference", at least one picture is marked as "unused for reference". There are two types of operation for decoded reference picture marking: adaptive memory control and sliding window. The operation mode for decoded reference picture marking is selected on picture basis. The adaptive memory control enables explicit signaling which pictures are marked as "unused for reference" and may also assign long-term indices to short-term reference pictures. The adaptive memory control may require the presence of memory management control operation (MMCO) parameters in the bitstream. MMCO parameters may be included in a decoded reference picture marking syntax structure. If the sliding window operation mode is in use and there are M pictures marked as "used for reference", the short-term reference picture that was the first decoded picture among those short-term reference pictures that are marked as "used for reference" is marked as "unused for reference". In other words, the sliding window operation mode results into first-in-first-out buffering operation among short-term reference pictures.

One of the memory management control operations in H.264/AVC causes all reference pictures except for the current picture to be marked as "unused for reference". An instantaneous decoding refresh (IDR) picture contains only intra-coded slices and causes a similar "reset" of reference pictures.

In a draft HEVC, reference picture marking syntax structures and related decoding processes have been replaced with a reference picture set (RPS) syntax structure and decoding process are used instead for a similar purpose. A reference picture set valid or active for a picture includes all the reference pictures used as reference for the picture and all the reference pictures that are kept marked as "used for reference" for any subsequent pictures in decoding order. There are six subsets of the a reference picture set, which are referred to as RefPicSetStCurr0 (which may also or alternatively referred to as RefPicSetStCurrBefore), RefPicSetStCurr1 (which may also or alternatively referred to as RefPicSetStCurrAfter), RefPicSetStFoll0, RefPicSetStFoll1, RefPicSetLtCurr, and RefPicSetLtFoll. In some versions of HEVC, RefPicSetStFoll0 and RefPicSetStFoll1 are regarded as one subset, which may be referred to as RefPicSetStFoll. The notation of the subsets is as follows. "Curr" refers to the reference pictures that are included in the reference picture lists of the current picture and hence may be used as inter prediction reference for the current picture. "Foll" refers to reference pictures that are not included in the reference picture lists of the current picture but may be used in subsequent pictures in decoding order as reference pictures. "St" refers to short-term reference pictures, which may generally be identified through a certain number of least significant bits of their POC value. "Lt" refers to long-term reference pictures, which are specifically identified and generally have a greater difference of POC values relative to the current picture than what can be represented by the mentioned certain number of least significant bits. "0" refers to those reference pictures that have a smaller POC value than that of the current picture. "1" refers to those reference pictures that have a greater POC value than that of the current picture. RefPicSetStCurr0, RefPicSetStCurr1, RefPicSetStFoll0 and RefPicSetStFoll1 are collectively referred to as the short-term subset of the reference picture set. RefPicSetLtCurr and RefPicSetLtFoll are collectively referred to as the long-term subset of the reference picture set.

In HEVC, a short-term reference picture set may be specified in a sequence parameter set and taken into use in the slice header through an index to the short-term reference picture set. A short-term reference picture set may also be specified in a slice header. Long-term reference picture candidates can be specified in a sequence parameter set. A long-term subset of a reference picture set may be specified in a slice header by reference to zero or more long-term reference picture candidates in the active SPS and zero or more long-term reference pictures specified in the slice header. Pictures that are included in the reference picture set used by the current slice are marked as "used for reference", and pictures that are not in the reference picture set used by the current slice are marked as "unused for reference". If the current picture is an IDR picture, RefPicSetStCurr0, RefPicSetStCurr1, RefPicSetStFoll0, RefPicSetStFoll1, RefPicSetLtCurr, and RefPicSetLtFoll are all set to empty.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as reference and is not needed for output.

In many coding modes of H.264/AVC and HEVC, the reference picture for inter prediction is indicated with an index to a reference picture list. The index is coded with CABAC or variable length coding. In general, the smaller the index is, the shorter the corresponding syntax element may become. Two reference picture lists (reference picture list 0 and reference picture list 1) are generated for each bi-predictive (B) slice, and one reference picture list (reference picture list 0) is formed for each inter-coded (P) slice.

A reference picture list, such as reference picture list 0 and reference picture list 1, may be constructed in two steps: First, an initial reference picture list is generated. The initial reference picture list may be generated for example on the basis of frame_num, POC, temporal_id, or information on the prediction hierarchy such as a GOP structure, or any combination thereof. Second, the initial reference picture list may be reordered by reference picture list reordering (RPLR) commands, also known as reference picture list modification syntax structure, contained in slice headers. The RPLR commands indicate the pictures that are ordered to the beginning of the respective reference picture list. This second step may also be referred to as the reference picture list modification process and the RPLR commands may be included in a reference picture list modification syntax structure. If reference picture sets are used, the reference picture list 0 may be initialized to contain RefPicSetStCurr0 first, followed by RefPicSetStCurr1, followed by RefPicSetLtCurr. Reference picture list 1 may be initialized to contain RefPicSetStCurr1 first, followed by RefPicSetStCurr0. The initial reference picture lists may be modified through the reference picture list modification syntax structure, where pictures in the initial reference picture lists may be identified through an entry index to the list.

Scalable video coding may be defined to refer to a coding structure where one bitstream can contain multiple representations of the content at different bitrates, resolutions and/or frame rates. In these cases the receiver can extract the desired representation depending on its characteristics (e.g. resolution that matches best with the resolution of the display of the device). Alternatively, a server or a network element can extract the portions of the bitstream to be transmitted to the receiver depending on e.g. the network characteristics or processing capabilities of the receiver.

In scalable video coding, a video signal can be encoded into a base layer and one or more enhancement layers. An enhancement layer may enhance the temporal resolution (i.e., the frame rate), the spatial resolution, or simply the quality of the video content represented by another layer or part thereof. In order to improve coding efficiency for the enhancement layers, the coded representation of that layer may depend on the lower layers. For example, the motion and mode information of the enhancement layer can be predicted from lower layers. Similarly the pixel data of the lower layers can be used to create prediction for the enhancement layer(s).

Each layer together with all its dependent layers may be considered to be one representation of the video signal at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

In some cases, data in an enhancement layer can be truncated after a certain location, or even at arbitrary positions, where each truncation position may include additional data representing increasingly enhanced visual quality. Such scalability is referred to as fine-grained (granularity) scalability (FGS). FGS was included in some draft versions of the SVC standard, but it was eventually excluded from the final SVC standard. FGS is subsequently discussed in the context of some draft versions of the SVC standard. The scalability provided by those enhancement layers that cannot be truncated is referred to as coarse-grained (granularity) scalability (CGS). It collectively includes the traditional quality (SNR) scalability and spatial scalability. The SVC standard supports the so-called medium-grained scalability (MGS), where quality enhancement pictures are coded similarly to SNR scalable layer pictures but indicated by high-level syntax elements similarly to FGS layer pictures, by having the quality_id syntax element greater than 0.

SVC uses an inter-layer prediction mechanism, wherein certain information can be predicted from layers other than the currently reconstructed layer or the next lower layer. Information that could be inter-layer predicted includes intra texture, motion and residual data. Inter-layer motion prediction includes the prediction of block coding mode, header information, etc., wherein motion from the lower layer may be used for prediction of the higher layer. In case of intra coding, a prediction from surrounding macroblocks or from co-located macroblocks of lower layers is possible. These prediction techniques do not employ information from earlier coded access units and hence, are referred to as intra prediction techniques. Furthermore, residual data from lower layers can also be employed for prediction of the current layer, which may be referred to as inter-layer residual prediction.

Scalable video (de)coding may be realized with a concept known as single-loop decoding, where decoded reference pictures are reconstructed only for the highest layer being decoded while pictures at lower layers may not be fully decoded or may be discarded after using them for inter-layer prediction. In single-loop decoding, the decoder performs motion compensation and full picture reconstruction only for the scalable layer desired for playback (called the "desired layer" or the "target layer"), thereby reducing decoding complexity when compared to multi-loop decoding. All of the layers other than the desired layer do not need to be fully decoded because all or part of the coded picture data is not needed for reconstruction of the desired layer. However, lower layers (than the target layer) may be used for inter-layer syntax or parameter prediction, such as inter-layer motion prediction. Additionally or alternatively, lower layers may be used for inter-layer intra prediction and hence intra-coded blocks of lower layers may have to be decoded. Additionally or alternatively, inter-layer residual prediction may be applied, where the residual information of the lower layers may be used for decoding of the target layer and the residual information may need to be decoded or reconstructed. In some coding arrangements, a single decoding loop is needed for decoding of most pictures, while a second decoding loop may be selectively applied to reconstruct so-called base representations (i.e. decoded base layer pictures), which may be needed as prediction references but not for output or display.

SVC allows the use of single-loop decoding. It is enabled by using a constrained intra texture prediction mode, whereby the inter-layer intra texture prediction can be applied to macroblocks (MBs) for which the corresponding block of the base layer is located inside intra-MBs. At the same time, those intra-MBs in the base layer use constrained intra-prediction (e.g., having the syntax element "constrained_intra_pred_flag" equal to 1). In single-loop decoding, the decoder performs motion compensation and full picture reconstruction only for the scalable layer desired for playback (called the "desired layer" or the "target layer"), thereby greatly reducing decoding complexity. All of the layers other than the desired layer do not need to be fully decoded because all or part of the data of the MBs not used for inter-layer prediction (be it inter-layer intra texture prediction, inter-layer motion prediction or inter-layer residual prediction) is not needed for reconstruction of the desired layer. A single decoding loop is needed for decoding of most pictures, while a second decoding loop is selectively applied to reconstruct the base representations, which are needed as prediction references but not for output or display, and are reconstructed only for the so called key pictures (for which "store_ref_base_pic_flag" is equal to 1).

The scalability structure in the SVC draft is characterized by three syntax elements: "temporal_id," "dependency_id" and "quality_id." The syntax element "temporal_id" is used to indicate the temporal scalability hierarchy or, indirectly, the frame rate. A scalable layer representation comprising pictures of a smaller maximum "temporal_id" value has a smaller frame rate than a scalable layer representation comprising pictures of a greater maximum "temporal_id". A given temporal layer typically depends on the lower temporal layers (i.e., the temporal layers with smaller "temporal_id" values) but does not depend on any higher temporal layer. The syntax element "dependency_id" is used to indicate the CGS inter-layer coding dependency hierarchy (which, as mentioned earlier, includes both SNR and spatial scalability). At any temporal level location, a picture of a smaller "dependency_id" value may be used for inter-layer prediction for coding of a picture with a greater "dependency_id" value. The syntax element "quality_id" is used to indicate the quality level hierarchy of a FGS or MGS layer. At any temporal location, and with an identical "dependency_id" value, a picture with "quality_id" equal to QL uses the picture with "quality_id" equal to QL-1 for inter-layer prediction. A coded slice with "quality_id" larger than 0 may be coded as either a truncatable FGS slice or a non-truncatable MGS slice.

For simplicity, all the data units (e.g., Network Abstraction Layer units or NAL units in the SVC context) in one access unit having identical value of "dependency_id" are referred to as a dependency unit or a dependency representation. Within one dependency unit, all the data units having identical value of "quality_id" are referred to as a quality unit or layer representation.

A base representation, also known as a decoded base picture, is a decoded picture resulting from decoding the Video Coding Layer (VCL) NAL units of a dependency unit having "quality_id" equal to 0 and for which the "store_ref_base_pic_flag" is set equal to 1. An enhancement representation, also referred to as a decoded picture, results from the regular decoding process in which all the layer representations that are present for the highest dependency representation are decoded.

As mentioned earlier, CGS includes both spatial scalability and SNR scalability. Spatial scalability is initially designed to support representations of video with different resolutions. For each time instance, VCL NAL units are coded in the same access unit and these VCL NAL units can correspond to different resolutions. During the decoding, a low resolution VCL NAL unit provides the motion field and residual which can be optionally inherited by the final decoding and reconstruction of the high resolution picture. When compared to older video compression standards, SVC's spatial scalability has been generalized to enable the base layer to be a cropped and zoomed version of the enhancement layer.

MGS quality layers are indicated with "quality_id" similarly as FGS quality layers. For each dependency unit (with the same "dependency_id"), there is a layer with "quality_id" equal to 0 and there can be other layers with "quality_id" greater than 0. These layers with "quality_id" greater than 0 are either MGS layers or FGS layers, depending on whether the slices are coded as truncatable slices.

To control drift due to the dropping or truncation of FGS or MGS data, SVC applied the following solution: In a certain dependency unit, a base representation (by decoding only the CGS picture with "quality_id" equal to 0 and all the dependent-on lower layer data) is stored in the decoded picture buffer. When encoding a subsequent dependency unit with the same value of "dependency_id," all of the NAL units, including FGS or MGS NAL units, use the base representation for inter prediction reference. Consequently, all drift due to dropping or truncation of FGS or MGS NAL units in an earlier access unit is stopped at this access unit. For other dependency units with the same value of "dependency_id," all of the NAL units use the decoded pictures for inter prediction reference, for high coding efficiency.

Each NAL unit includes in the NAL unit header a syntax element "use_ref_base_pic_flag." When the value of this element is equal to 1, decoding of the NAL unit uses the base representations of the reference pictures during the inter prediction process. The syntax element "store_ref_base_pic_ flag" specifies whether (when equal to 1) or not (when equal to 0) to store the base representation of the current picture for future pictures to use for inter prediction.

A scalable video coding and/or decoding scheme may use multi-loop coding and/or decoding, which may be characterized as follows. In the encoding/decoding, a base layer picture may be reconstructed/decoded to be used as a motion-compensation reference picture for subsequent pictures, in coding/decoding order, within the same layer or as a reference for inter-layer (or inter-view or inter-component) prediction. The reconstructed/decoded base layer picture may be stored in the DPB. An enhancement layer picture may likewise be reconstructed/decoded to be used as a motion-compensation reference picture for subsequent pictures, in coding/decoding order, within the same layer or as reference for inter-layer (or inter-view or inter-component) prediction for higher enhancement layers, if any. In addition to reconstructed/decoded sample values, syntax element values of the base/reference layer or variables derived from the syntax element values of the base/reference layer may be used in the inter-layer/inter-component/inter-view prediction.

A scalable video encoder for quality scalability (also known as Signal-to-Noise or SNR) and/or spatial scalability may be implemented as follows. For a base layer, a conventional non-scalable video encoder and decoder may be used. The reconstructed/decoded pictures of the base layer are included in the reference picture buffer and/or reference picture lists for an enhancement layer. In case of spatial scalability, the reconstructed/decoded base-layer picture may be upsampled prior to its insertion into the reference picture lists for an enhancement-layer picture. The base layer decoded pictures may be inserted into a reference picture list(s) for coding/decoding of an enhancement layer picture similarly to the decoded reference pictures of the enhancement layer. Consequently, the encoder may choose a base-layer reference picture as an inter prediction reference and indicate its use with a reference picture index in the coded bitstream. The decoder decodes from the bitstream, for example from a reference picture index, that a base-layer picture is used as an inter prediction reference for the enhancement layer. When a decoded base-layer picture is used as the prediction reference for an enhancement layer, it is referred to as an inter-layer reference picture.

While the previous paragraph described a scalable video codec with two scalability layers with an enhancement layer and a base layer, it needs to be understood that the description can be generalized to any two layers in a scalability hierarchy with more than two layers. In this case, a second enhancement layer may depend on a first enhancement layer in encoding and/or decoding processes, and the first enhancement layer may therefore be regarded as the base layer for the encoding and/or decoding of the second enhancement layer. Furthermore, it needs to be understood that there may be inter-layer reference pictures from more than one layer in a reference picture buffer or reference picture lists of an enhancement layer, and each of these inter-layer reference pictures may be considered to reside in a base layer or a reference layer for the enhancement layer being encoded and/or decoded.

In scalable multiview coding, the same bitstream may contain coded view components of multiple views and at least some coded view components may be coded using quality and/or spatial scalability.

Work is ongoing to specify scalable and multiview extensions to the HEVC standard. The multiview extension of HEVC, referred to as MV-HEVC, is similar to the MVC extension of H.264/AVC. Similarly to MVC, in MV-HEVC, inter-view reference pictures can be included in the reference picture list(s) of the current picture being coded or decoded. The scalable extension of HEVC, referred to as SHVC, is planned to be specified so that it uses multi-loop decoding operation (unlike the SVC extension of H.264/AVC). SHVC is reference index based, i.e. an inter-layer reference picture can be included in a one or more reference picture lists of the current picture being coded or decoded (as described above). The SHVC development has concentrated on development of spatial and coarse grain quality scalability.

It is possible to use many of the same syntax structures, semantics, and decoding processes for MV-HEVC and SHVC. Hereafter, term scalable multiview extension of HEVC (SMV-HEVC) is used to refer to a coding process, a decoding process, syntax, and semantics where largely the same (de)coding tools are used regardless of the scalability type and where the reference index based approach without changes in the syntax, semantics, or decoding process below the slice header is used. SMV-HEVC might not be limited to multiview, spatial, and coarse grain quality scalability but may also support other types of scalability, such as depth-enhanced video.

For the enhancement layer coding, the same concepts and coding tools of HEVC may be used in SHVC, MV-HEVC, and/or SMV-HEVC. However, the additional inter-layer prediction tools, which employ already coded data (including reconstructed picture samples and motion parameters a.k.a motion information) in reference layer for efficiently coding an enhancement layer, may be integrated to SHVC, MV-HEVC, and/or SMV-HEVC codec.

In SHVC, MV-HEVC, and SMV-HEVC, the block level syntax and decoding process are not changed for supporting inter-layer texture prediction. Only the high-level syntax has been modified (compared to that of HEVC) so that reconstructed pictures (upsampled if necessary) from a reference layer of the same access unit can be used as the reference pictures for coding the current enhancement layer picture. The inter-layer reference pictures as well as the temporal reference pictures are included in the reference picture lists. The signalled reference picture index is used to indicate whether the current Prediction Unit (PU) is predicted from a temporal reference picture or an inter-layer reference picture. The use of this feature may be controlled by the encoder and indicated in the bitstream for example in a video parameter set, a sequence parameter set, a picture parameter, and/or a slice header. The indication(s) may be specific to an enhancement layer, a reference layer, a pair of an enhancement layer and a reference layer, specific TemporalId values, specific picture types (e.g. RAP pictures), specific slice types (e.g. P and B slices but not I slices), pictures of a specific POC value, and/or specific access units, for example. The scope and/or persistence of the indication(s) may be indicated along with the indication(s) themselves and/or may be inferred.

The reference list(s) in MV-HEVC, SMV-HEVC, and a reference index based SHVC solution may be initialized using a specific process in which the inter-layer reference picture(s), if any, may be included in the initial reference picture list(s). are constructed as follows. For example, the temporal references may be firstly added into the reference lists (L0, L1) in the same manner as the reference list construction in HEVC. After that, the inter-layer references may be added after the temporal references. The inter-layer reference pictures may be for example concluded from the layer dependency information, such as the RefLayerId[i] variable derived from the VPS extension as described above. The inter-layer reference pictures may be added to the initial reference picture list L0 if the current enhancement-layer slice is a P-Slice, and may be added to both initial reference picture lists L0 and L1 if the current enhancement-layer slice is a B-Slice. The inter-layer reference pictures may be added to the reference picture lists in a specific order, which can but need not be the same for both reference picture lists. For example, an opposite order of adding inter-layer reference pictures into the initial reference picture list 1 may be used compared to that of the initial reference picture list 0. For example, inter-layer reference pictures may be inserted into the initial reference picture 0 in an ascending order of nuh_layer_id, while an opposite order may be used to initialize the initial reference picture list 1.

In the coding and/or decoding process, the inter-layer reference pictures may be treated as long term reference pictures.

Work is also ongoing to specify depth-enhanced video coding extensions to the HEVC standard, which may be referred to as 3D-HEVC, in which texture views and depth views may be coded into a single bitstream where some of the texture views may be compatible with HEVC. In other words, an HEVC decoder may be able to decode some of the texture views of such a bitstream and can omit the remaining texture views and depth views.

Other types of scalability and scalable video coding include bit-depth scalability, where base layer pictures are coded at lower bit-depth (e.g. 8 bits) per luma and/or chroma sample than enhancement layer pictures (e.g. 10 or 12 bits), chroma format scalability, where enhancement layer pictures provide higher fidelity and/or higher spatial resolution in chroma (e.g. coded in 4:4:4 chroma format) than base layer pictures (e.g. 4:2:0 format), and color gamut scalability, where the enhancement layer pictures have a richer/broader color representation range than that of the base layer pictures—for example the enhancement layer may have UHDTV (ITU-R BT.2020) color gamut and the base layer may have the ITU-R BT.709 color gamut. Any number of such other types of scalability may be realized for example with a reference index based approach or a block-based approach e.g. as described above.

Referring back to the POC coding and derivation in H.265/HEVC, the following design decisions that may affect the POC derivation or coding in H.265/HEVC extensions have been made for the present draft specifications of the H.265/HEVC scalable and/or multiview extensions:

a. IRAP pictures need not be aligned. In other words, when one layer has an IRAP picture in an access unit (AU), it is not required that the other layers have an IRAP picture.
b. An access unit needs not contain pictures in all layers (which are represented by the bitstream).
c. The bitstream may contain independently coded layers (other than the base layer) that do not use inter-layer prediction from any other layer. For example, an auxiliary picture layer may be independent of the base layer.

Scalable bitstreams with IRAP pictures or similar that are not aligned across layers may be used for example more frequent IRAP pictures can be used in the base layer, where they may have a smaller coded size due to e.g. a smaller spatial resolution. A process or mechanism for layer-wise start-up of the decoding may be included in a video decoding scheme. Decoders may hence start decoding of a bitstream when a base layer contains an IRAP picture and step-wise start decoding other layers when they contain IRAP pictures. In other words, in a layer-wise start-up of the decoding process, decoders progressively increase the number of decoded layers (where layers may represent an enhancement in spatial resolution, quality level, views, additional components such as depth, or a combination) as subsequent pictures from additional enhancement layers are decoded in the decoding process. The progressive increase of the number of decoded layers may be perceived for example as a progressive improvement of picture quality (in case of quality and spatial scalability).

A layer-wise start-up mechanism may generate unavailable pictures for the reference pictures of the first picture in decoding order in a particular enhancement layer. Alternatively, a decoder may omit the decoding of pictures preceding the IRAP picture from which the decoding of a layer can be started. These pictures that may be omitted may be specifically labeled by the encoder or another entity within the bitstream. For example, one or more specific NAL unit types may be used for them. These pictures may be referred to as cross-layer random access skip (CL-RAS) pictures.

A layer-wise start-up mechanism may start the output of enhancement layer pictures from an IRAP picture in that enhancement layer, when all reference layers of that enhancement layer have been initialized similarly with an IRAP picture in the reference layers. In other words, any pictures (within the same layer) preceding such an IRAP picture in output order might not be output from the decoder and/or might not be displayed. In some cases, decodable leading pictures associated with such an IRAP picture may be output while other pictures preceding such an IRAP picture might not be output.

Concatenation of coded video data, which may also be referred to as splicing, may occur for example coded video sequences are concatenated into a bitstream that is broadcast or streamed or stored in a mass memory. For example, coded video sequences representing commercials or advertisements may be concatenated with movies or other "primary" content.

Scalable video bitstreams might contain IRAP pictures that are not aligned across layers. It may, however, be convenient to enable concatenation of a coded video sequence that contains an IRAP picture in the base layer in its first access unit but not necessarily in all layers. A second coded video sequence that is spliced after a first coded video sequence should trigger a layer-wise decoding start-up process. That is because the first access unit of said second coded video sequence might not contain an IRAP picture in all its layers and hence some reference pictures for the non-IRAP pictures in that access unit may not be available (in the concatenated bitstream) and cannot therefore be decoded. The entity concatenating the coded video sequences, hereafter referred to as the splicer, should therefore modify the first access unit of the second coded video sequence such that it triggers a layer-wise start-up process in decoder(s).

Indication(s) may exist in the bitstream syntax to indicate triggering of a layer-wise start-up process. These indication(s) may be generated by encoders or splicers and may be obeyed by decoders. These indication(s) may be used for particular picture type(s) or NAL unit type(s) only, such as only for IDR pictures, while in other embodiments these indication(s) may be used for any picture type(s). Without loss of generality, an indication called cross_layer_bla_flag that is considered to be included in a slice segment header is referred to below. It should be understood that a similar indication with any other name or included in any other syntax structures could be additionally or alternatively used.

Independently of indication(s) triggering a layer-wise start-up process, certain NAL unit type(s) and/or picture type(s) may trigger a layer-wise start-up process. For example, a base-layer BLA picture may trigger a layer-wise start-up process.

A layer-wise start-up mechanism may be initiated in one or more of the following cases:
At the beginning of a bitstream.
At the beginning of a coded video sequence, when specifically controlled, e.g. when a decoding process is started or re-started e.g. as response to tuning into a broadcast or seeking to a position in a file or stream.

The decoding process may input an variable, e.g. referred to as NoClrasOutputFlag, that may be controlled by external means, such as the video player or alike.
A base-layer BLA picture.
A base-layer IDR picture with cross_layer_bla_flag equal to 1. (Or a base-layer IRAP picture with cross_layer_bla_flag equal to 1.)

Cross-layer random access skipped (CL-RAS) pictures may have the property that when a layer-wise start-up mechanism is invoked (e.g. when NoClrasOutputFlag is equal to 1), the CL-RAS pictures are not output and may not be correctly decodable, as the CL-RAS picture may contain references to pictures that are not present in the bitstream. It may be specified that CL-RAS pictures are not used as reference pictures for the decoding process of non-CL-RAS pictures.

CL-RAS pictures may be explicitly indicated e.g. by one or more NAL unit types or slice header flags (e.g. by re-naming cross_layer_bla_flag to cross_layer_constraint_flag and re-defining the semantics of cross_layer_bla_flag for non-IRAP pictures). A picture may be considered as a CL-RAS picture when it is a non-IRAP picture (e.g. as determined by its NAL unit type), it resides in an enhancement layer and it has cross_layer_constraint_flag (or similar) equal to 1. Otherwise, a picture may be classified of being a non-CL-RAS picture. cross_layer_bla_flag may be inferred to be equal to 1 (or a respective variable may be set to 1), if the picture is an IRAP picture (e.g. as determined by its NAL unit type), it resides in the base layer, and cross_layer_constraint_flag is equal to 1. Otherwise, cross_layer_bla_flag may inferred to be equal to 0 (or a respective variable may be set to 0). Alternatively, CL-RAS pictures may be inferred. For example, a picture with nuh_layer_id equal to layerId may be inferred to be a CL-RAS picture when the LayerInitializedFlag[layerId] is equal to 0.

A decoding process may be specified in a manner that a certain variable controls whether or not a layer-wise start-up process is used. For example, a variable NoClrasOutputFlag may be used, which, when equal to 0, indicates a normal decoding operation, and when equal to 1, indicates a layer-wise start-up operation. NoClrasOutputFlag may be set for example using one or more of the following steps:
1) If the current picture is an IRAP picture that is the first picture in the bitstream, NoClrasOutputFlag is set equal to 1.
2) Otherwise, if some external means are available to set the variable NoClrasOutputFlag equal to a value for a base-layer IRAP picture, the variable NoClrasOutputFlag is set equal to the value provided by the external means.
3) Otherwise, if the current picture is a BLA picture that is the first picture in a coded video sequence (CVS), NoClrasOutputFlag is set equal to 1.
4) Otherwise, if the current picture is an IDR picture that is the first picture in a coded video sequence (CVS) and cross_layer_bla_flag is equal to 1, NoClrasOutputFlag is set equal to 1.
5) Otherwise, NoClrasOutputFlag is set equal to 0.

Step 4 above may alternatively be phrased more generally for example as follows: "Otherwise, if the current picture is an IRAP picture that is the first picture in a CVS and an indication of layer-wise start-up process is associated with the IRAP picture, NoClrasOutputFlag is set equal to 1." Step 3 above may be removed, and the BLA picture may be specified to initiate a layer-wise start-up process (i.e. set NoClrasOutputFlag equal to 1), when cross_layer_bla_flag for it is equal to 1. It should be understood that other ways to phrase the condition are possible and equally applicable.

A decoding process for layer-wise start-up may be for example controlled by two array variables LayerInitializedFlag[i] and FirstPicInLayerDecodedFlag[i] which may have entries for each layer (possibly excluding the base layer and possibly other independent layers too). When the layer-wise start-up process is invoked, for example as response to NoClrasOutputFlag being equal to 1, these array variables may be reset to their default values. For example, when there 64 layers are enabled (e.g. with a 6-bit nuh_layer_id), the variables may be reset as follows: the variable LayerinitializedFlag[i] is set equal to 0 for all values of i from 0 to 63, inclusive, and the variable FirstPicInLayerDecodedFlag[i] is set equal to 0 for all values of i from 1 to 63, inclusive.

The decoding process may include the following or similar to control the output of RASL pictures. When the current picture is an IRAP picture, the following applies:
  If LayerinitializedFlag[nuh_layer_id] is equal to 0, the variable NoRaslOutputFlag is set equal to 1.
  Otherwise, if some external means is available to set the variable HandleCraAsBlaFlag to a value for the current picture, the variable HandleCraAsBlaFlag is set equal to the value provided by the external means and the variable NoRaslOutputFlag is set equal to HandleCraAsBlaFlag.
  Otherwise, the variable HandleCraAsBlaFlag is set equal to 0 and the variable NoRaslOutputFlag is set equal to 0.

The decoding process may include the following to update the LayerinitializedFlag for a layer. When the current picture is an IRAP picture and either one of the following is true, LayerinitializedFlag[nuh_layer_id] is set equal to 1.
  nuh_layer_id is equal to 0.
  LayerinitializedFlag[nuh_layer_id] is equal to 0 and LayerinitializedFlag[refLayerId] is equal to 1 for all values of refLayerId equal to RefLayerId[nuh_layer_id][j], where j is in the range of 0 to NumDirectRefLayers[nuh_layer_id]−1, inclusive.

When FirstPicInLayerDecodedFlag[nuh_layer_id] is equal to 0, the decoding process for generating unavailable reference pictures may be invoked prior to decoding the current picture. The decoding process for generating unavailable reference pictures may generate pictures for each picture in a reference picture set with default values. The process of generating unavailable reference pictures may be primarily specified only for the specification of syntax constraints for CL-RAS pictures, where a CL-RAS picture may be defined as a picture with nuh_layer_id equal to layerId and LayerinitializedFlag[layerId] is equal to 0. In HRD operations, CL-RAS pictures may need to be taken into consideration in derivation of CPB arrival and removal times. In some embodiments, decoders may ignore any CL-RAS pictures, as these pictures are not specified for output and have no effect on the decoding process of any other pictures that are specified for output.

Several approaches have been proposed for the POC value derivation for HEVC extensions, such as MV-HEVC and SHVC. In the following, an approach is described, referred to as a POC reset approach. This POC derivation approach is described as an example of POC derivation with which different embodiments can be realized. It needs to be understood that the described embodiments can be realized with any POC derivation and the description of the POC reset approach is merely a non-limiting example.

A POC reset approach is based on indicating within a slice header that POC values are to be reset so that the POC of the current picture is derived from the provided POC signaling for the current picture and the POCs of the earlier pictures, in decoding order, are decremented by a certain value.

Altogether four modes of POC resetting may be performed:
  POC MSB reset in the current access unit. This can be used when an enhancement layer contains an IRAP picture. (This mode is indicated in the syntax by poc_reset_idc equal to 1.)
  Full POC reset (both MSB and LSB to 0) in the current access unit. This can be used when the base layer contains an IDR picture. (This mode is indicated in the syntax by poc_reset_idc equal to 2.)
  "Delayed" POC MSB reset. This can be used for a picture of nuh_layer_id equal to nuhLayerId such that there was no picture in of nuh_layer_id equal to nuhLayerId in the earlier access unit (in decoding order) that caused a POC MSB reset. (This mode is indicated in the syntax by poc_reset_idc equal to 3 and full_poc_reset_flag equal to 0.)
  "Delayed" full POC reset. This can be used for a picture of nuh_layer_id equal to nuhLayerId such that there was no picture in of nuh_layer_id equal to nuhLayerId in the earlier access unit (in decoding order) that caused a full POC reset. (This mode is indicated in the syntax by poc_reset_idc equal to 3 and full_poc_reset_flag equal to 1.)

The "delayed" POC reset signaling can also be used for error resilience purpose (to provide resilience against a loss of a previous picture in the same layer including the POC reset signaling).

A concept of POC resetting period is specified based on the POC resetting period ID. Each non-IRAP picture that belongs to an access unit that contains at least one IRAP picture may be the start of a POC resetting period in the layer containing the non-IRAP picture. In that access unit, each picture would be the start of a POC resetting period in the layer containing the picture. POC resetting and update of POC values of same-layer pictures in the DPB are applied only for the first picture within each POC resetting period.

POC values of earlier pictures of all layers in the DPB are updated at the beginning of each access unit that requires POC reset and starts a new POC resetting period (before the decoding of the first picture received for the access unit but after parsing and decoding of the slice header information of the first slice of that picture).

For derivation of the delta POC value used for updating the POC values of the same-layer pictures in the DPB as well as for derivation of the POC MSB of the POC value of the current picture, a POC LSB value (poc_lsb_val syntax element) is conditionally signalled in the slice segment header (for the "delayed" POC reset modes as well as for base-layer pictures with full POC reset, such as base-layer IDR pictures). When "delayed" POC reset modes are used, poc_lsb_val may be set equal to the value POC LSB (slice_pic_order_cnt_lsb) of the access unit in which the POC was reset. When a full POC reset is used in the base layer, the poc_lsb_val may be set equal to POC LSB of prevTid0Pic (as specified earlier).

For the first picture, in decoding order, with a particular nuh_layer_id value and within a POC resetting period, a value DeltaPocVal is derived in subtracted from the pictures that are currently in the DPB. A basic idea is that for POC MSB reset, DeltaPocVal is equal to MSB part of the POC value of the picture triggering the resetting and for the full POC reset, DeltaPocVal is equal to the POC of the picture triggering the POC reset (while delayed POC resets are treated somewhat differently). The PicOrderCntVal values of all decoded pictures of all layers in the DPB are decremented by the value of DeltaPocVal. Consequently, a basic idea is that after the POC MSB reset, the pictures in the DPB may have POC values up to MaxPicOrderCntLsb (exclusive), and after the full POC reset, the pictures in the DPB may have POC values up to 0 (exclusive), while again the delayed POC reset is handled a bit differently.

In the following, the term layer is used in context of any type of scalability, including view scalability and depth enhancements. An enhancement layer refers to any type of an enhancement, such as SNR, spatial, multiview, depth, bit-depth, chroma format, and/or color gamut enhancement. A base layer also refers to any type of a base operation point, such as a base view, a base layer for SNR/spatial scalability, or a texture base view for depth-enhanced video coding.

Figure 2:
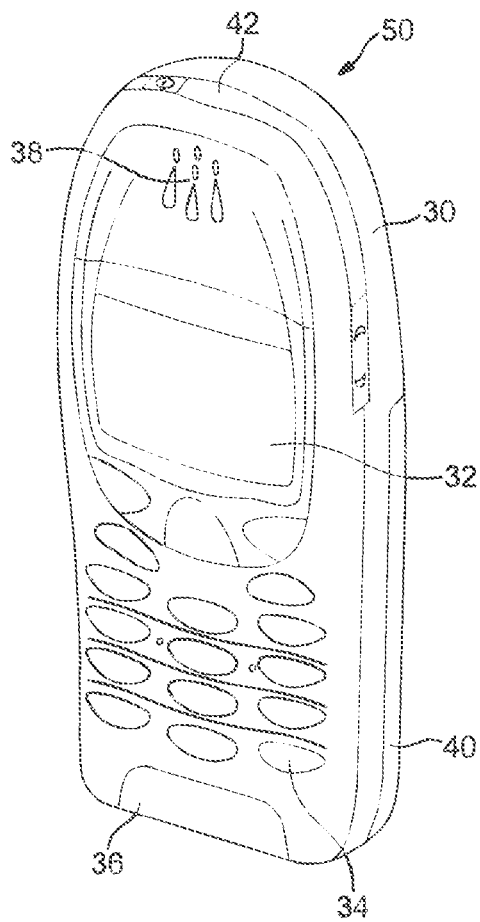
FIG. 2 shows an apparatus for video coding according to an example embodiment.

FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise an infrared port 42 for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera capable of recording or detecting individual frames which are then passed to the codec 54 or controller for processing. In some embodiments of the invention, the apparatus may receive the video image data for processing from another device prior to transmission and/or storage. In some embodiments of the invention, the apparatus 50 may receive either wirelessly or by a wired connection the image for coding/decoding.

Figure 3:
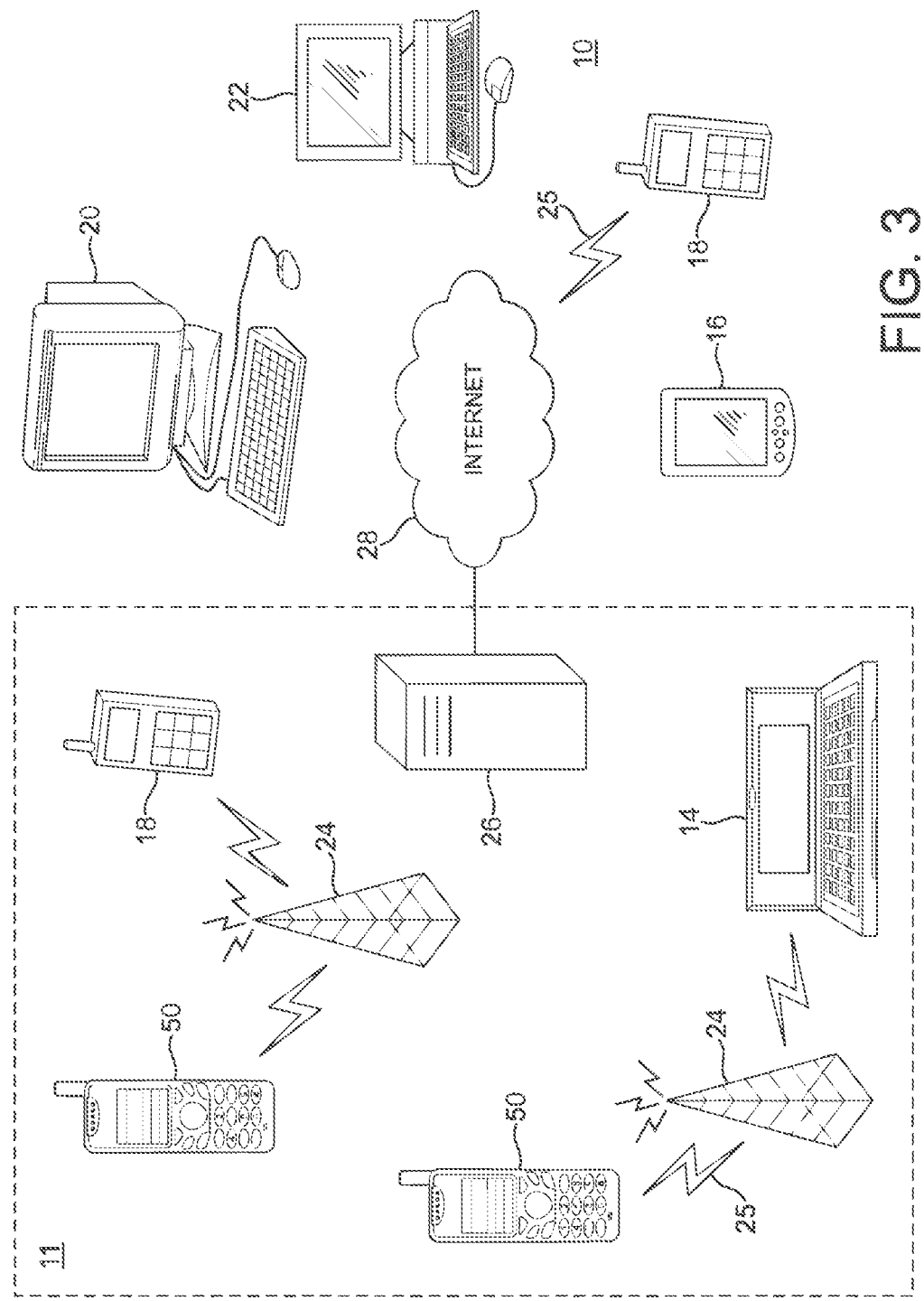
FIG. 3 shows an arrangement for video coding comprising a plurality of apparatuses, networks and network elements according to an example embodiment.

FIG. 3 shows an arrangement for video coding comprising a plurality of apparatuses, networks and network elements according to an example embodiment. With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices or apparatus 50 suitable for implementing embodiments of the invention. For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatuses may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Figure 4A:
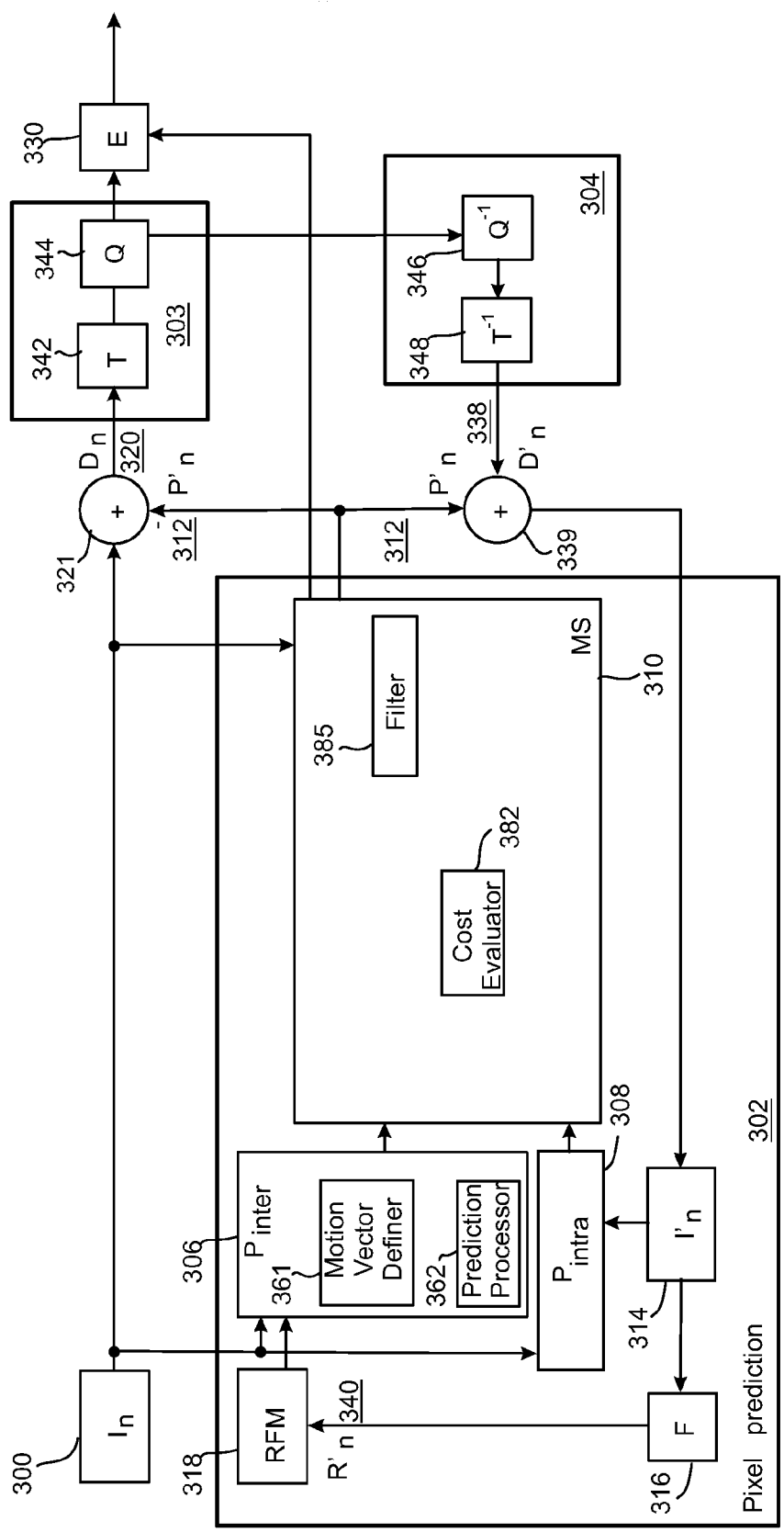
FIGS. 4a, 4b show block diagrams for video encoding and decoding according to an example embodiment.
Figure 4B:
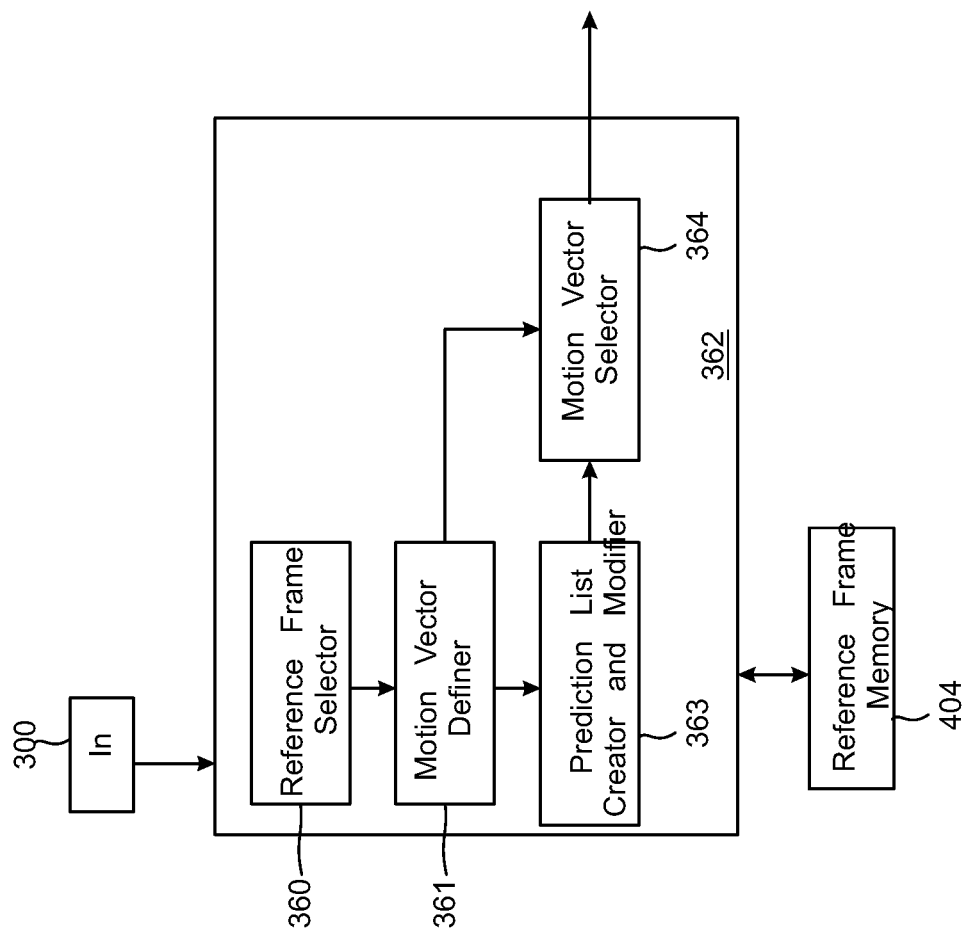

FIGS. 4a and 4b show block diagrams for video encoding and decoding according to an example embodiment.

FIG. 4a shows the encoder as comprising a pixel predictor 302, prediction error encoder 303 and prediction error decoder 304. FIG. 4a also shows an embodiment of the pixel predictor 302 as comprising an inter-predictor 306, an intra-predictor 308, a mode selector 310, a filter 316, and a reference frame memory 318. In this embodiment the mode selector 310 comprises a block processor 381 and a cost evaluator 382. The encoder may further comprise an entropy encoder 330 for entropy encoding the bit stream.

FIG. 4b depicts an embodiment of the inter predictor 306. The inter predictor 306 comprises a reference frame selector 360 for selecting reference frame or frames, a motion vector definer 361, a prediction list former 363 and a motion vector selector 364. These elements or some of them may be part of a prediction processor 362 or they may be implemented by using other means.

The pixel predictor 302 receives the image 300 to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. Both the inter-predictor 306 and the intra-predictor 308 may have more than one intra-prediction modes. Hence, the inter-prediction and the intra-prediction may be performed for each mode and the predicted signal may be provided to the mode selector 310. The mode selector 310 also receives a copy of the image 300.

The mode selector 310 determines which encoding mode to use to encode the current block. If the mode selector 310 decides to use an inter-prediction mode it will pass the output of the inter-predictor 306 to the output of the mode selector 310. If the mode selector 310 decides to use an intra-prediction mode it will pass the output of one of the intra-predictor modes to the output of the mode selector 310.

The mode selector 310 may use, in the cost evaluator block 382, for example Lagrangian cost functions to choose between coding modes and their parameter values, such as motion vectors, reference indexes, and intra prediction direction, typically on block basis. This kind of cost function uses a weighting factor lambda to tie together the (exact or estimated) image distortion due to lossy coding methods and the (exact or estimated) amount of information that is required to represent the pixel values in an image area: C=D+lambda×R, where C is the Lagrangian cost to be minimized, D is the image distortion (e.g. Mean Squared Error) with the mode and their parameters, and R the number of bits needed to represent the required data to reconstruct the image block in the decoder (e.g. including the amount of data to represent the candidate motion vectors).

The output of the mode selector is passed to a first summing device 321. The first summing device may subtract the pixel predictor 302 output from the image 300 to produce a first prediction error signal 320 which is input to the prediction error encoder 303.

The pixel predictor 302 further receives from a preliminary reconstructor 339 the combination of the prediction representation of the image block 312 and the output 338 of the prediction error decoder 304. The preliminary reconstructed image 314 may be passed to the intra-predictor 308 and to a filter 316. The filter 316 receiving the preliminary representation may filter the preliminary representation and output a final reconstructed image 340 which may be saved in a reference frame memory 318. The reference frame memory 318 may be connected to the inter-predictor 306 to be used as the reference image against which the future image 300 is compared in inter-prediction operations. In many embodiments the reference frame memory 318 may be capable of storing more than one decoded picture, and one or more of them may be used by the inter-predictor 306 as reference pictures against which the future image 300 are compared in inter prediction operations. The reference frame memory 318 may in some cases be also referred to as the Decoded Picture Buffer.

The operation of the pixel predictor 302 may be configured to carry out any known pixel prediction algorithm known in the art.

The pixel predictor 302 may also comprise a filter 385 to filter the predicted values before outputting them from the pixel predictor 302.

The operation of the prediction error encoder 302 and prediction error decoder 304 will be described hereafter in further detail. In the following examples the encoder generates images in terms of 16×16 pixel macroblocks which go to form the full image or picture. However, it is noted that FIG. 4a is not limited to block size 16×16, but any block size and shape can be used generally, and likewise FIG. 4a is not limited to partitioning of a picture to macroblocks but any other picture partitioning to blocks, such as coding units, may be used. Thus, for the following examples the pixel predictor 302 outputs a series of predicted macroblocks of size 16×16 pixels and the first summing device 321 outputs a series of 16×16 pixel residual data macroblocks which may represent the difference between a first macroblock in the image 300 against a predicted macroblock (output of pixel predictor 302).

The prediction error encoder 303 comprises a transform block 342 and a quantizer 344. The transform block 342 transforms the first prediction error signal 320 to a transform domain. The transform is, for example, the DCT transform or its variant. The quantizer 344 quantizes the transform domain signal, e.g. the DCT coefficients, to form quantized coefficients.

The prediction error decoder 304 receives the output from the prediction error encoder 303 and produces a decoded prediction error signal 338 which when combined with the prediction representation of the image block 312 at the second summing device 339 produces the preliminary reconstructed image 314. The prediction error decoder may be considered to comprise a dequantizer 346, which dequantizes the quantized coefficient values, e.g. DCT coefficients, to reconstruct the transform signal approximately and an inverse transformation block 348, which performs the inverse transformation to the reconstructed transform signal wherein the output of the inverse transformation block 348 contains reconstructed block(s). The prediction error decoder may also comprise a macroblock filter (not shown) which may filter the reconstructed macroblock according to further decoded information and filter parameters.

In the following the operation of an example embodiment of the inter predictor 306 will be described in more detail. The inter predictor 306 receives the current block for inter prediction. It is assumed that for the current block there already exists one or more neighboring blocks which have been encoded and motion vectors have been defined for them. For example, the block on the left side and/or the block above the current block may be such blocks. Spatial motion vector predictions for the current block can be formed e.g. by using the motion vectors of the encoded neighboring blocks and/or of non-neighbor blocks in the same slice or frame, using linear or non-linear functions of spatial motion vector predictions, using a combination of various spatial motion vector predictors with linear or non-linear operations, or by any other appropriate means that do not make use of temporal reference information. It may also be possible to obtain motion vector predictors by combining both spatial and temporal prediction information of one or more encoded blocks. These kinds of motion vector predictors may also be called as spatio-temporal motion vector predictors.

Reference frames used in encoding may be stored to the reference frame memory. Each reference frame may be included in one or more of the reference picture lists, within a reference picture list, each entry has a reference index which identifies the reference frame. When a reference frame is no longer used as a reference frame it may be removed from the reference frame memory or marked as "unused for reference" or a non-reference frame wherein the storage location of that reference frame may be occupied for a new reference frame.

It has been noticed in this invention that in scalable and multiview coding, the bitrate share of slice headers from the bitrate of all coded data can be significant, as efficient prediction methods can make the coded non-base pictures relatively small in terms of bytes. For example, it was determined here that with certain content and encoding settings in multiview and depth-enhanced multiview coding the bitrate share of non-base layer slice headers can take 1% or more of the total bitrate and more than 3% of the non-base layer bitrate.

Encoding a picture is a process that results in a coded picture, that is, a sequence of bits or a coded representation of a picture. A coded picture may be regarded as a bitstream or a part of a bitstream, the bitstream containing encoded information that is used for decoding the picture at the decoder. Encoding information in a bitstream is a process that results in a coded representation of said information in the bitstream, e.g. a syntax element represented by b(8), se(v), ue(v), or u(n), described above. When encoding a picture, the picture being encoded may be fully or partly held e.g. in working memory of the encoder, and the resulting coded picture may be fully or partly held in the working memory, as well. The bitstream resulting from encoding syntax elements may be achieved so that the syntax elements are first formed into the memory of the encoder, and then encoded to pieces of bitstream that are also held in the encoder memory. The resulting bitstream may be checked for correctness, e.g. by ensuring that bit patterns that match start codes (e.g. NAL unit start codes) have not been formed (e.g. within NAL units) in the bitstream. At the decoder, the bitstream may be fully or partly held in the memory for decoding, and by decoding the bitstream, syntax elements are formed in the decoder memory, which syntax elements are in turn used to obtain the decoded picture.

The following definitions may be used:
syntax element assignment: Syntax structure used to assign values to a set of syntax elements associated with certain syntax element names.
assignment identifier: An integer value by which a particular syntax element assignment is uniquely identified.
combination parameter set (also referred to as parameter combination): A syntax structure containing a plurality of assignment identifiers where each assignment identifier applies to zero or more syntax elements as determined by each assignment identifier and the syntax element assignment corresponding to each assignment identifier.
combination parameter set identifier: An integer value by which a particular combination parameter set is uniquely identified.

Figure 5A:
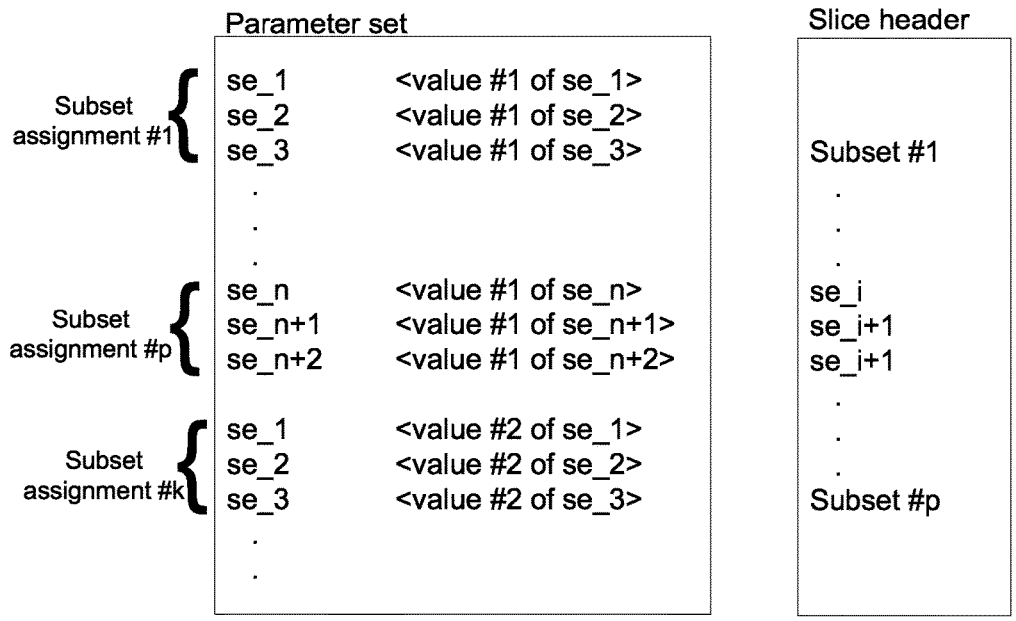
FIGS. 5a, 5b illustrate parameter sets, sub-sets, assignment and combination parameter sets.
Figure 5B:
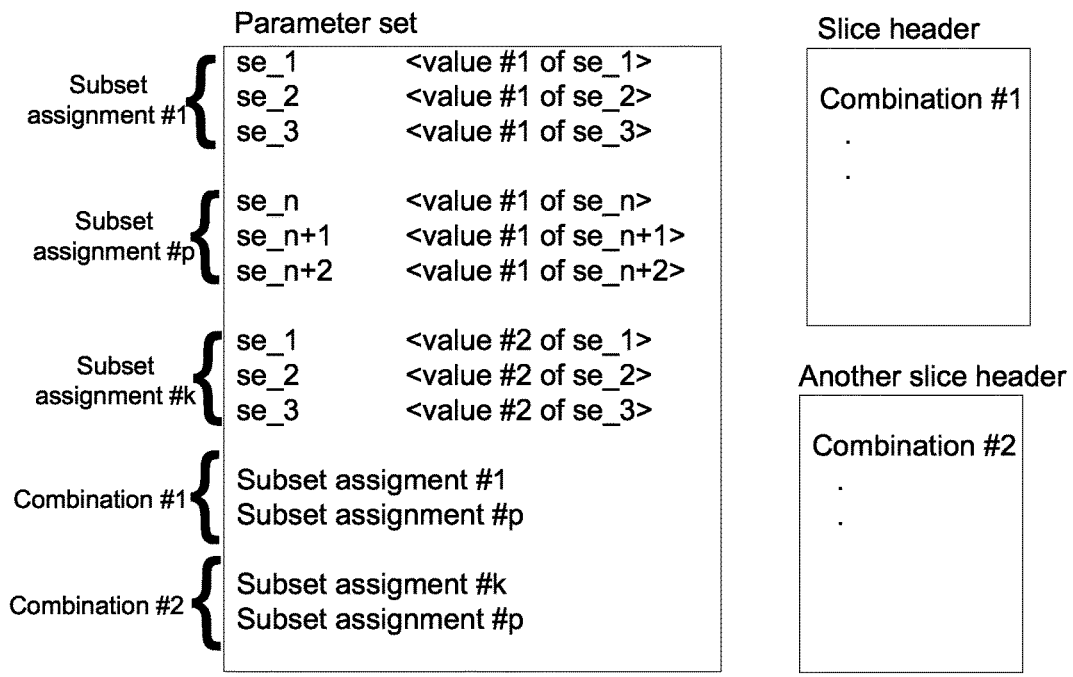

FIGS. 5a, 5b illustrate parameter sets, subsets, syntax element assignment and combination parameter sets.

In FIG. 5a, as an example, a parameter set, which may be for example a header parameter set or a picture parameter set, is illustrated. The parameter set comprises a number of parameters se_i with assigned parameter values. The parameters in the parameter set may be grouped into subsets #1, #2, ..., #p, #k. In the subsets, the parameter are assigned certain values, and by referring to this syntax element assignment in the slice header (the slice header contains a reference to subset #1 and a reference to subset #p) it is possible to assign the values to the parameters of the subset for decoding the slice data. There may be alternative syntax element assignments in the parameter set, e.g. as the subset #k. By referring to the alternative syntax element assignment, other values than above may be assigned to individual parameters. The slice header may comprise syntax element assignment identifiers and/or individual parameter values.

In FIG. 5b, as an example, the parameter set may comprise subsets of parameters with assigned values, making up a plurality of syntax element assignments corresponding to the parameter subsets (in the figure, subset assignments), each syntax element assignment having a unique identifier within a certain scope, such as among the subset assignments for the same set of syntax elements within the same parameter set. In addition, the parameter set may comprise combinations of syntax element assignment identifiers. For example, the combination may comprise identifiers for selecting the syntax element assignments #1 and #p, and this combination is in turn given an identifier (e.g. #1). When this combination parameter set identifier #1 is in the slice header or the combination parameter set #1 is otherwise determined to be used, the video encoder/decoder knows that syntax element assignments #1 and #p are to be applied. Thereby, the individual parameters are assigned values as defined in FIG. 5a for the corresponding parameter subsets by syntax element assignments #1 and #p.

Coding with combination parameter sets may be described e.g. in the following phases.

1) A plurality of syntax element assignments for at least a first and a second set of syntax elements may be encoded into or decoded from a parameter set syntax structure, wherein each assignment has a unique assignment identifier among the assignments for the first or the second set of syntax elements. The parameter set thus contains an indication that a first sub-set of parameters of the parameter set is to have certain assigned values (each parameter is given a value one by one), and the assignment of these certain values to the parameters of the first sub-set is given a unique assignment identifier. By referring to the assignment identifier, it is possible to cause the assignment of the certain values to the first sub-set of parameters. The second sub-set and further sub-sets of parameters may be treated in the same manner so that they receive assignment identifiers, as well.

2) A plurality of combination parameter sets containing one or more assignment identifiers may be encoded into or decoded from a parameter set syntax structure, each combination set has a unique combination parameter set identifier. The parameter set may in this manner be defined with the help of a number of assignment identifiers, each assignment identifier describing a certain association of values to the parameters of the corresponding parameter sub-set. Such a combination parameter set may thus contain two, three, four or more assignment identifiers, and possibly zero or more parameters outside these sub-sets. The combination parameter set of the plurality of assignment identifiers is given a combination parameter set identifier so that it can be referred to. The combination parameter set identifier may be unique within a certain scope—for example, the combination parameter set identifier may be unique within the parameter set.

3) A reference to a combination parameter set identifier may be encoded into or decoded from a slice header, or otherwise determined to be in effect for the current slice. Parameters from multiple parameter sub-sets may in this manner be given a value. For example, when the combination parameter set contains a first assignment identifier for the first sub-set of parameters and a second assignment identifier for the second sub-set of parameters, the parameters of the first and second sub-sets of parameters can be known with a single reference to the combination parameter set. In other words, references to the individual assignment identifiers for parameter sub-sets are grouped under one combination parameter set identifier. This may provide coding efficiencies in the bitstream because only one combination parameter set identifier is included in a slice header. If certain combinations of individual assignment identifiers are more common than others, variable-length coding of the combination parameter set identifier may provide efficiencies. For example, a combination parameter set identifier may be a ue(v) codeword. Otherwise, if different combination parameter sets are referred to approximately an equal amount of times, fixed-length coding of the combination parameter set identifier may be more efficient than variable-length coding. For example, a combination parameter set identifier may be a u(v) codeword. In some embodiments, an encoder may determine which entropy coding is used for the combination parameter set identifier, for example among ue(v) and u(v), and specify the used entropy coding in the bitstream, for example in a picture parameter set. The decoder may decode which entropy coding has been used for the combination parameter set identifier, for example among ue(v) and u(v), from the bitstream, for example from a picture parameter set (that is referred from the slice header being decoded).

4) First zero or more syntax element assignments for the first set of syntax elements of the slice header and second zero or more syntax elements for the second set of syntax elements of the slice header may be determined from the combination parameter set identifier. As explained above, the combination parameter set identifier can be used to determine the assignment identifiers for the first and second (and further) parameter sub-sets. The individual assignment identifiers then enable to determine the values for individual parameters in the sub-sets. This determining may happen e.g. so that the combination parameter set identifier is used to fetch from the memory the assignment identifiers, and then the assignment identifiers are used to fetch from the memory the individual parameter values to be used.

When compared to earlier technology, a level of indirection or hierarchy is in this way added in the parameter set syntax structure. For each set of syntax elements, zero or more sets of values are provided (and indexed) in the parameter set. Additionally, one or more parameter combinations are specified as a set of indexes (one index for each set of syntax elements). The slice header refers to a parameter combination index.

Figure 6A:
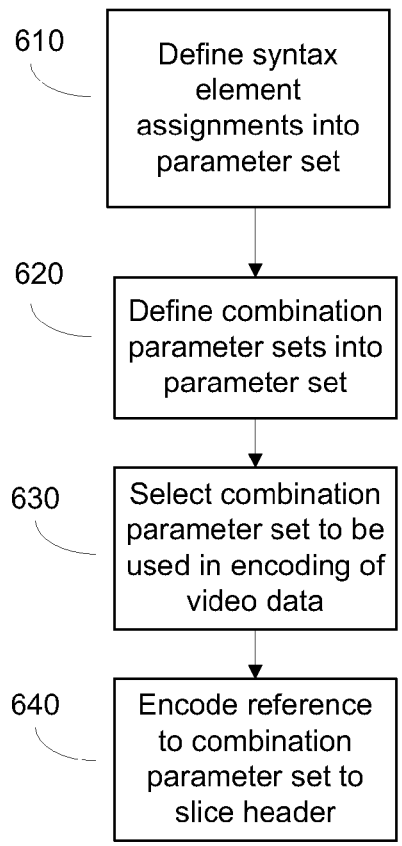
FIGS. 6a, 6b show flow charts of encoding and decoding video using combination parameter sets according to an example.
Figure 6B:
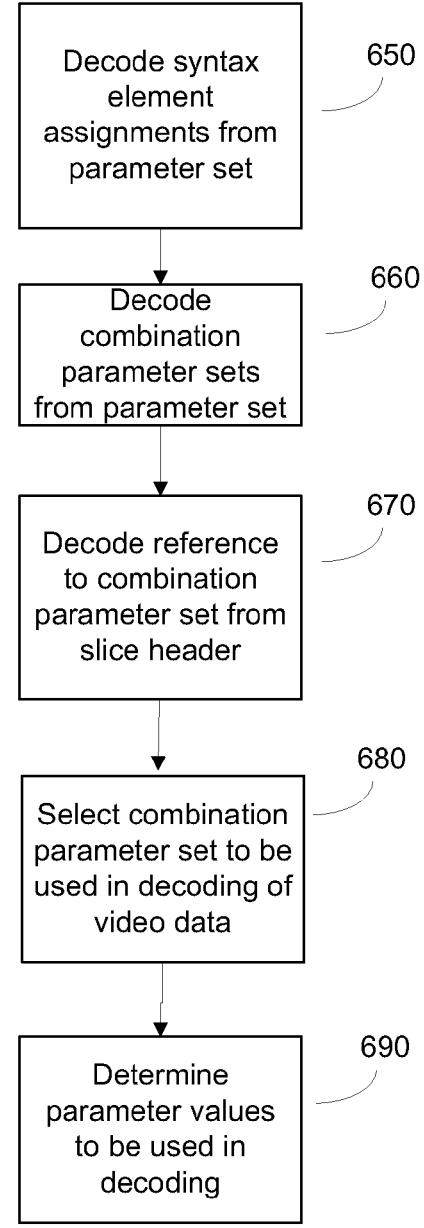

FIGS. 6a and 6b show flow charts of encoding and decoding video using combination parameter sets according to an example.

In FIG. 6a, the encoder operation is illustrated. In phase 610, syntax element assignments (values for subsets of parameters) are defined into a parameter set such as the header parameter set or the picture parameter set. In phase 620, combinations of the syntax element assignments are defined to make up combination parameter sets and coded into the parameter set such as the header parameter set or the picture parameter set. In phase 630, the combination parameter set to be used is selected for the picture, that is, the values for a number of encoding parameters is set. This selection of the combination parameter set may take place based on the picture position in the picture sequence, e.g. based on picture order count. In phase 640, an index of the combination parameter set may be coded into the slice header(s). Alternatively, this identifier may be omitted from the slice header if other ways of determining the active combination parameter set are used by the decoder.

In FIG. 6b, the decoder operation is illustrated. In phase 650, syntax element assignments (values for subsets of parameters) are decoded from a parameter set such as the header parameter set or the picture parameter set. In phase 660, combinations of the syntax element assignments are decoded from the parameter set such as the header parameter set or the picture parameter set. In phase 670, an index of the combination parameter set may be decoded from the slice header(s). Alternatively, this identifier may be omitted from the slice header and other ways of determining the active combination parameter set may be used by the decoder. In phase 680, the combination parameter set to be used is selected for the picture based on the decoded or determined identifier. In phase 690, the values for a number of encoding parameters is set using the combination parameter set. Alternatively, phases 650 and 660 may be performed in other order relative to the other phases. For example, phases 660 and 650 may be performed after phase 680 and only the combination of the syntax element assignments corresponding to the combination parameter set to be used may be decoded.

In some embodiments, in step 1 above, at least one syntax element is assigned to distinct (different) values at separate assignments of the same subset. That is, there may be a first syntax element assignment defined where the specific syntax element is assigned a first value, and a second syntax element assignment defined where the specific syntax element is assigned another value. Other parameters may be each assigned one value in the first syntax element assignment and the same value or another value in the second syntax element assignment.

In some embodiments, an assignment identifier of a particular value, such as 0, specifies that rather than including respective syntax element assignment in the parameter set syntax structure, the syntax elements are included in the slice header. In other words, the parameter set may comprise a combination parameter set, wherein the combination parameter set has one or more assignment identifiers that refer to certain syntax element assignments, and one or more assignment identifiers that indicate that a syntax element assignment is not to be used for a certain sub-set of parameters. Instead, for the sub-set of parameters for which the assignment identifier indicates that a syntax element assignment is not to be used, the parameters may be transmitted elsewhere, e.g. in the slice header, or some default or earlier values may be used for such parameters, or the parameters may not be needed, as they may for example relate to decoding processes that are not used for decoding of the slice data.

In some embodiments, a second syntax element assignment may be fully or partly coded differentially or predictively with respect to a first syntax element assignment concerning the same set of syntax elements. For example, a particular syntax element may be fixed-length coded, e.g. with u(v), in the first syntax element assignment and may have value a1. The value a1 is considered as a prediction value for the respective syntax element in the second syntax element assignment, which may include a respective variable-length-coded, e.g. ue(v)-coded, syntax element with value a2-a1, where a2 is the value to be assigned when the syntax assignment is taken into use e.g. by reference in a slice header.

In some embodiments, the method further comprises encoding or decoding slice data using the first zero or more syntax element assignments for the first set of syntax elements of the slice header and the second zero or more syntax elements for the second set of syntax elements of the slice header. Instead of carrying parameters for encoding or decoding in the slice header, a combination parameter set index may be carried in the slice header. This combination parameter set index may be used, in a manner described above, to determine the parameter values for decoding the slice data.

In some embodiments, the slice header may include syntax elements even if they are also included by reference to a combination parameter set identifier. It can be pre-defined for example in a coding standard, or specified e.g. by a signaling element in the bitstream by the encoder and/or decoded from the bitstream by the decoder, whether the respective syntax elements in the slice header or from the referred combination parameter set is decoded or takes effect. For example, it may be specified that the slice header contains the first set of syntax elements and takes effect or is decoded instead the first zero or more syntax element assignments for the first set of syntax elements. In this manner, parameter values of a certain parameter sub-set or certain parameters may be determined either from the parameter set or from the slice header directly.

In some embodiments, the combination parameter set identifier is derived from one or more syntax elements in the slice header that have another primary purpose than acting as a combination parameter set identifier. For example, one or more of the following syntax elements and/or variables derived from slice header syntax elements may be used:
  slice_pic_order_cnt_lsb (or another picture order count related syntax element)
  PicOrderCntVal (or another picture order count related variable)
  frame_num (or another picture decoding order related syntax element)
  nal_unit_type
  nal_ref_idc (or another syntax element or variable related to whether a picture may be used or is not used as reference for prediction, where prediction may be for example inter prediction, inter-layer prediction, or both, and prediction may apply for a subset of pictures, such as for certain temporal sub-layers)
  nuh_layer_id (or another layer identifier)

In this manner, the carrying of the combination parameter set identifier in the slice header may be avoided completely. The encoder and decoder may determine the combination parameter set to be used from other information in the slice header.

In some embodiments, the combination parameter set identifier is always provided in a syntax element primarily used for that purpose in the slice header. In some embodiments, the combination parameter set identifier is conditionally provided in a syntax element primarily used for that purpose in the slice header. When provided conditionally, the presence of a combination parameter set identifier can be gated by another slice header and/or parameter set syntax element. If the combination parameter set identifier presence flag (gating flag) specifies that the combination parameter set identifier is not present, it is derived from one or more syntax elements in the slice header that have another primary purpose. In some embodiments, the combination parameter set identifier is not present for certain slices, such as for slices with nuh_layer_id equal to 0, while may be present in other slices e.g. as described above.

In some embodiments, the combination parameter set identifier is used together with another identifier, such as a layer identifier, to select a combination parameter set and/or assignment identifiers. The referred parameter set may include combination parameter sets that are indexed by a combination parameter set identifier and with another identifier, such as a layer identifier. The assignment indexes for each combination parameter set may be provided in the parameter set for example using syntax having two loops (one nested in another), where one loop goes over the possible values of the combination parameter set identifier and another loop goes over the possible values of the another identifier, such as the layer identifier. The combination parameter set identifier is carried in the slice header, and when the assignment identifiers for parameters of the sub-sets are determined, the combination parameter set identifier and another identifier in the slice header or in e.g. a parameter set are used together to determine the syntax element assignment to be used. It needs to be understood that the identification mechanism is not limited to the use of one or two identifiers (as described above), but any number of identifiers may be used.

In some embodiments, more than one instance of a parameter set syntax structure may be present in the bitstream and/or provided out-of-band. Each instance is identified by a parameter set identifier included in the parameter set structure.

In some embodiments, the active parameter set syntax structure may be explicitly identified in each slice header. The slice header may include a parameter set identifier syntax element that associates the slice header with the parameter set of the same parameter set identifier value. Alternatively, a parameter set identifier value may be inferred for the slice header for example from other slice header syntax element values and/or variables derived from slice header syntax elements, such as picture order count. Alternatively, a parameter set identifier value may be included in another parameter set, which is referred to by the slice header either directly (such as picture parameter set) or indirectly (such as sequence parameter set which is referred to be a picture parameter set which is referred to by the slice header).

In some embodiments, the parameter set syntax structure may be activated in a slice header for example in one or more ways described in the previous paragraph and may remain active within a certain persistence scope or period. For example, the parameter set syntax structure may remain active for one access unit or for one picture. The parameter set identifier syntax element may not be present or may be conditionally present in slice headers in which it is not allowed to activate a new parameter set. For example, if a parameter set is active for one coded picture, the parameter set identifier may be present only for the first slice of the picture and may be absent for subsequent slices of the coded picture.

One or more instances of the provided parameter set syntax structures may comprise syntax element assignments for parameter sub-sets, and combination parameter set identifiers and definitions of the combination parameter sets. In this manner, the different parameter sets provided may e.g. each comprise combination parameter set identifiers.

In some embodiments, a parameter set may include zero or more syntax element assignments as references to identified slice header or slice headers. In other words, a syntax element assignment does not include values of the respective syntax elements but rather the values are provided by a reference to a slice header. The slice header may be required to precede the parameter set in bitstream order or may be required to precede, in decoding order, the slice header that activates the parameter set. The slice header may be identified for example by a combination of values of one or more of the following syntax elements or alike: nuh_layer_id, slice_pic_order_cnt_lsb. The encoder and the decoder may infer the syntax element assignment from the identified slice header. An assignment identifier for syntax element assignments that are formed by reference to a slice header may be inferred by the encoder and/or the decoder according to a numbering scheme which may take for example certain syntax element values, such as nuh_layer_id and slice_pic_order_cnt_lsb, as input, or may be encoded into the parameter set by the encoder and/or decoded from the parameter set by the decoder.

The options from which the encoder is able to choose for a particular syntax element set when coding a combination parameter set may depend on the type of the syntax element set. For example, an assignment index related to scalable layers may be required to be always present in a combination parameter set, while an assignment index for another set of syntax elements may be optionally present in the combination parameter set.

It has been noticed in this invention that many parts of the slice header data in practice depend on the position of the picture in the prediction pattern being used and can be determined by the encoder when the prediction pattern or hierarchy is determined, such as when the coding of the sequence is started. That is, when the pictures are coded into a coded video bitstream, it has been noticed that patterns of slice header data may emerge. These patterns have been noticed to be co-existent e.g. together with a certain picture position in the sequence. Therefore, when the position of the picture in the sequence (prediction pattern) is known, the combination parameter set to be used may be inferred from this position information without carrying the combination parameter set index in the slice header.

In the above, sub-sets of parameters in the parameter set or slice header have been discussed, and when a sub-set has a certain syntax element assignment (the parameters have certain values), this assignment can be referred to with an assignment identifier.

The slice header syntax elements may be categorized and represented by header parameter subset syntax structures for example as follows:

a) Reference picture set syntax elements, hps_rps( )
b) Inter-layer reference picture set syntax elements, hps_il_rps( )
c) Number of active reference pictures and reference picture list modification, hps_rplm( )
d) Prediction weights for weighted prediction, hps_pres_weight_table( )
e) Deblocking filter syntax elements, hps_dbf( )
f) Slice segment header extension, hps_slice_segment_header_extension( )
g) Other/miscellaneous syntax elements, hps_other_param( )

It needs to be understood that embodiments could be similarly realized with other categorizations of slice header syntax elements.

The header parameter set (HPS) may assigned a NAL unit type value that is distinct from other NAL unit types that are in use (i.e. are not reserved for future use). For example, the header parameter set (HPS) may be carried in a NAL of type 41 unit as shown in the table below.

| nal_unit_type | Name of nal_unit_type | Content of NAL unit and RBSP syntax structure | NAL unit type class |
|---|---|---|---|
| 41 | HPS_NUT | Header parameter set header_parameter_set_rbsp( ) | non-VCL |

The header parameter set RBSP may contain:

a) Zero or more header parameter subset syntax structures of each type (e.g. types a to g above). The number of header parameter subset syntax structures may vary from one type to another. The structures of each type may be indexed starting from 1.

b) Header parameter combination entries, each of which is a combination of header parameter subset indexes (one index per each type of header parameter subset syntax structures). Index 0 means that the respective header parameter subset is not included in the header parameter combination entry but rather is coded in the slice segment header.

c) Syntax elements that enable mapping of a picture to a header parameter set combination entry.

For example, the header parameter set syntax may be as in the table below.

| header_parameter_set_rbsp( ) { | Descriptor |
|---|---|
|   header_parameter_set_id | ue(v) |
|   num_hps_rps | ue(v) |
|   for( i = 1; i <= num_hps_rps; i++ ) | |
|     hps_rps( ) | |
|   num_hps_il_rps | ue(v) |
|   for( i = 1; i < =num_hps_il_rps; i++ ) | |
|     hps_il_rps( ) | |
|   num_hps_rplm | ue(v) |
|   for( i = 1; i <= num_hps_rplm; i++ ) | |
|     hps_rplm( ) | |
|   num_hps_pred_weight_table | ue(v) |
|   for( i = 1; i <= num_hps_pred_weight_table; i++ ) | |
|     hps_pred_weight_table( ) | |
|   num_hps_dbf | ue(v) |

| header_parameter_set_rbsp( ) { | Descriptor |
|---|---|
|   for( i = 1; i <= num_hps_dbf; i++ ) | |
|     hps_dbf( ) | |
|   num_hps_slice_segment_header_extension | ue(v) |
|   for( i = 1; | |
|   i <= num_hps_slice_segment_header_extension; i++ ) | |
|     hps_slice_segment_header_extension( ) | |
|   num_hps_other_param | ue(v) |
|   for( i = 1; i <= num_hps_other_param; i++ ) | |
|     hps_other_param( ) | |
|   hps_log2_max_pic_order_cnt_lsb_minus4 | ue(v) |
|   hps_initial_pic_order_cnt_lsb | u(v) |
|   hps_num_poc_values_once | ue(v) |
|   hps_num_poc_values_periodic | ue(v) |
|   for( i = 0; i < hps_num_poc_values_once + | |
|   hps_num_poc_values_periodic; i ++ ) { | |
|     if( i > 0 ) | |
|       hps_poc_delta[ i ] | se(v) |
|     for( j = 1; j <= MaxLayersMinus1; j++ ) { | |
|       layerId = layer_id_in_nuh[ j ] | |
|       hps_pic_present_flag[ i ][ layerId ] | u(1) |
|       if( hps_pic_present_flag[ i ][ layerId ] ) { | |
|         if( num_hps_rps ) | |
|           hps_rps_idx[ i ][ layerId ] | u(v) |
|         if( num_hps_il_rps ) | |
|           hps_il_rps_idx[ i ][ layerId ] | u(v) |
|         if( num_hps_rplm ) | |
|           hps_rplm_idx[ i ][ layerId ] | u(v) |
|         if( num_hps_pred_weight_table ) | |
|           hps_pred_weight_table_idx[ i ][ layerId ] | u(v) |
|         if( num_hps_dbf ) | |
|           hps_dbf_idx[ i ][ layerId ] | u(v) |
|         if( num_hps_slice_segment_header_extension_idx ) | |
|           hps_slice_segment_header_extension_idx[ i ] [ layerId ] | u(v) |
|         if( num_hps_other_param ) | |
|           hps_other_param_idx[ i ][ layerId ] | u(v) |
|       } | |
|     } | |
|   } | |
| } | |

The header parameter set reference picture set hps_rps syntax may be as in the table below.

| hps_rps( ) { | Descriptor |
|---|---|
|   hps_short_term_ref_pic_set_sps_flag | u(1) |
|   if( hps_short_term_ref_pic_set_sps_flag ) | |
|     hps_short_term_ref_pic_set_idx | ue(v) |
|   hps_long_term_ref_pics_present_flag | u(1) |
|   if( hps_long_term_ref_pics_present_flag ) { | |
|     hps_num_long_term_sps | ue(v) |
|     hps_num_long_term_pics | ue(v) |
|   } | |
| } | |

The header parameter set inter-layer reference picture set hps_il_rps syntax may be as in the table below.

| hps_il_rps( ) { | Descriptor |
|---|---|
|   hps_inter_layer_pred_enabled_flag | u(1) |
|   if( hps_inter_layer_pred_enabled_flag ) { | |
|     hps_num_direct_ref_layers_minus1 | ue(v) |
|     hps_num_inter_layer_ref_pics_minus1 | u(v) |
|     if( hps_num_inter_layer_ref_pics_minus1 < | |
|     hps_num_direct_ref_layers_minus1 ) | |

| hps_il_rps( ) { | Descriptor |
|---|---|
|     for( i = 0; | |
|     i <= hps_num_inter_layer_ref_pics_minus1; i++ ) | |
|       hps_inter_layer_pred_layer_idc[ i ] | u(v) |
|   } | |
| } | |

The header parameter set reference picture list modification hps_rplm syntax may be as in the table below.

| hps_rplm( ) { | Descriptor |
|---|---|
|   hps_rplm_modification_present_flag | u(1) |
|   hps_rplm_slice_type | ue(v) |
|   hps_num_ref_idx_active_override_flag | u(1) |
|   if( hps_num_ref_idx_active_override_flag ) { | |
|     hps_num_ref_idx_l0_active_minus1 | ue(v) |
|     if( hps_rplm_slice_type == B ) | |
|       hps_num_ref_idx_l1_active_minus1 | ue(v) |
|   } else { | |
|     hps_rplm_num_ref_idx_l0_active_minus1 | ue(v) |
|     if( hps_rplm_slice_type == B ) | |
|       hps_rplm_num_ref_idx_l1_active_minus1 | ue(v) |
|   } | |
|   if( hps_rplm_modification_present_flag ) | |
|     ref_pic_lists_modification( ) | |
| } | |

The header parameter set prediction weight table hps_pred_weight_table syntax may be as in the table below.

| hps_pred_weight_table( ) { | Descriptor |
|---|---|
|   hps_wp_num_ref_idx_l0_active_minus1 | ue(v) |
|   hps_wp_num_ref_idx_l1_active_minus1 | ue(v) |
|   hps_wp_chroma_format_idc | ue(v) |
|   pred_weight_table( ) | |
| } | |

The header parameter set deblocking filter hps_dbf syntax may be as in the table below.

| hps_dbf( ) { | Descriptor |
|---|---|
|   hps_deblocking_filter_override_flag | u(1) |
|   if( hps_deblocking_filter_override_flag ) { | |
|     hps_deblocking_filter_disabled_flag | u(1) |
|     if( !hps_deblocking_filter_disabled_flag ) { | |
|       hps_beta_offset_div2 | se(v) |
|       hps_tc_offset_div2 | se(v) |
|     } | |
|   } | |
| } | |

The header parameter set slice segment header extension hps_slice_segment_header_extension syntax may be as in the table below.

| hps_slice_segment_header_extension( ) { | Descriptor |
|---|---|
|   hps_slice_segment_header_extension_length | ue(v) |
|   for( i = 0; | |
|   i < hps_slice_segment_header_extension_length; i++) | |
|     hps_slice_segment_header_extension_data_byte[ i ] | u(8) |
| } | |

The header parameter set other parameters hps_other_param syntax may be as in the table below.

| hps_other_param( ) { | Descriptor |
|---|---|
| hps_temporal_mvp_enabled_flag | u(1) |
| hps_sao_luma_flag | u(1) |
| hps_sao_chroma_flag | u(1) |
| hps_mvd_l1_zero_flag | u(1) |
| hps_cabac_init_flag | u(1) |
| hps_collocated_from_l0_flag | u(1) |
| hps_collocated_ref_idx | ue(v) |
| hps_five_minus_max_num_merge_cand | ue(v) |
| hps_slice_qp_delta_present_flag | u(1) |
| if( !hps_slice_qp_delta_present_flag ) { | |
|    hps_qp_delta | se(v) |
|    hps_cb_qp_offset | se(v) |
|    hps_cr_qp_offset | se(v) |
| } | |
| hps_loop_filter_across_slices_enabled_flag | u(1) |
| } | |

The semantics of the various syntax elements in the header parameter set syntax can be described as follows.

Header parameter set semantics are described first.

The header_parameter_set_rbsp( ) syntax structure contains header parameter subset syntax structures: hps_rps( ), hps_il_rps( ), hps_rplm( ), hps_pred_weight_table( ), hps_dbf( ), hps_slice_segment_header_extension( ) and hps_other_param( ) as described earlier. The number of each type of header parameter subset syntax structures is specified within the header_parameter_set_rbsp( ) syntax structure and indexed starting from 1. The header_parameter_set_rbsp( ) syntax structure also contains header parameter combination entries, each of which is a combination of header parameter subset indexes (one index per each type of header parameter subset syntax structures, in this case 7). Each specified header parameter combination entry is associated with a certain access unit or certain access units and a certain layer, as specified with hps_initial_pic_order_cnt_lsb, hps_num_poc_values_once, hps_num_poc_values_ periodic, hps_poc_delta[i] and hps_pic_present_flag[i][layerId] syntax elements. When a header parameter combination entry includes a header parameter subset index value 0, no header parameter subset syntax structure is used in deriving the values of the respective slice header syntax elements within the associated access unit and layer. Instead, the values of the syntax elements are coded in the slice header.

header_parameter_set_id identifies the HPS for reference by other syntax elements. The value of header_parameter_set_id may be in the range of 0 to 63, inclusive.

num_hps_rps specifies the number of hps_rps( ) syntax structures included in the header_parameter_set_rbsp( ) syntax structure.

num_hps_il_rps specifies the number of hps_il_rps( ) syntax structures included in the header_parameter_set_rbsp( ) syntax structure.

num_hps_rplm specifies the number of hps_rplm( ) syntax structures included in the header_parameter_set_rbsp( ) syntax structure.

num_hps_pred_weight_table specifies the number of hps_pred_weight_table( ) syntax structures included in the header_parameter_set_rbsp( ) syntax structure.

num_hps_dbf specifies the number of hps_dbf( ) syntax structures included in the header_parameter_set_rbsp( ) syntax structure.

num_hps_num_slice_segment_header_extension specifies the number of hps_slice_segment_header_extension( ) syntax structures included in the header_parameter_set_rbsp( ) syntax structure.

num_hps_other_param specifies the number of hps_other_param( ) syntax structures included in the header_parameter_set_rbsp( ) syntax structure.

hps_log 2_max_pic_order_cnt_lsb_minus4 plus 4 specifies the length of hps_initial_pic_order_cnt_lsb syntax element. The value of hps_log 2_max_pic_order_cnt_lsb_minus4 of in an HPS referred to in a slice segment header may be required to be equal to the log 2_max_pic_order_cnt_lsb_minus4 of the SPS that is active in the same slice header.

hps_initial_pic_order_cnt_lsb, hps_num_poc_values_once, hps_num_poc_values_periodic, hps_poc_delta[i] specify the mapping of slice_pic_order_cnt_lsb to a parameter combination index, i.e. PocLsbToHpsEntryIdx[pocLsb] variable, as follows:

```
for( i = 0; i < MaxPicOrderCntLsb; i++ )
    PocLsbToHpsEntryIdx[ i ] = −1
PocLsbToHpsEntryIdx[ initial_pic_order_cnt_lsb ] = 0
prevPoc = initial_pic_order_cnt_lsb
for( i = 1; i < hps_num_poc_values_once; i ++ ) {
    currPoc = prevPoc + hps_poc_delta[ i ]
    currPocLsb = currPoc & ( MaxPicOrderCntLsb − 1 )
    PocLsbToHpsEntryIdx[ currPocLsb ] = i
    prevPoc = currPoc
}
if ( hps_num_poc_values_periodic ) {
    j = 0
    continueFlag = 1
    while( continueFlag ) {
        currPoc = prevPoc + hps_poc_delta[
            hps_num_poc_values_once + j ]
        currPocLsb = currPoc & ( MaxPicOrderCntLsb − 1 )
        if( PocLsbToHpsEntryIdx[ currPocLsb ] = = −1 )
            PocLsbToHpsEntryIdx[ currPocLsb ] =
                hps_num_poc_values_once + j
        else
            continueFlag = 0
        j = (j + 1) % ( hps_num_poc_values_periodic )
    }
}
```

That is, the picture order count least significant bits value is used to determine the header parameter set combination index to be used for the picture.

It may be required for bitstream conformance that the values of hps_initial_pic_order_cnt_lsb, hps_num_poc_values_once and hps_poc_delta[i] are such that when PocLsbToHpsEntryIdx[currPocLsb] is already a non-negative value, it is not assigned to another non-negative value above.

The length of hps_initial_pic_order_cnt_lsb syntax element is hps_log 2_max_pic_order_cnt_lsb_minus4+4.

hps_pic_present_flag[i][layerId] equal to 0 specifies that an access unit associated with the i-th entry does not contain a picture with nuh_layer_id equal to layerId. hps_pic_present_flag[i][layerId] equal to 1 specifies that an access unit associated with the i-th entry may or may not contain a picture with nuh_layer_id equal to layerId.

The hps_rps, hps_il_rps, hps_rplm, hps_pred_weight_table, hps_dbf, hps_slice_segment_header_extension, and hps_other_param syntax structures include syntax element assignments for the respective subsets of slice header syntax elements.

hps_rps_idx[i][layerId] specifies that the hps_rps( ) syntax structure with index hps_rps_idx[i][layerId] is included in the i-th header parameter combination entry. The length of the hps_rps_idx[i][layerId] syntax element is Ceil(Log 2(num_hps_rps+1)). If hps_rps_idx[i][layerId] is not present, it is inferred to be equal to 0.

hps_il_rps_idx[i][layerId] specifies that the hps_il_rps( ) syntax structure with index hps_il_rps_idx[i][layerId] is included in the i-th header parameter combination entry. The length of the hps_il_rps_idx[i][layerId] syntax element is Ceil(Log 2(num_hps_il_rps+1)). If hps_il_rps_idx[i][layerId] is not present, it is inferred to be equal to 0.

hps_rplm_idx[i][layerId] specifies that the hps_rplm( ) syntax structure with index hps_rplm_idx[i][layerId] is included in the i-th header parameter combination entry. The length of the hps_rplm_idx[i][layerId] syntax element is Ceil(Log 2(num_hps_rplm+1)). If hps_rplm_idx[i][layerId] is not present, it is inferred to be equal to 0.

When NumPicTotalCurr is equal to 0 for a slice with nuh_layer_id equal to layerId and i is the header parameter combination entry index associated with the slice, hps_rplm_idx[i][layerId] shall be equal to 0.

hps_pred_weight_table_idx[i][layerId] specifies that the hps_pred_weight_table( ) syntax structure with index hps_pred_weight_table_idx[i][layerId] is included in the i-th header parameter combination entry. The length of the hps_rps_pred_weight_table[i][layerId] syntax element is Ceil(Log 2(num_hps_pred_weight_table+1)). If hps_rps_pred_weight_table[i][layerId] is not present, it is inferred to be equal to 0.

hps_dbf_idx[i][layerId] specifies that the hps_dbf( ) syntax structure with index hps_dbf_idx[i][layerId] is included in the i-th header parameter combination entry. The length of the hps_dbf_idx[i][layerId] syntax element is Ceil(Log 2(num_hps_dbf+1)). If hps_dbf_idx[i][layerId] is not present, it is inferred to be equal to 0.

hps_slice_segment_header_extension_idx[i][layerId] specifies that the hps_slice_segment_header_extension( ) syntax structure with index hps_slice_segment_header_extension_idx[i][layerId] is included in the i-th header parameter combination entry. The length of the hps_slice_segment_header_extension_idx[i][layerId] syntax element is Ceil (Log 2(num_hps_slice_segment_header_extension+1)). If hps_slice_segment_header_extension_idx[i][layerId] is not present, it is inferred to be equal to 0.

hps_other_param_idx[i][layerId] specifies that the hps_other_param( ) syntax structure with index hps_other_param_idx[i][layerId] is included in the i-th header parameter combination entry. The length of the hps_other_param_idx[i][layerId] syntax element is Ceil(Log 2(num_hps_other_param+1)). If hps_other_param_idx[i][layerId] is not present, it is inferred to be equal to 0.

HPS reference picture set semantics are described next.

hps_short_term_ref_pic_set_sps_flag, hps_short_term_ref_pic_set_idx, hps_num_long_term_sps and hps_num_long_term_pics are used to infer the values of short_term_ref_pic_set_sps_flag, short_term_ref_pic_set_idx, num_long_term_sps and num_long_term_pics, respectively, as specified in slice segment header semantics.

hps_long_term_ref_pics_present_flag equal to 0 specifies that hps_num_long_term_sps and hps_num_long_term_pics are not present. hps_long_term_ref_pics_present_flag equal to 1 specifies that hps_num_long_term_sps and hps_num_long_term_pics are present. When long_term_ref_pics_present_flag is equal to 1 in the active SPS for a slice, hps_long_term_ref_pics_present_flag shall be equal to 1 in the header parameter combination entry referred to by the same slice.

HPS inter-layer reference picture set semantics are described next.

hps_inter_layer_pred_enabled_flag, hps_num_inter_layer_ref_pics_minus1 and hps_inter_layer_pred_layer_idc[i] are used to infer the values of inter_layer_pred_enabled_flag, num_inter_layer_ref_pics_minus1 and inter_layer_pred_layer_idc[i], respectively, as specified in slice segment header semantics.

hps_num_direct_ref_layers_minus1 in the header parameter combination entry referred to by a slice shall be equal to NumDirectRefLayers[nuh_layer_id]−1 derived for the same slice.

HPS reference picture list modification semantics are described next.

hps_rplm_modification_present_flag equal to 0 specifies that ref_pic_list_modification( ) syntax structure is not present in the hps_rplm( ) syntax structure. hps_rplm_modification_present_flag equal to 1 specifies that ref_pic_list_modification( ) syntax structure is present in the hps_rplm( ) syntax structure. hps_rplm_modification_present_flag in the header parameter combination entry referred to by a slice shall be equal to (lists_modification_present_flag && NumPocTotalCurr>1) derived for the same slice.

hps_rplm_slice_type specifies the slice type of a slice that refers to this header parameter combination entry. hps_rplm_slice_type in the header parameter combination entry referred to by a slice shall be equal to slice_type of the same slice. hps_rplm_slice_type shall be equal to P or B.

hps_num_ref_idx_active_override_flag, hps_num_ref_idx_l0_active_minus1 and hps_num_ref_idx_l1_active_minus1 are used to infer the values of num_ref_idx_active_override_flag, num_ref_idx_l0_active_minus1 and num_ref_idx_l1_active_minus1, respectively, as specified in slice segment header semantics.

hps_rplm_num_ref_idx_l0_active_minus1 and hps_rplm_num_ref_idx_l1_active_minus1 are used to infer the values of num_ref_idx_l0_active_minus1 and num_ref respectively, within the ref_pic_lists_modification( ) syntax structure included in the hps_rplm( ) syntax structure. hps_rplm_num_ref_idx_l0_active_minus1 and hps_rplm_num_ref_idx_l1_active_minus1 in the header parameter combination entry referred to by a slice shall be equal to num_ref_idx_l0_active_minus1 and num_ref_idx_l1_active_minus1 of the same slice.

If hps_num_ref_idx_active_override_flag is equal to 1, num_ref_idx_l0_active_minus1 and, when hps_rplm_slice_type is equal to B, num_ref_idx_l1_active_minus1, are inferred for the ref_pic_lists_modification( ) included in the hps_rplm( ) syntax structure to be equal to hps_num_ref_idx_l0_active_minus1 and hps_num_ref_idx_l1_active_minus1, respectively. Otherwise, num_ref_idx_l0_active_minus1 and, when hps_rplm_slice_type is equal to B, num_ref_idx_l1_active_minus1, are inferred for the ref_pic_lists_modification( ) included in the hps_rplm( ) syntax structure to be equal to hps_rplm_num_ref_idx_l0_active_minus1 and hps_rplm_num_ref_idx_l1_active_minus1, respectively.

HPS prediction weight table semantics are described next.

hps_wp_num_ref_idx_l0_active_minus1 and hps_wp_num_ref_idx_l1_active_minus1 are used to infer the values of num_ref_idx_l0_active_minus1 and num_ref respectively, within the pred_weight_table( ) syntax structure included in the hps_pred_weight_table( ) syntax structure. hps_wp_num_ref_idx_l0_active_minus1 and hps_wp_num_ref_idx_l1_active_minus1 in the header parameter combination entry referred to by a slice shall be equal to num_ref_idx_l0_active_minus1 and num_ref_idx_l1_active_minus1 of the same slice.

hps_wp_chroma_format_idc indicates the chroma_format_idc of a slice that refers to this header parameter combination entry. hps_wp_chroma_format_idc in the header parameter combination entry referred to by a slice shall be equal to chroma_format_idc of the active SPS for the same slice.

HPS deblocking filter semantics are described next.

hps_deblocking_filter_override_flag, hps_deblocking_filter_disabled_flag, hps_beta_offset_div2 and hps_tc_offset_div2 are used to infer the values of deblocking_filter_override_flag, slice_deblocking_filter_disabled_flag, slice_beta_offset_div2 and slice_tc_offset_div2, respectively, as specified in slice segment header semantics.

HPS slice segment header extension semantics hps_slice_segment_header_extension_length and hps_slice_segment_header_extension_data_byte[i] are used to infer the values of slice_segment_header_extension_length and slice_segment_header_extension_data_byte[i], respectively, as specified in slice segment header semantics.

HPS other parameters semantics are described next.

hps_temporal_mvp_enabled_flag, hps_sao_luma_flag, hps_sao_chroma_flag, hps_mvd_l1_zero_flag, hps_cabac_init_flag, hps_collocated_from_l0_flag, hps_collocated_ref_idx, hps_five_minus_max_num_merge_cand, hps_qp_delta, hps_cb_qp_offset, hps_cr_qp_offset and hps_loop_filter_across_slices_enabled_flag are used to infer the values of slice_temporal_mvp_enabled_flag, slice_sao_luma_flag, slice_sao_chroma_flag, mvd_l1_zero_flag, cabac_init_flag, collocated_from_l0_flag, collocated_ref_idx, five_minus_max_num_merge_cand, slice_qp_delta, slice_cb_qp_offset, slice_cr_qp_offset and slice_loop_filter_across_slices_enabled_flag, respectively, as specified in slice segment header semantics.

The use of the slice header inheritance mechanism may be conditioned on a picture parameter set flag (pps_slice_header_inherit_enabled_flag) and a slice header flag (slice_header_inherit_flag). That is, the picture parameter set may contain an indicator for indicating to the decoder whether the slice header inheritance mechanism is used. In other words, the indicator defines whether the slice header parameters may be determined so that they are determined by using the combination parameter set mechanism. Similarly, the slice header flag may determine whether the combination parameter set mechanism is used for the slice. In such a case that the mechanism is used, the header parameter set entry index may be decoded from the bitstream and used for determining the slice header parameter values (that would otherwise need to be encoded into and decoded from the slice header). The picture parameter set (PPS) syntax may be as shown in the table below.

| pic_parameter_set_rbsp( ) { | Descriptor |
|---|---|
| pps_pic_parameter_set_id | ue(v) |
| pps_seq_parameter_set_id | ue(v) |
| dependent_slice_segments_enabled_flag | u(1) |
| output_flag_present_flag | u(1) |
| num_extra_slice_header_bits | u(3) |
| sign_data_hiding_enabled_flag | u(1) |
| cabac_init_present_flag | u(1) |
| num_ref_idx_l0_default_active_minus1 | ue(v) |
| num_ref_idx_l1_default_active_minus1 | ue(v) |
| init_qp_minus26 | se(v) |
| constrained_intra_pred_flag | u(1) |
| transform_skip_enabled_flag | u(1) |
| cu_qp_delta_enabled_flag | u(1) |
| if( cu_qp_delta_enabled_flag ) | |
|    diff_cu_qp_delta_depth | ue(v) |
| pps_cb_qp_offset | se(v) |
| pps_cr_qp_offset | se(v) |
| pps_slice_chroma_qp_offsets_present_flag | u(1) |
| weighted_pred_flag | u(1) |
| weighted_bipred_flag | u(1) |
| transquant_bypass_enabled_flag | u(1) |
| tiles_enabled_flag | u(1) |
| entropy_coding_sync_enabled_flag | u(1) |
| if( tiles_enabled_flag ) { | |
|    num_tile_columns_minus1 | ue(v) |
|    num_tile_rows_minus1 | ue(v) |
|    uniform_spacing_flag | u(1) |
|    if( !uniform_spacing_flag ) { | |
|       for( i = 0; i < num_tile_columns_minus1; i++ ) | |
|          column_width_minus1[ i ] | ue(v) |
|       for( i = 0; i < num_tile_rows_minus1; i++ ) | |
|          row_height_minus1[ i ] | ue(v) |
|    } | |
|    loop_filter_across_tiles_enabled_flag | u(1) |
| } | |
| pps_loop_filter_across_slices_enabled_flag | u(1) |
| deblocking_filter_control_present_flag | u(1) |
| if( deblocking_filter_control_present_flag ) { | |
|    deblocking_filter_override_enabled_flag | u(1) |
|    pps_deblocking_filter_disabled_flag | u(1) |
|    if( !pps_deblocking_filter_disabled_flag ) { | |
|       pps_beta_offset_div2 | se(v) |
|       pps_tc_offset_div2 | se(v) |
|    } | |
| } | |
| if( nuh_layer_id > 0 ) | |
|    pps_infer_scaling_list_flag | u(1) |
| if( pps_infer_scaling_list_flag ) | |
|    pps_scaling_list_ref_layer_id | u(6) |
| else { | |
|    pps_scaling_list_data_present_flag | u(1) |
|    if( pps_scaling_list_data_present_flag ) | |
|       scaling_list_data( ) | |
| } | |
| lists_modification_present_flag | u(1) |
| log2_parallel_merge_level_minus2 | ue(v) |
| slice_segment_header_extension_present_flag | u(1) |
| pps_extension_flag | u(1) |
| if( pps_extension_flag ) | |
|    pps_slice_header_inherit_enabled_flag | u(1) |
|    pps_extension2_flag | u(1) |
|    if( pps_extension2_flag ) | |
|       while( more_rbsp_data( ) ) | |
|          pps_extension_data_flag | u(1) |
| rbsp_trailing_bits( ) | |
| } | |

The slice header syntax may be as shown in the table below.

| slice_segment_header( ) { | Descriptor |
|---|---|
| first_slice_segment_in_pic_flag | u(1) |
| if( nal_unit_type >= BLA_W_LP && nal_unit_type <= RSV_IRAP_VCL23 ) | |
|    no_output_of_prior_pics_flag | u(1) |
| slice_pic_parameter_set_id | ue(v) |

-continued

| slice_segment_header( ) { | Descriptor |
|---|---|
|   if( !first_slice_segment_in_pic_flag ) { | |
|     if( dependent_slice_segments_enabled_flag ) | |
|       dependent_slice_segment_flag | u(1) |
|       slice_segment_address | u(v) |
|   } | |
|   if( !dependent_slice_segment_flag ) { | |
|     i = 0 | |
|     if( num_extra_slice_header_bits > i ) { | |
|       i++ | |
|       discardable_flag | u(1) |
|     } | |
|     if( num_extra_slice_header_bits > i ) { | |
|       i++ | |
|       cross_layer_bla_flag | u(1) |
|     } | |
|     if( num_extra_slice_header_bits > i ) { | |
|       i++ | |
|       poc_reset_flag | u(1) |
|     } | |
|     for( ~~i=+~~; i < num_extra_slice_header_bits; i++ ) | |
|       slice_reserved_flag[ i ] | u(1) |
|     slice_type | ue(v) |
|     if( output_flag_present_flag ) | |
|       pic_output_flag | u(1) |
|     if( separate_colour_plane_flag = = 1 ) | |
|       colour_plane_id | u(2) |
|     if( ( nuh_layer_id > 0 && | |
| !poc_lsb_not_present_flag[ LayerIdxInVPS[ nuh_layer_id ] ] ) | |
|         || ( nal_unit_type != IDR_W_RADL && nal_unit_type != IDR_N_LP ) ) | |
|       slice_pic_order_cnt_lsb | u(v) |
|     if( pps_slice_header_inherit_enabled_flag ) { | |
|       slice_header_inherit_flag | u(1) |
|       if( slice_header_inherit_flag ) | |
|         slice_hps_id | ue(v) |
|       hps_entry_idx_present_flag | u(1) |
|       if( hps_entry_idx_present_flag ) | |
|         hps_entry_idx | u(v) |
|     } | |
|     if( nal_unit_type != IDR_W_RADL && nal_unit_type != IDR_N_LP ) { | |
|       if( !inheritRpsFlag ) | |
|         short_term_ref_pic_set_sps_flag | u(1) |
|       if( !short_term_ref_pic_set_sps_flag ) | |
|         short_term_ref_pic_set( num_short_term_ref_pic_sets ) | |
|       else if( !inheritRpsFlag || num_short_term_ref_pic_sets > 1 ) | |
|         short_term_ref_pic_set_idx | u(v) |
|       if( long_term_ref_pics_present_flag ) { | |
|         if( !inheritRpsFlag && num_long_term_ref_pics_sps > 0 ) | |
|           num_long_term_sps | ue(v) |
|         if( !inheritRpsFlag ) | |
|           num_long_term_pics | ue(v) |
|         for( i = 0; i < num_long_term_sps + num_long_term_pics; i++ ) { | |
|           if( i < num_long_term_sps ) { | |
|             if( num_long_term_ref_pics_sps > 1 ) | |
|               lt_idx_sps[ i ] | u(v) |
|           } else { | |
|             poc_lsb_lt[ i ] | u(v) |
|             used_by_curr_pic_lt_flag[ i ] | u(1) |
|           } | |
|           delta_poc_msb_present_flag[ i ] | u(1) |
|           if( delta_poc_msb_present_flag[ i ] ) | |
|             delta_poc_msb_cycle_lt[ i ] | ue(v) |
|         } | |
|       } | |
|       if( !inheritOtherParamFlag && sps_temporal_mvp_enabled_flag ) | |
|         slice_temporal_mvp_enabled_flag | u(1) |
|     } | |
|     if( !inheritIlRpsFlag && nuh_layer_id > 0 && !all_ref_layers_active_flag && | |
|         NumDirectRefLayers[ nuh_layer_id ] > 0 ) { | |
|       inter_layer_pred_enabled_flag | u(1) |
|       if( inter_layer_pred_enabled_flag && NumDirectRefLayers[ nuh_layer_id ] > 1) { | |
|         if( !max_one_active_ref_layer_flag ) | |
|           num_inter_layer_ref_pics_minus1 | u(v) |

| slice_segment_header( ) { | Descriptor |
|---|---|
|       if( NumActiveRefLayerPics != NumDirectRefLayers[ nuh_layer_id ] ) | |
|          for( i = 0; i < NumActiveRefLayerPics; i++ ) | |
|             inter_layer_pred_layer_idc[ i ] | u(v) |
|       } | |
|   } | |
|   if( !inheritOtherParamFlag && sample_adaptive_offset_enabled_flag ) { | |
|     slice_sao_luma_flag | u(1) |
|     slice_sao_chroma_flag | u(1) |
|   } | |
|   if( slice_type = = P || slice_type = = B ) { | |
|     if( !inheritRplmFlag ) { | |
|       num_ref_idx_active_override_flag | u(1) |
|       if( num_ref_idx_active_override_flag ) { | |
|         num_ref_idx_l0_active_minus1 | ue(v) |
|         if( slice_type = = B ) | |
|           num_ref_idx_l1_active_minus1 | ue(v) |
|       } | |
|       if( lists_modification_present_flag && NumPicTotalCurr > 1 ) | |
|         ref_pic_lists_modification( ) | |
|     } | |
|     if( !inheritOtherParamFlag && slice_type = = B ) | |
|       mvd_l1_zero_flag | u(1) |
|     if( !inheritOtherParamFlag && cabac_init_present_flag ) | |
|       cabac_init_flag | u(1) |
|     if( !inheritOtherParamFlag && slice_temporal_mvp_enabled_flag ) { | |
|       if( slice_type = = B ) | |
|         collocated_from_l0_flag | u(1) |
|       if( ( collocated_from_l0_flag && num_ref_idx_l0_active_minus1 > 0 ) || | |
|         ( !collocated_from_l0_flag && num_ref_idx_l1_active_minus1 > 0 ) ) | |
|         collocated_ref_idx | ue(v) |
|     } | |
|     if( !inheritPredWeightTableFlag && | |
|       ( ( weighted_pred_flag && slice_type = = P ) || | |
|        ( weighted_bipred_flag && slice_type = = B ) ) ) | |
|       pred_weight_table( ) | |
|     if( !inheritOtherParamFlag ) | |
|       five_minus_max_num_merge_cand | ue(v) |
|   } | |
|   if( !inheritOtherParamFlag || hps_slice_qp_delta_present_flag ) { | |
|     slice_qp_delta | se(v) |
|     if( pps_slice_chroma_qp_offsets_present_flag ) { | |
|       slice_cb_qp_offset | se(v) |
|       slice_cr_qp_offset | se(v) |
|     } | |
|   } | |
|   if( !inheritDbfFlag ) { | |
|     if( deblocking_filter_override_enabled_flag ) | |
|       deblocking_filter_override_flag | u(1) |
|     if( deblocking_filter_override_flag ) { | |
|       slice_deblocking_filter_disabled_flag | u(1) |
|       if( !slice_deblocking_filter_disabled_flag ) { | |
|         slice_beta_offset_div2 | se(v) |
|         slice_tc_offset_div2 | se(v) |
|       } | |
|     } | |
|   } | |
|   if( !inheritOtherParamFlag && pps_loop_filter_across_slices_enabled_flag && | |
|     ( slice_sao_luma_flag || slice_sao_chroma_flag || | |
|       !slice_deblocking_filter_disabled_flag ) ) | |
|     slice_loop_fliter_across_slices_enabled_flag | u(1) |
|   } | |
|   if( tiles_enabled_flag || entropy_coding_sync_enabled_flag ) { | |
|     num_entry_point_offsets | ue(v) |
|     if( num_entry_point_offsets > 0 ) { | |
|       offset_len_minus1 | ue(v) |
|       for( i = 0; i < num_entry_point_offsets; i++ ) | |
|         entry_point_offset_minus1[ i ] | u(v) |
|     } | |
|   } | |
|   if( !inheritSliceSegmentHdrExtFlag && | |
| slice_segment_header_extension_present_flag ) { | |
|     slice_segment_header_extension_length | ue(v) |

| slice_segment_header( ) { | Descriptor |
|---|---|
|     for( i = 0; i < slice_segment_header_extension_length; i++) | |
|         slice_segment_header_extension_data_byte[ i ] | u(8) |
|     } | |
|     byte_alignment( ) | |
| } | | slice_header_inherit_flag equal to 0 specifies that inheritRpsFlag, inheritIlRpsFlag, inheritRplmFlag, inheritPredWeightTableFlag, inheritDbfFlag, inheritSliceHdrExtFlag and inheritOtherParamFlag are set equal to 0. When slice_header_inherit_flag is equal to 1, the derivation of variables inheritRpsFlag, inheritIlRpsFlag, inheritRplmFlag, inheritPredWeightTableFlag, inheritDbfFlag, inheritSliceHdrExtFlag and inheritOtherParamFlag and the inference of certain syntax element values is specified further below.

slice_hps_id specifies the value of header_parameter_set_id for the HPS in use.

hps_entry_idx_present_flag equal to 0 specifies that hps_entry_idx is not present. hps_entry_idx_present_flag specifies that hps_entry_idx is present. That is, the value of hps_entry_idx_present_flag determines whether or not the header parameter combination index of the combination in use is to be decoded from the slice header.

hps_entry_idx specifies an index of the header parameter combination entry used to infer values of certain syntax element of the slice segment header as specified further below. The length of the hps_entry_idx syntax element is Ceil(Log 2 (hps_num_poc_values_once+hps_num_poc_values_periodic)). When hps_entry_index_present_flag is equal to 1 and the length of the hps_entry_idx syntax element is equal to 0, hps_entry_idx is inferred to be equal to 0.

The variable hpsEntryIdx is derived as follows:
if(hps_entry_idx_present_flag)
hpsEntryIdx=hps_entry_idx
else
hpsEntryIdx=PocLsbToHpsEntryIdx[slice_pic_order_cnt_lsb]

When slice_header_inherit_flag is equal to 1, the following applies:
inheritRpsFlag=(hps_rps_idx[hpsEntryIdx][nuh_layer_id]>0)
inheritIlRpsFlag=(hps_il_rps_idx[hpsEntryIdx][nuh_layer_id]>0)
inheritRplmFlag=(hps_rplm_idx[hpsEntryIdx][nuh_layer_id]>0)
inheritPredWeightTableFlag=(hps_pred_weight_table_idx[hpsEntryIdx][nuh_layer_id]>0)
inheritDbfFlag=(hps_dbf_idx[hpsEntryIdx][nuh_layer_id]>0)
inheritSliceHdrExtFlag=(hps_slice_segment_header_extension_idx[hpsEntryIdx][nuh_layer_id]>0)
inheritOtherParamFlag=(hps_other_param_idx[hpsEntryIdx][nuh_layer_id]>0)

If inheritRpsFlag is equal to 0, the specifications of short_term_ref_pic_set_sps_flag, short_term_ref_pic_set_idx, num_long_term_sps and num_long_term_pics in subclause 7.4.7.1 apply. Otherwise (inheritRpsFlag is equal to 1), the following applies:
short_term_ref_pic_set_sps_flag is inferred to be equal to hps_short_term_ref_pic_set_sps_flag.

When short_term_ref_pic_set_sps_flag is equal to 1, short_term_ref_pic_set_idx is inferred to be equal to hps_short_term_ref_pic_set_idx.

If long_term_ref_pics_present_flag is equal to 1, num_long_term_sps is inferred to be equal to hps_num_long_term_sps. Otherwise, num_long_term_sps is inferred to be equal to 0.

If long_term_ref_pics_present_flag is equal to 1, num_long_term_pics is inferred to be equal to hps_num_long_term_pics. Otherwise, num_long_term_pics is inferred to be equal to 0.

When inheritIlRpsFlag is equal to 1, the following applies:
inter_layer_pred_enabled_flag is inferred to be equal to hps_inter_layer_pred_enabled_flag.
num_inter_layer_ref_pics_minus1 is inferred to be equal to hps_num_inter_layer_ref_pics_minus1.
When NumActiveRefLayerPics, as derived below, is not equal to NumDirectRefLayers[nuh_layer_id], inter_layer_pred_layer_idc[i] is inferred to be equal to hps_inter_layer_pred_layer_idc[i] for each value of i in the range of 0 to NumActiveRefLayerPics−1, inclusive.

If inheritRplmFlag is equal to 0, the specifications of num_ref_idx_active_override_flag, num_ref_idx_l0_active_minus1, num_ref_idx_l1_active_minus1 and ref_pic_lists_modification( ) in subclause 7.4.7.1 apply. Otherwise (inheritRplmFlag is equal to 1), the following applies:
num_ref_idx_active_override_flag is inferred to be equal to hps_num_ref_idx_active_override_flag.
When num_ref_idx_active_override_flag is equal to 1, num_ref_idx_l0_active_minus1 is inferred to be equal to hps_num_ref_idx_l0_active_minus1.
When the current slice is a P or B slice and num_ref_idx_active_override_flag is equal to 0, num_ref_idx_l0_active_minus1 is inferred to be equal to num_ref_idx_l0_default_active_minus1.
If num_ref_idx_active_override_flag is equal to 1, num_ref_idx_l1_active_minus1 is inferred to be equal to hps_num_ref_idx_l1_active_minus1. Otherwise, num_ref_idx_l1_active_minus1 is inferred to be equal to num_ref_idx_l1_default_active_minus1.
The semantics and decoding process of the ref_pic_lists_modification( ) syntax structure referred to by the header parameter combination entry with index hpsEntryIdx are the same as those that would apply to the ref_pic_lists_modification( ) syntax structure with the same content included in the current slice segment header.

If inheritPredWeightTableFlag is equal to 0, the specifications of pred_weight_table( ) in subclause 7.4.7.1 apply. Otherwise (inheritPredWeightTableFlag is equal to 1), the following applies:
When either weighted_pred_flag is equal to 1 and the current slice is a P slice or weight_bipred_flag is equal to 1 and the current slice is a B slice, the semantics and decoding process of the pred_weight_table( ) syntax structure referred to by the header parameter combination entry with index hpsEntryIdx are the same as those that would apply to the pred_weight_table( ) syntax structure with the same content included in the current slice segment header.

If inheritDbfFlag is equal to 0, the specifications of deblocking_filter_override_flag, slice_deblocking_filter_disabled_flag, slice_beta_offset_div2 and slice_tc_offset_div2 in subclause 7.4.7.1 apply. Otherwise (inheritDbfFlag is equal to 1), the following applies:

deblocking_filter_override_flag is inferred to be equal to hps_deblocking_filter_override_flag.

If deblocking_filter_override_flag is equal to 1, slice_deblocking_filter_disabled_flag is inferred to be equal to hps_deblocking_filter_disabled_flag. Otherwise, slice_deblocking_filter_disabled_flag is inferred to be equal to pps_deblocking_filter_disabled_flag.

If slice_deblocking_filter_disabled_flag is equal to 0, the values of slice_beta_offset_div2 and slice_tc_offset_div2 are inferred to be equal to hps_beta_offset_div2 and hps_tc_offset_div2, respectively. Otherwise, the values of slice_beta_offset_div2 and slice_tc_offset_div2 are inferred to be equal to pps_beta_offset_div2 and pps_tc_offset_div2, respectively.

If inheritSliceHdrExtFlag is equal to 0, the specifications of slice_segment_header_extension_length and slice_segment_header_extension_data_byte[i] in subclause 7.4.7.1 apply. Otherwise (inheritSliceHdrExtFlag is equal to 1), the following applies:

slice_segment_header_extension_length is inferred to be equal to hps_slice_segment_header_extension_length.

slice_segment_header_extension_data_byte[i] is inferred to be equal to hps_slice_segment_header_extension_data_byte[i] for each value of i in the range of 0 to slice_segment_header_extension_length−1, inclusive.

If inheritOtherParam is equal to 0, the specifications of slice_temporal_mvp_enabled_flag, slice_sao_luma_flag, slice_sao_chroma_flag, mvd_l1_zero_flag, cabac_init_flag, collocated_from_l0_flag, collocated_ref_idx, five_minus_max_num_merge_cand, slice_qp_delta, slice_cb_qp_offset, slice_cr_qp_offset and slice_loop_filter_across_slices_enabled_flag in subclause 7.4.7.1 apply. When inheritOtherParam is equal to 1, the following applies:

slice_temporal_mvp_enabled_flag is inferred to be equal to hps_temporal_mvp_enabled_flag.

slice_sao_luma_flag is inferred to be equal to hps_sao_luma_flag.

slice_sao_chroma_flag is inferred to be equal to hps_sao_chroma_flag.

mvd_l1_zero_flag is inferred to be equal to hps_mvd_l1_zero_flag.

cabac_init_flag is inferred to be equal to hps_cabac_init_flag.

If slice_temporal_mvp_enabled_flag is equal to 1 and the current slice is a B slice, collocated_from_l0_flag is inferred to be equal to hps_collocated_from_l0_flag. Otherwise, collocated_from_l0_flag is inferred to be equal to 1.

collocated_ref_idx is inferred to be equal to hps_collocated_ref_idx.

five_minus_max_num_merge_cand is inferred to be equal to hps_five_minus_max_num_merge_cand.

When hps_slice_qp_delta_present_flag is equal to 0, slice_qp_delta is inferred to be equal to hps_qp_delta.

When pps_slice_chroma_qp_offsets_present_flag is equal to 1, slice_cb_qp_offset is inferred to be equal to hps_cb_qp_offset and slice_cr_qp_offset is inferred to be equal to hps_cr_qp_offset.

slice_loop_filter_across_slices_enabled_flag is inferred to be equal to hps_loop_filter_across_slices_enabled_flag.

If the identifier of the header parameter set combination to be used is not carried in the slice header, the current picture may also be mapped to the header parameter set used in another manner. A picture may be mapped to a header parameter set combination as follows (see also FIG. 7):

a) The slice segment header contains slice_hps_id, which is the identifier of the header parameter set RBSP being used in the slice.

b) The header parameter set contains header parameter combination entries for N (=hps_num_poc_values_once)+M (=hps_num_poc_values_periodic) entries. An initial picture order count (POC) least significant bits (LSB) (=hps_initial_pic_order_cnt_lsb) for the first entry is specified. A picture order count delta (hps_poc_delta[i]) is specified for each of the later entries, specifying the difference, in modulo arithmetic, between the POC LSB value of the previous entry and the POC LSB value of the current entry. POC LSB values are mapped to header parameter combination entries accordingly, where the M entries are repeated until the entire value range of POC LSB values (from 0 to MaxPicOrderCntLsb−1, inclusive) is taken.

Figure 7:
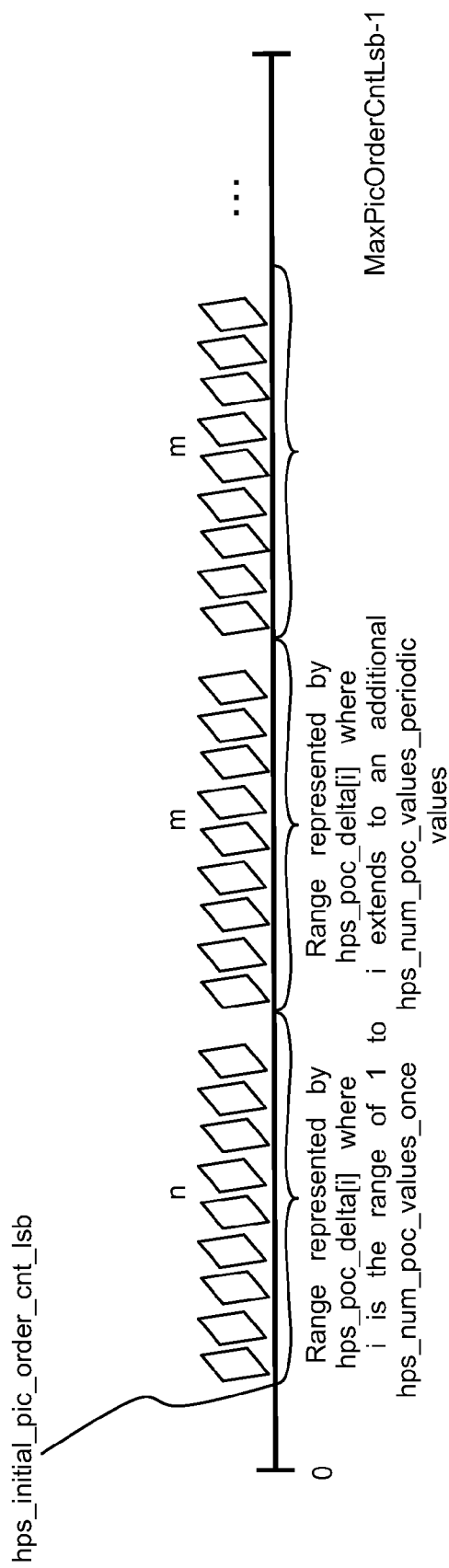
FIG. 7 shows an illustration of mapping picture order count least significant bits (POC LSB) values to header parameter combination entries.

FIG. 7 illustrates this mapping process. For the first N pictures, the header parameter combinations 0, 1, 2, . . . , up until the number hps_num_poc_values_once−1 (in this case the number of combinations equaling N) is used, respectively. For the next M pictures, the header parameter combinations hps_num_poc_values_once+0, hps_num_poc_values_once+1, hps_num_poc_values_once+2, . . . up until the number hps_num_poc_values_once+hps_num_poc_values_periodic−1 (in this case the number of further combinations equaling M) are used. After this, the M last combination entries are run through again for the next set of pictures.

For example, both N and M may be equal to 8 (the "GOP length") and an HPS may be sent for each TRAP picture (to enable starting of decoding from each TRAP picture). The N header parameter combination entries may differ from the M header parameter combination entries for example in that not all reference pictures may be available in the N entries and hence RPS can differ in the respective entries among the N and M entries.

c) Either slice_pic_order_cnt_lsb or hps_entry_idx (included in the slice segment header), as conditioned by hps_entry_idx_present_flag, is used to pick the header parameter combination entry within the HPS RBSP. When slice_pic_order_cnt_lsb is used, it used to index the created mapping shown above. hps_entry_idx specifies an index among the N+M header parameter combination entries.

In some embodiments, the mapping process may map more than one header parameter combination for the same identifier value, such as a slice's picture order count least significant bits slice_pic_order_cnt_lsb value. For example, the mapping may be repeated in modulo arithmetic. For example, the header parameter set contains header parameter combination entries for N (=hps_num_poc_values_once)+M (=hps_num_poc_values_periodic) entries. An initial picture order count (POC) least significant bits (LSB) (=hps_initial_pic_order_cnt_lsb) for the first entry is specified. A picture order count delta (hps_poc_delta[i]) is specified for each of the later entries, specifying the difference, in modulo arithmetic, between the POC LSB value of the previous entry and the POC LSB value of the current entry.

POC LSB values are mapped to header parameter combination entries accordingly, where the M entries are repeated. For each POC LSB value an array of header parameter combination entries, CombEntry[pocLsb][idx] may be maintained or derived. When a POC LSB value has not been mapped earlier to a header parameter combination entry, CombEntry[pocLsb][0] is set equal to the mapped entry for a mapped POC LSB value pocLsb. If a POC LSB value has already been taken into use for an earlier entry, CombEntry[pocLsb][i] is set equal to the mapped entry for a mapped POC LSB value pocLsb for i equal to the first unused index. The slice header may contain an additional syntax element, for example called map loop index (map_loop_idx), which is used to identify the parameter combination entry that is referred and which may be for example variable-length-coded e.g. as ue(v). For example, the selected header parameter combination entry may be CombEntry[slice_pic_order_cnt_lsb][map_loop_idx].

In some embodiments, the slice header syntax structure may contain one or more additional syntax elements that specify one or more offsets for the mapping specified in the parameter set for one or more syntax elements in the slice header that have another primary purpose than acting as a combination parameter set identifier. For example, if slice_pic_order_cnt_lsb is used for the mapping, the offset value may be added, in modulo MaxPicOrderCntLsb arithmetic, to the value of slice_pic_order_cnt_lsb of the current slice header in order to obtain a value that is used as an identifier to obtain the parameter set combination.

The various embodiments may have the following advantages.

The bit count and bitrate used for slice header coding is reduced. Slices become smaller in size, which may have the additional advantage that a slice fits into one packet in a transmission protocol that is used, such as in one link layer packet. Consequently, error resilience may be improved.

One parameter combination index is sufficient to be provided in the slice header (instead of requiring one ID for each set of syntax elements). Furthermore, in many cases other slice header syntax elements, such as the combination of slice_pic_order_cnt_lsb and nuh_layer_id, is used as a parameter combination index—and hence no overhead is caused in the slice header.

The "forward-looking" mapping of header parameter combination entries to slice_pic_order_cnt_lsb values enables coding of many header parameter subset structures within the same header parameter set RBSP and facilitates compact signaling which header parameter set is in use (as fewer header parameter sets may be used and hence slice_hps_id can be shorter) and which header parameter combination entry is in use (as typically no additional syntax element would be needed).

The encoder may make most decisions on slice header parameters based on the given configuration rather than based on the picture content. The header parameter subsets for which dynamic content-based parameter value selection is made may be excluded from the header parameter combination entries and hence coded conventionally in the slice segment headers themselves.

The optional hps_entry_idx may make it possible to use the HPS (header parameter set) mechanism when HPSs are sent out-of-band or when MaxPicOrderCntLsb is smaller than the interval of sending HPSs in-band (and taking them in use).

HPS RBSPs can be repeated in the bitstream as many times as needed to obtain sufficient error resilience. Header parameter sets can be sent out-of-band for example using a reliable transmission protocol.

The slice segment header syntax is kept intact until slice_pic_order_cnt_lsb, inclusive, which enables POC-based AU boundary detection without HPS parsing and also slice_pic_order_cnt_lsb-based indexing of header parameter combination entries.

A different number of syntax element assignments can be given for different subsets of parameters. Hence, parameter sets can be efficiently coded, as the same syntax element assignment needs not be repeated in the parameter set. for example, if parameters of a certain subset remain unchanged, its syntax element assignment needs to be present only once in the parameter set, as the same assignment index for the subset can be used in each combination parameter set.

In the above, the example embodiments have been described with the help of syntax of the bitstream. It needs to be understood, however, that the corresponding structure and/or computer program may reside at the encoder for generating the bitstream and/or at the decoder for decoding the bitstream. Likewise, where the example embodiments have been described with reference to an encoder, it needs to be understood that the resulting bitstream and the decoder have corresponding elements in them. Likewise, where the example embodiments have been described with reference to a decoder, it needs to be understood that the encoder has structure and/or computer program for generating the bitstream to be decoded by the decoder.

In the above, some embodiments have been described where syntax element assignments reside in the same syntax structure, such as header parameter set syntax structure, as the combination parameter sets that refer to the syntax element assignments using assignment identifiers. It needs to be understood that embodiments could be similarly realized when syntax element assignments and combination parameter sets reside in different syntax structures, such as different NAL units.

In the above, several embodiments are described with reference to slices and slice headers. It needs to be understood that embodiments apply likewise to other picture partitioning units and their headers. For example, embodiments could be realized with group of blocks (GOB) of the H.263 standard or any similar unit that consists of an integer number of rows of elementary coding units.

In the above, some embodiments have been described in relation to particular types of parameter sets. It needs to be understood, however, that embodiments could be realized with any type of parameter set or other syntax structure in the bitstream.

In the above, embodiments have been described where a parameter set combination contains an assignment identifier for each parameter subset. Embodiments could be similarly realized for a more nested combination. For example, two or more of parameter subsets may comprise a second-level parameter subset. The parameter set may comprise one or more indexed second-level parameter subsets (of the same type) that are indicated by a set of indexes to said two or more parameter subsets. The combination parameter set may comprise an index to the second-level parameter subset rather than the set of indexes to said two or more parameter subsets. It needs to be understood that embodiments are not limited to any particular level of nesting of parameter subsets, but for example a third-level parameter subset could likewise be used.

In the above, some embodiments have been described in relation to encoding indications, syntax elements, and/or syntax structures into a bitstream or into a coded video sequence and/or decoding indications, syntax elements, and/or syntax structures from a bitstream or from a coded video sequence. It needs to be understood, however, that embodiments could be realized when encoding indications, syntax elements, and/or syntax structures into a syntax structure or a data unit that is external from a bitstream or a coded video sequence comprising video coding layer data, such as coded slices, and/or decoding indications, syntax elements, and/or syntax structures from a syntax structure or a data unit that is external from a bitstream or a coded video sequence comprising video coding layer data, such as coded slices.

In the above, some embodiments have been described in a manner that slice header parameters of enhancement layer slices (e.g. slices with nuh_layer_id greater than 0) can be inherited from values of slice header syntax elements from a header parameter set, while slice header parameters of base layer slices do not inherit from a header parameter set but rather a "full" slice header is coded or decoded. In needs to be understood that embodiments of the invention may similarly be realized for a single-layer bitstream and/or for a base layer of a scalable bitstream.

It needs to be understood that embodiments may be applicable to any types of layered coding, for example for multiview coding, quality scalability, spatial scalability, and for multiview video plus depth coding, and any types of layers. It also needs to be understood that embodiments may be realized by referring layers with other terminology, such as views, and/or pictures with other terminology, such as view components.

Encoding a picture is a process that results in a coded picture, that is, a sequence of bits or a coded representation of a picture. A coded picture may be regarded as a bitstream or a part of a bitstream, the bitstream containing encoded information that is used for decoding the picture at the decoder. Encoding information in a bitstream is a process that results in a coded representation of said information in the bitstream, e.g. a syntax element represented by b(8), se(v), ue(v), or u(n), described above. When encoding a picture, the picture being encoded may be fully or partly held e.g. in working memory of the encoder, and the resulting coded picture may be fully or partly held in the working memory, as well. The bitstream resulting from encoding syntax elements may be achieved so that the syntax elements are first formed into the memory of the encoder, and then encoded to pieces of bitstream that are also held in the encoder memory. The resulting bitstream may be checked for correctness, e.g. by ensuring that bit patterns that match start codes (e.g. NAL unit start codes) have not been formed (e.g. within NAL units) in the bitstream. At the decoder, the bitstream may be fully or partly held in the memory for decoding, and by decoding the bitstream, syntax elements are formed in the decoder memory, which syntax elements are in turn used to obtain the decoded picture.

Although the above examples describe embodiments of the invention operating within a codec within an electronic device, it would be appreciated that the invention as described below may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatuses, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The various embodiments of the invention can be implemented with the help of computer program code that resides in a memory and causes the relevant apparatuses to carry out the invention. For example, a terminal device may comprise circuitry and electronics for handling, receiving and transmitting data, computer program code in a memory, and a processor that, when running the computer program code, causes the terminal device to carry out the features of an embodiment. Yet further, a network device may comprise circuitry and electronics for handling, receiving and transmitting data, computer program code in a memory, and a processor that, when running the computer program code, causes the network device to carry out the features of an embodiment.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys Inc., of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Individual method steps or syntax elements may be used alone, where technically feasible and appropriate, or they may be combined with other steps and elements. The steps and elements may be performed in various different orders. It is understandable to a skilled person that software for carrying out a method step e.g. on an apparatus may be used together with other software for carrying out other method steps even in the case that some other steps have been omitted.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended examples. However, all such and similar modifications of the teachings of this invention will still fall within the scope of this invention.

In the following some numbered examples will be provided.

1. A method comprising:
    forming a plurality of syntax element assignments, each syntax element assignment relating to a subset of parameters of a parameter set, and each syntax element assignment comprising assignments of values to said related subset of parameters,
    forming an index for each of said plurality of syntax element assignments,
    forming a plurality of combination parameter sets, each combination parameter set comprising indexes of a plurality of said syntax element assignments of said sub-sets of parameters, and
        encoding at least one said combination parameter set into a video bitstream for determining parameter values for video decoding.

2. A method according to example 1, comprising:
    forming a combination parameter set index for each of said plurality of combination parameter sets, and
    encoding at least one said combination parameter set index into a video bitstream for determining parameter values for video decoding.

3. A method according to example 1, comprising:
    determining a combination parameter set to be used according to picture parameters,
    encoding an indication into a video bitstream indicating that a combination parameter set index is not encoded into slice headers of the video bitstream, and that the combination parameter set to be used is to be determined from picture parameters.

4. A method according to example 3, comprising:
    determining a combination parameter set to be used from a picture order count syntax element.

5. A method according to any of the examples 1 to 4, comprising:
    encoding an indicator into the video bitstream that combination parameter sets are to be used, and
    encoding said combination parameter sets to a header parameter set.

6. A method according to any of the examples 1 to 5, comprising:
    encoding an indicator into the video bitstream in a slice header that combination parameter sets are to be used, and
    encoding an identifier of at least one said combination parameter set to a slice header.

7. A method according to any of the examples 1 to 6, comprising:
    forming at least one combination syntax element assignment by using at least two other syntax element assignments so that said combination syntax element assignment comprises a plurality of indexes of other syntax element assignments;
    forming an index for said combination syntax element assignment, and
    encoding said combination syntax element assignment to said video bitstream.

8. A method according to example 7, comprising:
    forming at least one combination parameter set comprising indexes of a plurality of said syntax element assignments of said sub-sets of parameters and said index for said combination syntax element assignment.

9. A method comprising:
    encoding a first uncompressed picture into a first coded picture comprising a first slice and
    encoding a second uncompressed picture into a second coded picture comprising a second slice;
    the first slice and the second slice comprising a first slice header and a second slice header, respectively, both conforming to a slice header syntax structure;
    the encoding comprising:
    classifying syntax elements for the slice header syntax structure into a first set and a second set;
    determining a first at least one set of values for the first set and a second at least one set of values for the at least one second set;
    encoding in a header parameter set the first at least one set of values and the second at least one set of values;
    determining a first combination of a first set among the first at least one set of values and a second set of the second at least second set of values;
    determining a second combination of a third set among the first at least one set of values and a fourth set of the second at least second set of values;
    encoding in a header parameter set at least one first syntax element indicative of the first combination and at least one second syntax element indicative of the second combination;
    encoding the first slice header with a reference to the first combination;
    encoding the second slice header with a reference to the second combination.

10. A method comprising:
    encoding a first uncompressed picture into a first coded picture comprising a first slice and
    encoding a second uncompressed picture into a second coded picture comprising a second slice;
    the first slice and the second slice comprising a first slice header and a second slice header, respectively, both conforming to a slice header syntax structure;
    the encoding comprising:
    classifying syntax elements for the slice header syntax structure into a first set and a second set;

determining a first at least one set of values for the first set and a second at least one set of values for the at least one second set;

encoding in a header parameter set the first at least one set of values and the second at least one set of values;

determining a first combination of a first set among the first at least one set of values and a second set of the second at least second set of values;

determining a second combination of a third set among the first at least one set of values and a fourth set of the second at least second set of values;

encoding in a header parameter set at least one first syntax element indicative of the first combination and at least one second syntax element indicative of the second combination;

encoding the first slice header so that the use of said first combination for decoding of the slice data can be determined from other slice header syntax elements than a reference to the first combination, and omitting a reference to the first combination from the slice header;

encoding the second slice header so that the use of said second combination for decoding of the slice data can be determined from other slice header syntax elements than a reference to the second combination, and omitting a reference to the second combination from the slice header.

11. A method comprising:

decoding from a video bitstream a plurality of syntax element assignments, each syntax element assignment relating to a subset of parameters of a parameter set, and each syntax element assignment comprising assignments of values to said related subset of parameters, decoding from said video bitstream an index for each of said plurality of syntax element assignments, decoding from said video bitstream a plurality of combination parameter sets, each combination parameter set comprising indexes of a plurality of said syntax element assignments of said sub-sets of parameters, decoding from said video bitstream at least one said combination parameter set for determining parameter values for video decoding.

12. A method according to example 11, comprising:

decoding from said video bitstream combination parameter set indexes, each index for identifying one of said plurality of combination parameter sets, and decoding from said video bitstream at least one said combination parameter set index for determining parameter values for video decoding.

13. A method according to example 11, comprising:

determining a combination parameter set to be used according to picture parameters, decoding from said video bitstream an indication indicating that a combination parameter set index is not encoded into slice headers of the video bitstream, and determining the combination parameter set to be used from picture parameters.

14. A method according to example 13, comprising:

determining a combination parameter set to be used from a picture order count syntax element.

15. A method according to any of the examples 11 to 14, comprising:

decoding from said video bitstream an indicator that combination parameter sets are to be used, and decoding from said video bitstream said combination parameter sets from a header parameter set.

16. A method according to any of the examples 11 to 15, comprising:

decoding from said video bitstream an indicator in a slice header that combination parameter sets are to be used, and decoding from said video bitstream an identifier of at least one said combination parameter set from a slice header.

17. A method according to any of the examples 11 to 16, comprising:

decoding from said video bitstream at least one combination syntax element assignment by using at least two other syntax element assignments so that said combination syntax element assignment comprises a plurality of indexes of other syntax element assignments;

decoding from said video bitstream an index for said combination syntax element assignment, and decoding from said video bitstream said combination syntax element assignment.

18. A method according to example 17, comprising:

decoding from said video bitstream at least one combination parameter set comprising indexes of a plurality of said syntax element assignments of said sub-sets of parameters and said index for said combination syntax element assignment.

19. A method comprising:

decoding from a video bitstream a first coded picture comprising a first slice into a first uncompressed picture and decoding from said video bitstream a second coded picture comprising a second slice into a second uncompressed picture;

the first slice and the second slice comprising a first slice header and a second slice header, respectively, both conforming to a slice header syntax structure;

the decoding comprising:

decoding from a header parameter set a first at least one set of values of a first set of syntax elements of a slice header syntax structure and a second at least one set of values of a second set of syntax elements of said slice header syntax structure;

decoding a first combination of a first set among the first at least one set of values and a second set of the second at least second set of values;

decoding a second combination of a third set among the first at least one set of values and a fourth set of the second at least second set of values;

decoding from a header parameter set at least one first syntax element indicative of the first combination and at least one second syntax element indicative of the second combination;

decoding a reference to the first combination from the first slice header;

decoding a reference to the second combination from the second slice header.

20. A method comprising:

decoding from a video bitstream a first coded picture comprising a first slice into a first uncompressed picture and decoding from said video bitstream a second coded picture comprising a second slice into a second uncompressed picture;

the first slice and the second slice comprising a first slice header and a second slice header, respectively, both conforming to a slice header syntax structure;

the decoding comprising:

decoding from a header parameter set a first at least one set of values of a first set of syntax elements of a slice header syntax structure and a second at least one set of values of a second set of syntax elements of said slice header syntax structure;

decoding a first combination of a first set among the first at least one set of values and a second set of the second at least second set of values;

decoding a second combination of a third set among the first at least one set of values and a fourth set of the second at least second set of values;

decoding from a header parameter set at least one first syntax element indicative of the first combination and at least one second syntax element indicative of the second combination;

decoding from the first slice header the use of said first combination for decoding of the slice data, the decoding being done from other slice header syntax elements than a reference to the first combination;

decoding from the second slice header the use of said second combination for decoding of the slice data, the decoding being done from other slice header syntax elements than a reference to the second combination.

21. An apparatus comprising at least one processor and memory, said memory containing computer program code, said computer program code being configured to, when executed on the at least one processor, cause the apparatus to:

form a plurality of syntax element assignments, each syntax element assignment relating to a subset of parameters of a parameter set, and each syntax element assignment comprising assignments of values to said related subset of parameters, form an index for each of said plurality of syntax element assignments, form a plurality of combination parameter sets, each combination parameter set comprising indexes of a plurality of said syntax element assignments of said sub-sets of parameters, and encode at least one said combination parameter set into a video bitstream for determining parameter values for video decoding.

22. An apparatus comprising at least one processor and memory, said memory containing computer program code, said computer program code being configured to, when executed on the at least one processor, cause the apparatus to:

decode from a video bitstream a plurality of syntax element assignments, each syntax element assignment relating to a subset of parameters of a parameter set, and each syntax element assignment comprising assignments of values to said related subset of parameters, decode from said video bitstream an index for each of said plurality of syntax element assignments, decode from said video bitstream a plurality of combination parameter sets, each combination parameter set comprising indexes of a plurality of said syntax element assignments of said sub-sets of parameters, and decode from said video bitstream at least one said combination parameter set for determining parameter values for video decoding.

23. An apparatus comprising at least one processor and memory, said memory containing computer program code, said computer program code being configured to, when executed on the at least one processor, cause the apparatus to carry out the method according to any of the examples 1 to 20.

24. An encoder comprising at least one processor and memory, said memory containing computer program code, said computer program code being configured to, when executed on the at least one processor, cause the encoder to:

form a plurality of syntax element assignments, each syntax element assignment relating to a subset of parameters of a parameter set, and each syntax element assignment comprising assignments of values to said related subset of parameters, form an index for each of said plurality of syntax element assignments, form a plurality of combination parameter sets, each combination parameter set comprising indexes of a plurality of said syntax element assignments of said sub-sets of parameters, and encode at least one said combination parameter set into a video bitstream for determining parameter values for video decoding.

25. A decoder comprising at least one processor and memory, said memory containing computer program code, said computer program code being configured to, when executed on the at least one processor, cause the encoder to:

decode from a video bitstream a plurality of syntax element assignments, each syntax element assignment relating to a subset of parameters of a parameter set, and each syntax element assignment comprising assignments of values to said related subset of parameters, decode from said video bitstream an index for each of said plurality of syntax element assignments, decode from said video bitstream a plurality of combination parameter sets, each combination parameter set comprising indexes of a plurality of said syntax element assignments of said sub-sets of parameters, and decode from said video bitstream at least one said combination parameter set for determining parameter values for video decoding.

26. An encoder comprising at least one processor and memory, said memory containing computer program code, said computer program code being configured to, when executed on the at least one processor, cause the apparatus to carry out the method according to any of the examples 1 to 10.

27. A decoder comprising at least one processor and memory, said memory containing computer program code, said computer program code being configured to, when executed on the at least one processor, cause the apparatus to carry out the method according to any of the examples 11 to 20.

28. A computer program product embodied on a non-transitory computer readable media, said computer program product including one or more sequences of one or more instructions which, when executed by one or more processors, cause an apparatus or module to at least perform the following:

form a plurality of syntax element assignments, each syntax element assignment relating to a subset of parameters of a parameter set, and each syntax element assignment comprising assignments of values to said related subset of parameters, form an index for each of said plurality of syntax element assignments, form a plurality of combination parameter sets, each combination parameter set comprising indexes of a plurality of said syntax element assignments of said sub-sets of parameters, and encode at least one said combination parameter set into a video bitstream for determining parameter values for video decoding.

25. A computer program product embodied on a non-transitory computer readable media, said computer program product including one or more sequences of one or more instructions which, when executed by one or more processors, cause an apparatus or module to at least perform the following:
   decode from a video bitstream a plurality of syntax element assignments, each syntax element assignment relating to a subset of parameters of a parameter set, and each syntax element assignment comprising assignments of values to said related subset of parameters,
   decode from said video bitstream an index for each of said plurality of syntax element assignments,
   decode from said video bitstream a plurality of combination parameter sets, each combination parameter set comprising indexes of a plurality of said syntax element assignments of said sub-sets of parameters, and
   decode from said video bitstream at least one said combination parameter set for determining parameter values for video decoding.

26. A computer program product embodied on a non-transitory computer readable media, said computer program product including one or more sequences of one or more instructions which, when executed by one or more processors, cause an apparatus or module to at least perform the method according to any of the examples 1 to 20.

27. An encoder comprising:
   means for forming a plurality of syntax element assignments, each syntax element assignment relating to a subset of parameters of a parameter set, and each syntax element assignment comprising assignments of values to said related subset of parameters,
   means for forming an index for each of said plurality of syntax element assignments,
   means for forming a plurality of combination parameter sets, each combination parameter set comprising indexes of a plurality of said syntax element assignments of said sub-sets of parameters, and
   means for encoding at least one said combination parameter set into a video bitstream for determining parameter values for video decoding.

28. A decoder comprising:
   means for decoding from a video bitstream a plurality of syntax element assignments, each syntax element assignment relating to a subset of parameters of a parameter set, and each syntax element assignment comprising assignments of values to said related subset of parameters,
   means for decoding from said video bitstream an index for each of said plurality of syntax element assignments,
   means for decoding from said video bitstream a plurality of combination parameter sets, each combination parameter set comprising indexes of a plurality of said syntax element assignments of said sub-sets of parameters, and
   means for decoding from said video bitstream at least one said combination parameter set for determining parameter values for video decoding.

The invention claimed is:
1. A method comprising:
   forming a plurality of syntax element assignments, each syntax element assignment relating to a subset of syntax elements of a set of syntax elements, and each syntax element assignment comprising assignments of values to said related subset of syntax elements,
   forming an index for each of said plurality of syntax element assignments,
   forming a plurality of combination parameter sets, each combination parameter set comprising a plurality of indexes of said syntax element assignments, wherein at least one syntax element assignment applies to zero syntax elements, and
   encoding at least one said combination parameter set into a video bitstream for determining parameter values for video decoding.

2. A method according to claim 1, comprising:
   forming a combination parameter set index for each of said plurality of combination parameter sets, and
   encoding at least one said combination parameter set index into a video bitstream for determining parameter values for video decoding.

3. A method according to claim 1, comprising:
   determining a combination parameter set to be used according to picture parameters, wherein determining the combination parameter set comprises deriving an identifier of the combination parameter set from a slice header syntax, and
   encoding an indication into a video bitstream indicating that a combination parameter set index is not encoded into slice headers of the video bitstream, and that the combination parameter set to be used is to be determined from picture parameters, said picture parameters comprising parameters remaining unchanged for one or more pictures.

4. A method according to claim 1, comprising:
   encoding an indicator into the video bitstream that combination parameter sets are to be used, and
   encoding said combination parameter sets to a header parameter set, said header parameter set comprising slice header syntax elements.

5. A method according to claim 1, comprising:
   encoding an indicator into the video bitstream in a slice header that combination parameter sets are to be used, and
   encoding an identifier of at least one said combination parameter set to a slice header.

6. A method comprising:
   decoding from a video bitstream a plurality of syntax element assignments, each syntax element assignment relating to a subset of syntax elements of a set of syntax elements, and each syntax element assignment comprising assignments of values to said related subset of syntax elements,
   decoding from said video bitstream an index for each of said plurality of syntax element assignments,
   decoding from said video bitstream a plurality of combination parameter sets, each combination parameter set comprising a plurality of indexes of syntax element assignments, wherein at least one syntax element assignment applies to zero syntax elements, and
   decoding from said video bitstream at least one said combination parameter set for determining parameter values for video decoding.

7. A method according to claim 6, comprising:
   decoding from said video bitstream combination parameter set indexes, each index for identifying one of said plurality of combination parameter sets, and decoding from said video bitstream at least one said combination parameter set index for determining parameter values for video decoding.

8. A method according to claim 6, comprising:
determining a combination parameter set to be used according to picture parameters, wherein determining the combination parameter set comprises deriving an identifier of the combination parameter set from a slice header syntax,
decoding from said video bitstream an indication indicating that a combination parameter set index is not encoded into slice headers of the video bitstream, and
determining the combination parameter set to be used from picture parameters, said picture parameters comprising parameters remaining unchanged for one or more pictures.

9. A method according to claim 8, comprising:
determining a combination parameter set to be used from a picture order count syntax element.

10. A method according to claim 6, comprising:
decoding from said video bitstream an indicator that combination parameter sets are to be used, and
decoding from said video bitstream said combination parameter sets from a header parameter set, said header parameter set comprising slice header syntax elements.

11. A method according to claim 6, comprising:
decoding from said video bitstream an indicator in a slice header that combination parameter sets are to be used, and
decoding from said video bitstream an identifier of at least one said combination parameter set from a slice header.

12. An apparatus comprising at least one processor and memory, said memory containing computer program code, said computer program code being configured to, when executed on the at least one processor, cause the apparatus to:
form a plurality of syntax element assignments, each syntax element assignment relating to a subset of syntax elements of a set of syntax elements, and each syntax element assignment comprising assignments of values to said related subset of syntax elements,
form an index for each of said plurality of syntax element assignments,
form a plurality of combination parameter sets, each combination parameter set comprising a plurality of indexes of syntax element assignments, wherein at least one syntax element assignment applies to zero syntax elements, and
encode at least one said combination parameter set into a video bitstream for determining parameter values for video decoding.

13. An apparatus according to claim 12, comprising computer program code to cause the apparatus to:
form a combination parameter set index for each of said plurality of combination parameter sets, and
encode at least one said combination parameter set index into a video bitstream for determining parameter values for video decoding.

14. An apparatus according to claim 12, comprising computer program code to cause the apparatus to:
determine a combination parameter set to be used according to picture parameters, wherein determining the combination parameter set comprises deriving an identifier of the combination parameter set from a slice header syntax, and
encode an indication into a video bitstream indicating that a combination parameter set index is not encoded into slice headers of the video bitstream, and that the combination parameter set to be used is to be determined from picture parameters, said picture parameters comprising parameters remaining unchanged for one or more pictures.

15. An apparatus comprising at least one processor and memory, said memory containing computer program code, said computer program code being configured to, when executed on the at least one processor, cause the apparatus to:
decode from a video bitstream a plurality of syntax element assignments, each syntax element assignment relating to subset of syntax elements of a set of syntax elements, and each syntax element assignment comprising assignments of values to said related subset of syntax elements,
decode from said video bitstream an index for each of said plurality of syntax element assignments,
decode from said video bitstream a plurality of combination parameter sets, each combination parameter set comprising a plurality of indexes of syntax element assignments, wherein at least one syntax element assignment applies to zero syntax elements, and
decode from said video bitstream at least one said combination parameter set for determining parameter values for video decoding.

16. An apparatus according to claim 15, comprising computer program code to cause the apparatus to:
decode from said video bitstream combination parameter set indexes, each index for identifying one of said plurality of combination parameter sets, and
decode from said video bitstream at least one said combination parameter set index for determining parameter values for video decoding.

17. An apparatus according to claim 15, comprising computer program code to cause the apparatus to:
determine a combination parameter set to be used according to picture parameters, wherein determining the combination parameter set comprises deriving an identifier of the combination parameter set from a slice header syntax,
decode from said video bitstream an indication indicating that a combination parameter set index is not encoded into slice headers of the video bitstream, and
determine the combination parameter set to be used from picture parameters, said picture parameters comprising parameters remaining unchanged for one or more pictures.

18. An apparatus according to claim 17, comprising computer program code to cause the apparatus to:
determining a combination parameter set to be used from a picture order count syntax element.

19. A computer program product embodied on a non-transitory computer readable media, said computer program product including one or more sequences of one or more instructions which, when executed by one or more processors, cause an apparatus or module to at least perform the following:
form a plurality of syntax element assignments, each syntax element assignment relating to a subset of syntax elements of a set of syntax elements, and each syntax element assignment comprising assignments of values to said related subset of syntax elements,
form an index for each of said plurality of syntax element assignments,
form a plurality of combination parameter sets, each combination parameter set comprising a plurality of indexes of syntax element assignments, wherein at least one syntax element assignment applies to zero syntax elements, and encode at least one said combination parameter set into a video bitstream for determining parameter values for video decoding.

20. A computer program product embodied on a non-transitory computer readable media, said computer program product including one or more sequences of one or more instructions which, when executed by one or more processors, cause an apparatus or module to at least perform the following:

decode from a video bitstream a plurality of syntax element assignments, each syntax element assignment relating to a subset of syntax elements of a set of syntax elements, and each syntax element assignment comprising assignments of values to said related subset of syntax elements, decode from said video bitstream an index for each of said plurality of syntax element assignments, decode from said video bitstream a plurality of combination parameter sets, each combination parameter set comprising a plurality of indexes of said syntax element assignments, wherein at least one syntax element assignment applies to zero syntax elements, and decode from said video bitstream at least one said combination parameter set for determining parameter values for video decoding.

* * * * *

UNITED STATES PATENT AND TRADEMARK OFFICE
CERTIFICATE OF CORRECTION

PATENT NO. : 9,912,966 B2  
APPLICATION NO. : 14/587852  
DATED : March 6, 2018  
INVENTOR(S) : Hannuksela Page 1 of 1

It is certified that error appears in the above-identified patent and that said Letters Patent is hereby corrected as shown below:

In the Claims

Claim 1, Column 80, Line 4 delete "said"

Signed and Sealed this  
Twenty-eighth Day of May, 2019

Andrei Iancu  
*Director of the United States Patent and Trademark Office*